United States Patent [19]
James

[11] Patent Number: 6,052,455
[45] Date of Patent: Apr. 18, 2000

[54] UNIVERSAL DATA STRUCTURE FOR USE WITH A CONCURRENT STATE MACHINE SPACE IN A TELECOMMUNICATIONS NETWORK

[75] Inventor: Daniel James, Richardson, Tex.

[73] Assignee: Northern Telecom Limited, Montreal, Canada

[21] Appl. No.: 08/969,822

[22] Filed: Nov. 13, 1997

[51] Int. Cl.[7] .................................................. H04M 3/42
[52] U.S. Cl. ........................................... 379/201; 379/229
[58] Field of Search .................................. 379/201, 207, 379/219, 220, 242, 229, 230, 221; 395/200.58, 200.33, 701, 709, 705, 500, 500.02, 500.05

[56] References Cited

U.S. PATENT DOCUMENTS

| | | | |
|---|---|---|---|
| 5,206,933 | 4/1993 | Farrell et al. | 709/250 |
| 5,426,694 | 6/1995 | Hebert | 379/242 |
| 5,546,453 | 8/1996 | Hebert | 379/242 |
| 5,790,898 | 8/1998 | Kishima et al. | 395/899 |
| 5,794,040 | 8/1998 | Ono et al. | 395/701 |
| 5,826,030 | 10/1998 | Hebert | 395/200.58 |
| 5,870,590 | 2/1999 | Kita et al. | 395/500.05 |

*Primary Examiner*—Scott Wolinsky
*Attorney, Agent, or Firm*—Carr & Storm, L.L.P.

[57] ABSTRACT

A state machine space for concurrent state machines is provided for use in a telecommunications system. Processing of the state machines (and their functions/actions) utilizes specialized data structures and processes to normalize and control data and events dynamically in the telecommunications system. A Universal Data Structure (UDS) provides data uniformity and represents an event in the telecommunications system. A typical UDS includes four fields which are defined by the UDS definition. Three of these fields include event, component types, and data, while an embedded fourth field includes enums. Each UDS represents an event occurring in the telecommunications system and activates one or more state machines contained within a sub-space.

27 Claims, 23 Drawing Sheets

FIG. 5a
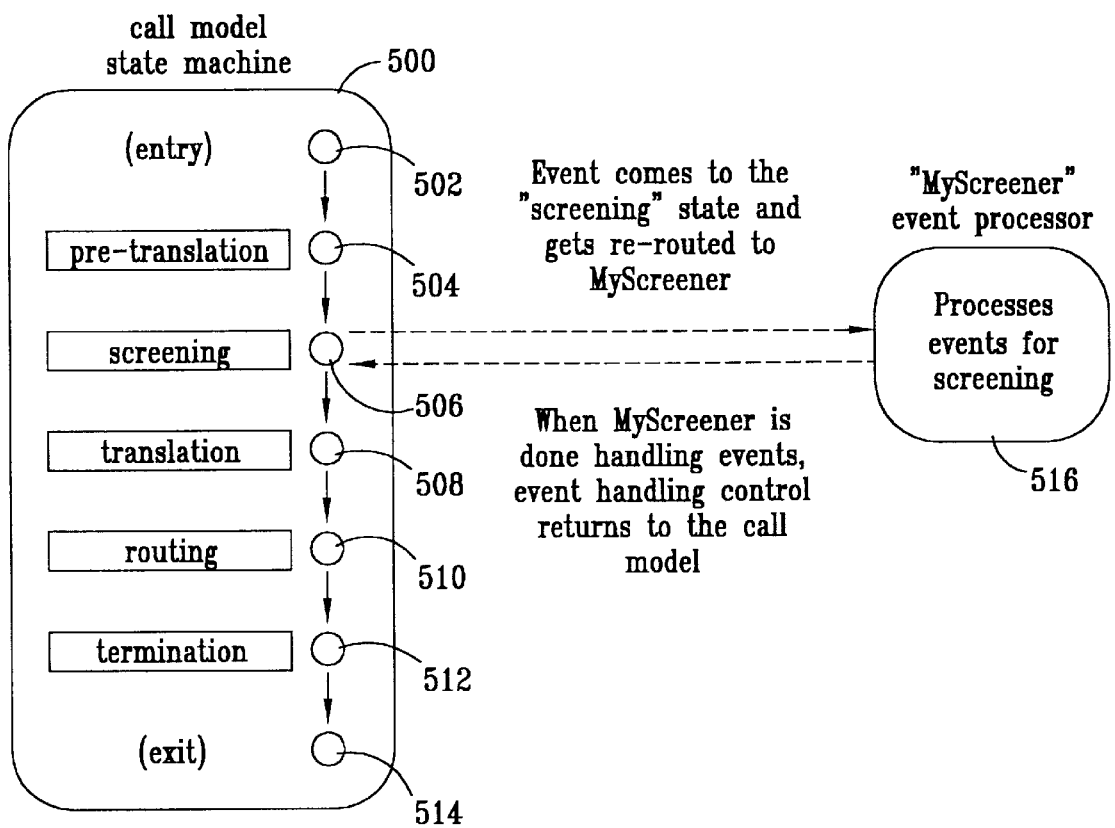
FIG. 5b
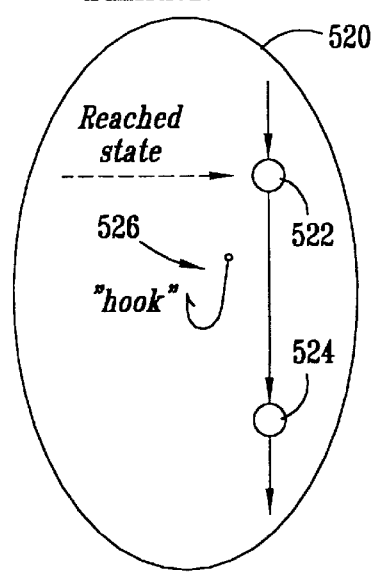
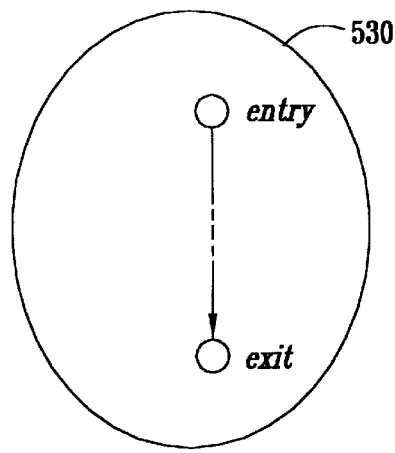

*Transition criteria correspond with numbers above.*
1. (Event() == "Origination") && (ArrayCount("Called Number") == 10) && (Data("Called Number") == "800*")
2. (Event() == "Translation Respone") && (Data("Translation Success") == true)
3. (Event() == "Routing Response") && (Data("Route Success") == true)
4. EVENT() == "Origination Ack"
5. EVENT() == "Answer"
6. EVENT() == "Release"

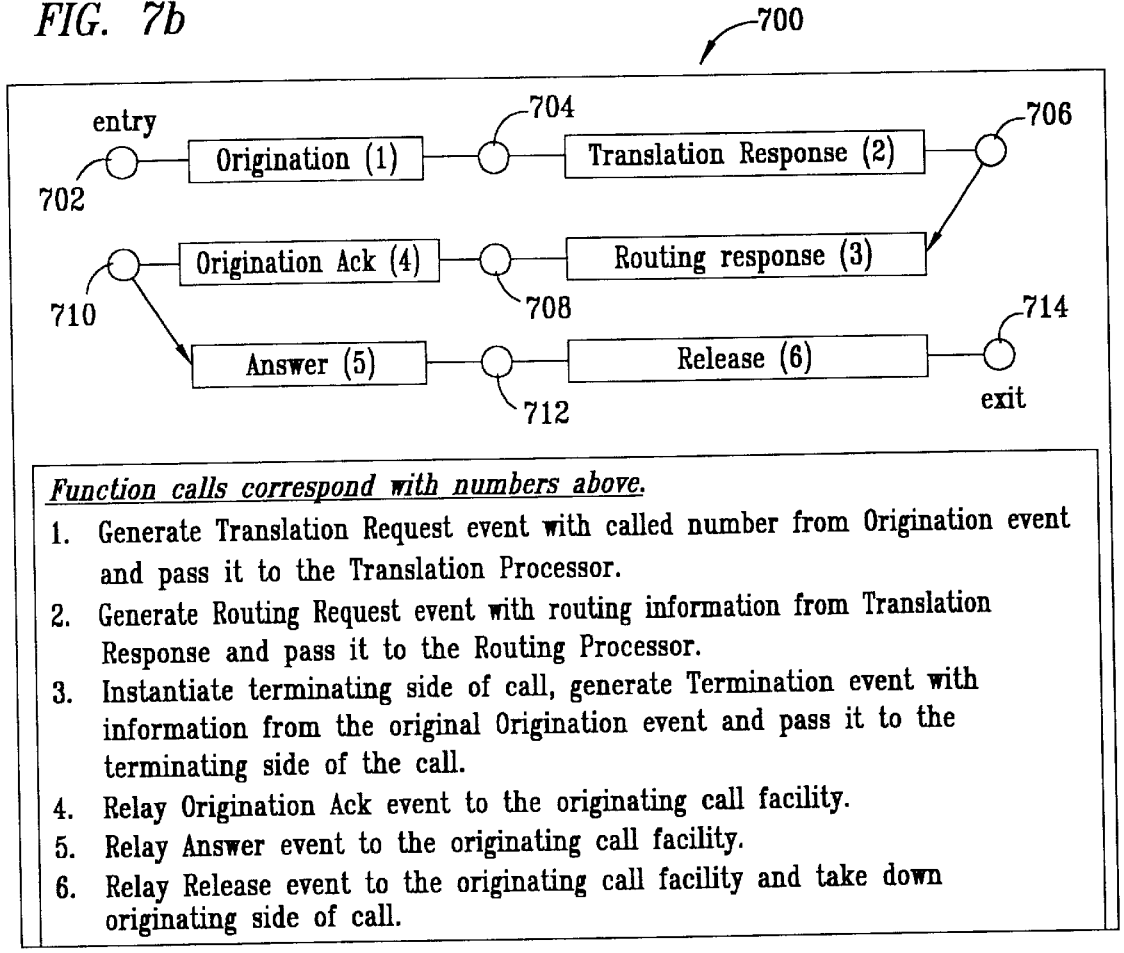

FIG. 7b

Function calls correspond with numbers above.
1. Generate Translation Request event with called number from Origination event and pass it to the Translation Processor.
2. Generate Routing Request event with routing information from Translation Response and pass it to the Routing Processor.
3. Instantiate terminating side of call, generate Termination event with information from the original Origination event and pass it to the terminating side of the call.
4. Relay Origination Ack event to the originating call facility.
5. Relay Answer event to the originating call facility.
6. Relay Release event to the originating call facility and take down originating side of call.

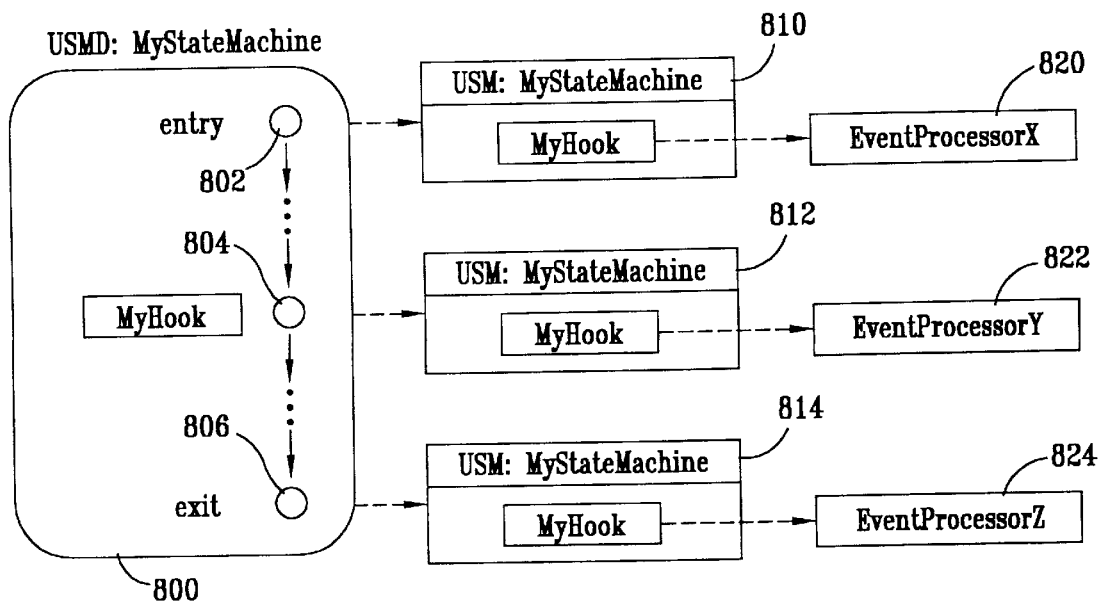

FIG. 8

Input is a UDS event

Each tree in the set represents a mapping from a UDS data value to some output data (in this case a set of USM's and Hook information). Mapping from event id or component type id to the output data can be represented as a mapping from a scalar value.

Output is likely to be the intersection of all the data from the best-matching leaf nodes

| | event | component | component instance | data: bool | data: scalar | data: enum | data: array |
|---|---|---|---|---|---|---|---|
| dont_care | X | X | X | X | X | X | X |
| not_set | | | | X | X | X | X |
| set | | | | X | X | X | X |
| equal | X | X | X | X | X | X | X |
| not_equal | X | X | X | | X | X | X |
| greater | | | X | | X | | |
| less | | | X | | X | | |
| greater_equal | | | X | | X | | |
| less_equal | | | X | | X | | |
| best_match | | | | | | X | |

UNIVERSAL DATA STRUCTURE FOR USE WITH A CONCURRENT STATE MACHINE SPACE IN A TELECOMMUNICATIONS NETWORK

CROSS REFERENCE TO RELATED APPLICATIONS

The following co-pending United States Patent Applications filed concurrently with this application contain related information and are incorporated herein by reference:

U.S. patent application of Daniel James entitled "A UNIVERSAL STATE MACHINE FOR USE WITH A CONCURRENT STATE MACHINE SPACE IN A TELECOMMUNICATIONS NETWORK", U.S. Ser. No. 08/969,373 filed Nov. 13, 1997; and U.S. patent application of Daniel James entitled "CONCURRENT STATE MACHINE SPACE IN A TELECOMMUNICATIONS NETWORK", U.S. Ser. No. 08/968,610 filed Nov. 13, 1997.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD OF THE INVENTION

The present invention relates to a processing system in a reactive system and, in particular, to a call control processing system using a concurrent state machine processing system in a telecommunications network.

BACKGROUND

Development of new software architecture and applications programs for program controlled telecommunications systems has historically been a complex and time-consuming task. Current software for a large telecommunications network may contain millions of lines of code. Developing new software requires not only developing functional specifications defining the operation and interaction of new software code (new services, enhancements, modifications, etc.) with existing code, but also the testing of the new code with existing code to ensure compatibility. Such a process may take a significant amount of time, thus delaying the operation of new services and software into the marketplace. Thus, developing new software systems and applications is a very expensive and time-consuming process.

Accordingly, there exists a need for a software architecture in a telecommunications system that allows use, and re-use, of modular software components allowing them to be integrated quickly into the existing software. In addition, there is a need for a software architecture useful in a complex telecommunications environment wherein many separate tasks within a particular call may be most appropriately performed concurrently and without explicit prior knowledge of one another. Such an architecture should provide an interpreted and dynamic environment in which not only data definitions are configurable at run-time and modifiable during run-time, but so is the activation, functionality and interaction of state machines.

SUMMARY OF THE INVENTION

In accordance with the present invention, there is provided a method for call control processing in a telecommunications system. The method includes providing a universal data structure definition including an event definition having at least one event identification whereby the event identification identifies a particular event. The definition also includes a component definition having at least one component identification whereby the component identification identifies a particular component. An event message is received in response to an event occurring in the telecommunications system. A first universal data structure representing the event is generated in response to the event message. The first universal data structure includes an event identification identifying the event represented by the first universal data structure and a component identification identifying a first component that generated the first universal data structure. A state machine within the telecommunications system is activated in response to the first universal data structure for call control processing.

In another aspect of the present invention, there is a method for call control processing in a telecommunications system that includes providing a universal data structure definition including an event definition having a plurality of event identifications whereby each event identification denotes a predetermined event. The definition also includes a component definition having a plurality of component identifications whereby each component identification denotes a predetermined component. The definition further includes a data field definition having a plurality of data identifiers whereby each data identifier denotes a predetermined field of data. An event message is received in response to an event occurring in the telecommunications system. A first universal data structure representing the event is generated in response to the event message. The first universal data structure includes an event identification, a component identification, and a first data identifier denoting a first field of data. A state machine within the telecommunications system is activated in response to the first universal data structure for call control processing.

In yet another aspect of the present invention, there is provided a method for control processing in a reactive system by providing a universal data structure definition including an event definition having a plurality of event identifications whereby each event identification denotes a predetermined event. The definition also includes a component definition having a plurality of component identifications whereby each component identification denotes a predetermined component. The definition further includes a data field definition having a plurality of data identifiers whereby each data identifier denotes a predetermined field of data. An event message is received in response to an event occurring in the reactive system. A first universal data structure is then generated in response to the event message with the first universal data structure representing the event and containing an event identification.

In another aspect of the present invention, an apparatus for call control processing in a telecommunication system provides a universal data structure definition comprising an event definition, a component definition and a data field definition with each definition identifying particular events, components, and data fields, respectively. The apparatus receives an event message in response to an event occurring in the telecommunications system and generates a first universal data structure in response to the event message wherein the first universal data structure identifies the event in accordance with the universal data structure definition and identifies any components specified in accordance with the universal data structure definition. The apparatus also activates a state machine within the telecommunication system in response to the first universal data structure.

BRIEF DESCRIPTION OF THE DRAWINGS

For a more complete understanding of the present invention, and the advantages thereof, reference is made to the following description taken in conjunction with the accompanying drawings, wherein:

FIG. 5a is a graphical example of a generic call model using a hook state;

FIGS. 5b thru 5d illustrate in graphical representation a transition hook;

FIG. 7b is a simplified diagram of the example shown in FIG. 7a showing function calls;

FIG. 8 illustrates a USMD containing a hook and three examples of instantiated USMs that correspond to the USMD with different event processors hooked into the USMs;

DETAILED DESCRIPTION OF THE INVENTION

Figure 1:
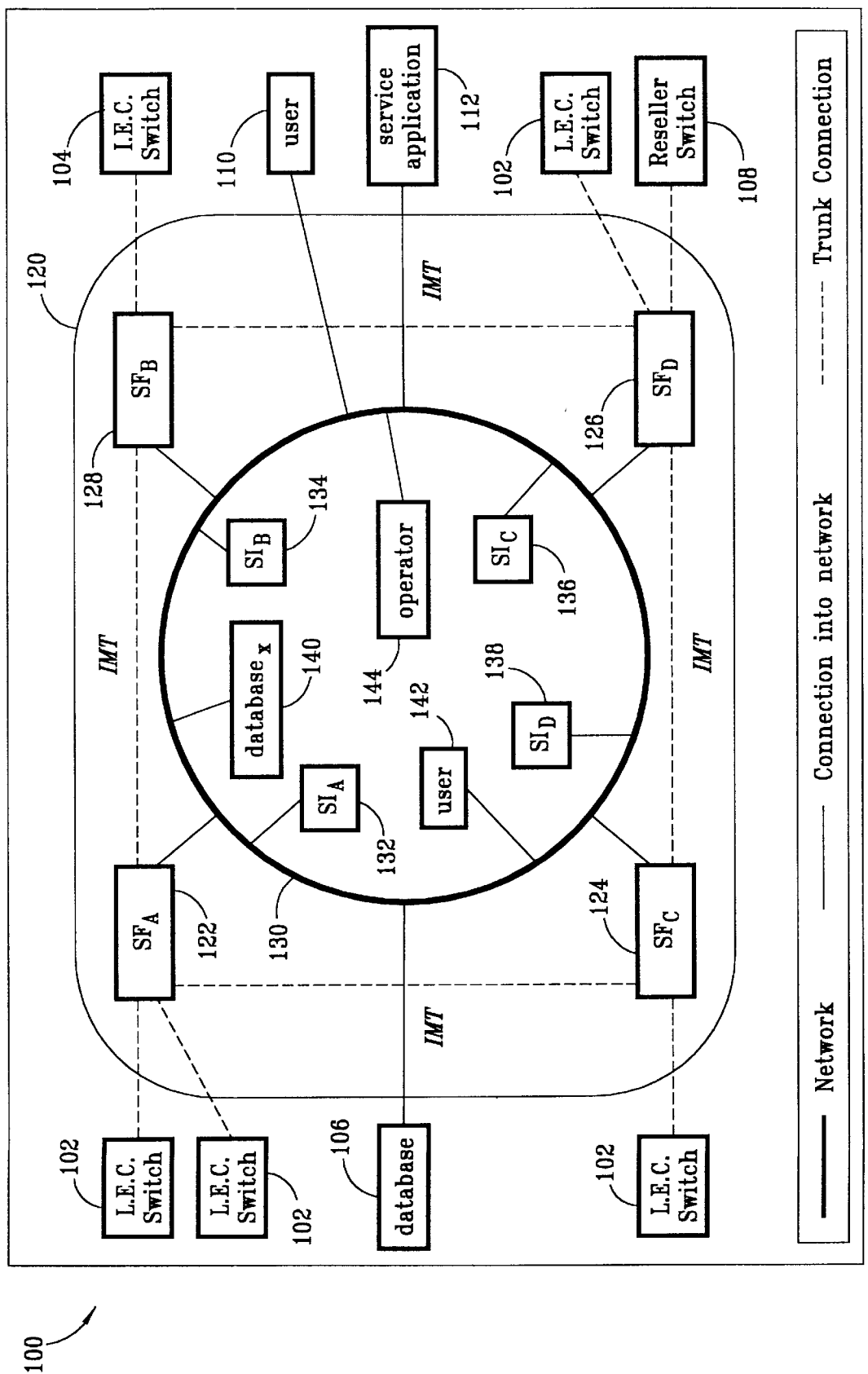
FIG. 1 is a block diagram of a telecommunications network utilizing the present invention.

With reference to the drawings, like reference characters designate like or similar elements throughout the drawings.

Now referring to FIG. 1, there is illustrated, in accordance with the present invention, a telecommunications network 100 that includes a plurality of local exchange carrier (LEC) switches 102, an interexchange carrier (IEC) switch 104, one or more databases 106, an optional reseller switch 108, one or more users 110, and one or more service applications 112. A network 120 interconnects the components of the telecommunications network 100 and processes information and facilitates call control between these components.

The LEC switches 102 are used in smaller, in-area code regions for local exchange distribution and switching and also provide line-oriented services (call-waiting, 3-way calling, etc.). The IEC switch 104 is used for inter-exchange distribution and switching and provides long-distance services. The database 106 (or databases) typically include data that is used for services such as billing, translation, private service, routing, etc. The reseller switch 108 provides distribution and switching onto the network for a reseller who generally purchases long-distance time from an inter-exchange carrier. The one or more users 110 represent a means by which the processing functions of the network 120 may be modified or altered by a user while the network 120 is running. The one or more service applications 112 include service application programs that process selected calls in accordance with the service requested by the call. Such service applications may be remote to the network 120 or split into local and remote portions.

The network 120 includes switching fabric (SF) units 122, 124, 126, 128 interconnected via inter-machine trunks (IMT). The SF units 122, 124, 126, 128 are also typically connected to the LEC switches 102, the IEC switch 104 and the reseller switch 108 via trunk connections. The SF units 122, 124, 126, 128 provide the switching functions or fabric within the network 120. As will be appreciated, any number of SF units may be utilized in the network 120 depending on design characteristics. Also interconnecting the SF units 122, 124, 126, 128 is a processing system 130.

Within the processing system 130, there exist a plurality of switching intelligent (SI) units 132, 134, 136, 138, a database 140, one or more users 142, and an operator 144. The SI units 132, 134, 136, 138 function as a concurrent station machine processing system that processes a call within the network 100 and controls the SF units 122, 124, 126, 128. The database 140 typically stores data that is used for services such as translation, screening, routing, etc. The one or more users 142 may include third party service providers, network administrators, etc. The operator 144 is generally a typical telephone operator that performs manual connect/disconnect/redirect functions and other processing functions for a call.

Figure 2:
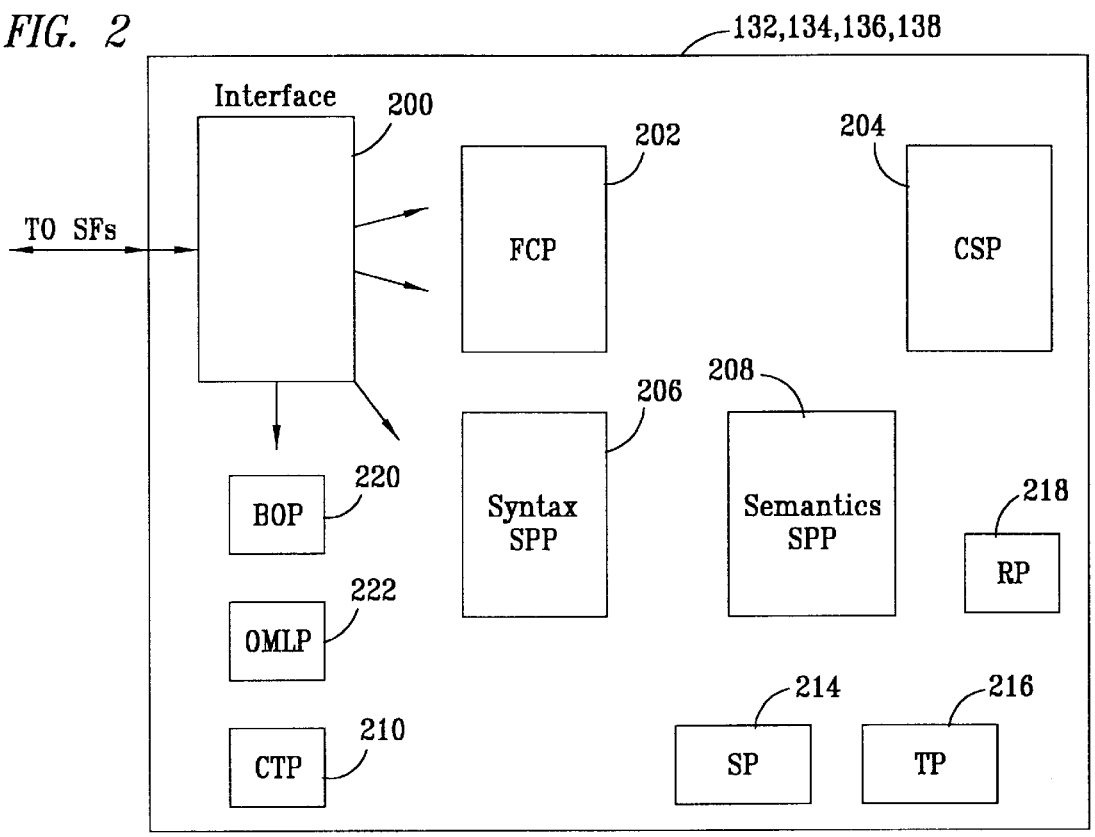
FIG. 2 is a block diagram of a switching intelligent unit in accordance with the present invention.

Now referring to FIG. 2, there is illustrated the contents of each of the SI units 132, 134, 136, 138 with each unit including an interface 200 providing an interface between the SF unit 122, 124, 126, 128 and the SI unit 132, 134, 136, 138 and its internal components. The SI unit also includes a facility control processor (FCP) 202, a call service processor (CSP) 204, a syntax signalling protocol processor (SPP) 206, a semantics SPP 208, a call topology processor (CTP) 210, a screening processor (SP) 214, a translation processor (TP) 216, a routing processor (RP) 218, a billing operations processor (BOP) 220, and a operational measurement and log processor (OMLP) 222. As will be appreciated, the components of the SI unit 132, 134, 136, 138 are processes, with the exception of interface 200 which may include both hardware and software. These processes are preferably performed by software (or software modules) that are executed within a typical computer system (not shown) that includes one or more general-purpose or special-purpose processors, memory, I/O, etc.

The FCP 202 performs facility-specific call control and voice path control functions. The CSP 204 performs call service control and service interaction functions. The syntax SPP 206 converts the protocol-specific information of a protocol telephony event into a Universal Data Structure (described later). The semantics SPP 208 performs signalling protocol specific call control functions and error checking functions on the received protocol message (representing a telephony event) through examination of the Universal Data Structure created by the syntax SPP 206. Alternatively, the semantics SPP 208 may examine the original protocol message. The CTP 210 performs logical representation and control of voice path functions, the SP 214 performs basic screening functions to determine access rights, the TP 216 handles basic translation functions (i.e., dialed number to route list translation), and the RP 218 performs basic routing functions (i.e., route list to terminal id). In addition, the BOP 220 performs billing operations functions and the OMLP 222 functions to perform operational measurements and logs. It will be understood that the SI units 132, 134, 136, 138 (and their components) are generally implemented using software operating within a computer system (not shown). Such a computer system may be a UNIX workstation or NT-based workstation, for example. The software may be implemented in any language such as C++, Java, Smalltalk, or other language.

A. CONCURRENT STATE MACHINE SPACE (COSMAS)

The processing system 130 of the present invention utilizes a definitional and operational system identified as a concurrent state machine space (COSMAS). COSMAS is a 'space' containing state machines that may run concurrently. COSMAS is useful in a reactive system, and especially useful in a complex telecommunications environment wherein many separate tasks within a particular call may be most appropriately performed concurrently and without explicit prior knowledge of one another. COSMAS provides an interpreted and dynamic environment in which not only data definitions are configurable at run-time and modifiable during run-time, but so is the functionality and interaction of the state machines. This modifiability is useful for system add-ons and modifications.

COSMAS is composed of three major components: (1) Universal Data Structure; (2) Universal State Machine; and (3) COSMAS Sub-Space. The Universal Data Structure (UDS) provides a source of normalized or private call data for use by the SI units 132, 134, 136, 138 within the processing system 130 (see FIG. 2). The Universal State Machine (USM) is a state machine that performs functions and/or processing in response to a telephony event that is represented by a UDS. The COSMAS Sub-Space is a collection of state machines (USMs) that corresponds to a particular set of functionality.

B. UNIVERSAL DATA STRUCTURE (UDS)

The Universal Data Structure (UDS) is a dynamic data structure that serves the primary purposes of normalizing call data and representing telephony events. It may also be used to hold data private to particular services, customer-specific protocol features and the like. The UDS comprises normalized data and represents telephony events. The UDS may also contain persistent data (for storage purposes) for components of the telecommunications system.

Figure 3:
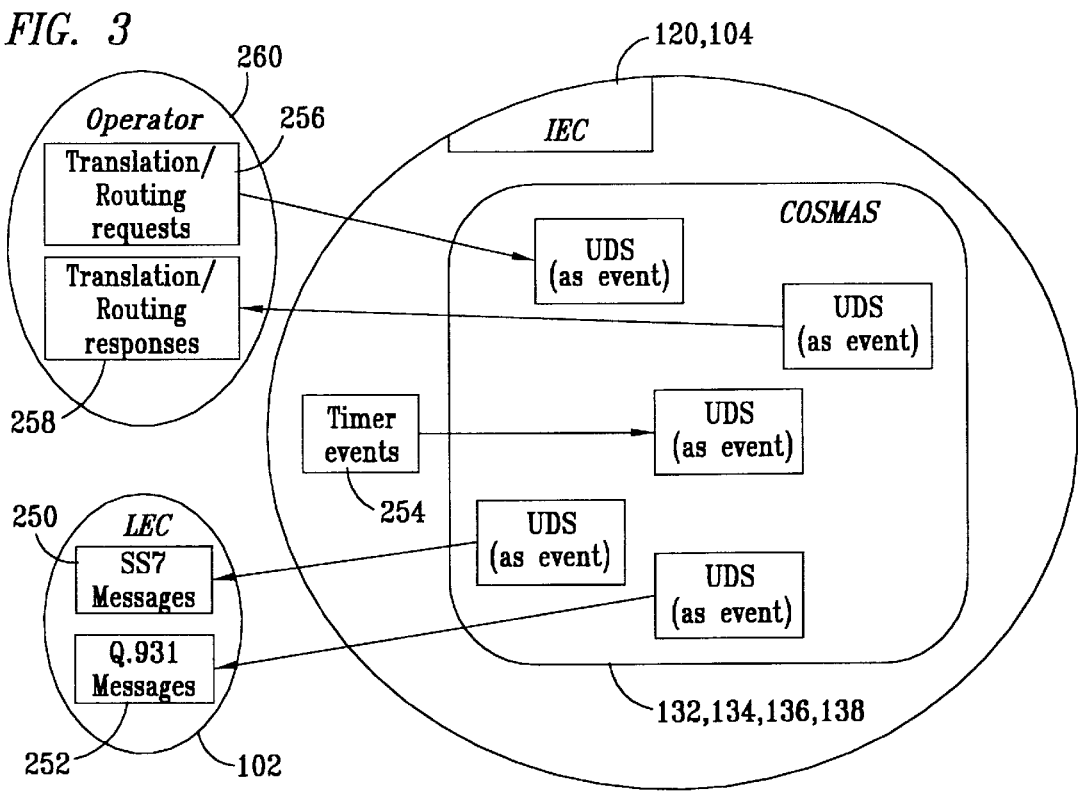
FIG. 3 is an example of a high-level view of the conversion of events into the UDS format.

Telephony events include protocol (SS7, ISDN, etc.) messages, timeouts, and requests/responses for translation, digits, feature information, etc., and the like. Generally, it is assumed that nothing happens in the telecommunications system without the occurrence of some "external" event. For example, assuming that the telecommunications system is a long-distance carrier system, then an originating protocol message from a local carrier would be an event external to the system. FIG. 3 presents an example of a high-level view of the conversion of external events into the UDS format.

As illustrated in FIG. 3, a local exchange carrier (or switch) 102 transmits messages representing telephony events, such as SS7 messages 250 or ISDN (Q.931) messages 252, to the inter-exchange carrier (IEC) (comprising the IEC switch 104 and the processing system 120) in the form of standard protocol data messages. Within the SI units 132, 134, 136, 138 these messages are converted into normalized data structures (referred to as universal data structures (UDS)). Within the processing system 120, the UDS is processed and call control processing occurs in accordance with a predetermined call control flow that may also depend on the information contained within the UDS. It will be understood that any other types of events (including notifications) may be transmitted from the LEC switch 102 to the IEC, as desired. Events within the processing system 120 may also be transmitted to the LEC switch 102 in the standard protocol form (e.g. SS7, ISDN, etc.) after they have been converted from UDS form to the standard protocol form.

Additional telephony events may also be received by the processing system 120 and converted into UDS events, including events such as timer events 254 and operator-type events 256 generated from an operator 260. The timer events 254 are shown occurring internal to the IEC, but may also be external to the IEC. Likewise, operator-type events 256 (may be external or internal to the IEC) such as translation or routing requests may be received by the processing system 120 and converted into a UDS event. In response to the UDS event representing such a translation or routing request event, the processing system 120 may respond with a UDS response that is converted into the proper format for handling by the operator 260.

External events come in varying data formats. An event is converted when an external event is received by COSMAS. Although events differ in format, they do tend to carry the same sort of information. For example, an SS7 IAM message and an ISDN PRI SETUP message both contain a called number (or some form of termination information), information about the call originating facility, and other information for triggering specific features. Some or all of this information is normalized; i.e., the called number may be packed differently into both messages, but for processing, the information should look the same to the telecommunications system (e.g., for translation). Likewise for the messages themselves. Both types of messages represent originating events to originate new a call. Upon entering the COSMAS system, both messages are converted into origination UDS events having the same representation for their respective called numbers (including other normalized data). In this way, the telecommunications system removes protocol specificity from call control. COSMAS provides a means and way to maintain consistent call control without protocol specific knowledge.

The UDS also plays the role of persistent data storage container. This pertains to system-wide information as well as call-specific information. The exact placement of a UDS is within the discretion of the system architect. For example, persistent information pertaining to a particular call or call half may be maintained at a certain location or locations, especially for billing processes. Certain information like caller, callee, charge number, etc. should be identified and stored through the life of the call. This information is maintained by a UDS to coincide with the information carried by the transient events that drive the system.

Differentiation is made between the UDS definitional part and the UDS instantiated part. Definitional information is used to indicate what is valid and what is not valid for the system. Instantiated information indicates a particular instance of a UDS. The definitional part is referred to as the universal data structure definition (UDSD), while the instantiated part is referred to as the UDS. The UDSD and UDS are logical separations and do not have to exist in separate structures. UDSD information is considered globally accessible to all instantiations of the UDS such that the entire system maintains a consistent view of what is valid and invalid. Optionally, version information can be used to ensure that certain versions of the UDS are used only by certain versions of components within the SI units or state machines, etc., and viceversa.

1. Universal Data Structure Definition (UDSD)

In the present invention, the UDS includes four fields which are defined by the UDSD. Three of these fields include events, component type, and data, while an embedded fourth field includes enums. The event field contains information relating to the telephony events that are defined for a given telecommunications system (such as Origination, Translation Request, Release, etc.). The component type field identifies the types of components in the telecommunications system to and from which telephony events may be passed (such as facilities call control, call segment call controls, translator, etc.). The data field includes call data information (such as called number, calling number, etc.). The enums field includes enumerated type definitions for a call data type identified as 'enum'. The following universal data structure definition file format grammar preferably provides an example of the UDSD format in accordance with the present invention:

```
UniversalDataStructure::    = EVENTS Events_
                              COMPONENTS Components_
                              ENUMS Enums_
                              DATA Data_
Events::                    = [ Event ] Events | e
Event::                     = NUMBER STRING ComponentPermissions DataPermissions
Components::                = [ Component ] Components | e
Component::                 = NUMBER STRING EventPermissions DataPermissions
Enums::                     = [ Enum ] Enums | e
Enum::                      = NUMBER STRING ( EnumSymbols )
EnumSymbols::               = EnumSymbol |
                              EnumSymbol : EnumSymbols
EnumSymbol::                = NUMBER STRING
Data::                      = [ Datum ] Data | e
Datum::                     = NUMBER STRING DataType EventPermissions
                              ComponentPermissions
DataType::                  = BOOL |
                              SCALAR |
                              ENUM NUMBER |
                              ARRAY
PermissionMarker::          = READ | WRITE | READWRITE
Permissions::               = Permission Permissions | e
Permission::                = PermissionMarker NUMBER
EventPermissions::          = Permissions
ComponentPermissions::      = Permissions
DataPermissions::           = Permissions
```

© 1997 Northern Telecom Limited

Event definitions define the telephony events that are valid for a call-processing system. Which particular events are used is dependent upon the designer and the needs of the system. Shown below are examples of typical events in a telecommunications network that will be processed by the call processing system. As will be appreciated, the list of events below is not an exhaustive list but merely illustrates examples of events that may be processed in accordance with the present invention. The number and type of events for a given system is dependent on the design of the given system and the desired functionality.

| EVENT DEFINITION: | |
|---|---|
| id | events |
| [ 0 | "Error" ] |
| [ 1 | "Time Alarm Occurred" ] |
| [ 2 | "Message" ] |
| [ 3 | "Interrupt" ] |
| [ 4 | "Origination" ] |
| [ 5 | "Origination Ack" ] |
| [ 6 | "Ringing" ] |
| [ 7 | "Answer" ] |
| [ 8 | "Release" ] |
| [ 9 | "Release Ack" ] |
| [ 10 | "Termination" ] |
| [ 11 | "Redirect" ] |
| [ 12 | "Set Voice Path" ] |
| [ 13 | "Billing" ] |
| [ 14 | 'Authorization Request' ] |
| [ 15 | 'Authorization Response' ] |
| [ 16 | "Screening Request" ] |
| [ 17 | "Screening Response" ] |
| [ 18 | "Translation Request" ] |
| [ 19 | "Translation Response" ] |
| [ 20 | "Routing Request" ] |

-continued

| EVENT DEFINITION: | |
|---|---|
| id | events |
| [ 21 | "Routing Response" ] |
| [ 22 | "Digits Request" ] |
| [ 23 | "Digits Response" ] |
| [ 24 | "Creation Request" ] |
| [ 25 | "Creation Response" ] |
| [ 26 | "Retrieval Request" ] |
| [ 27 | "Retrieval Response" ] |
| [ 28 | "Generic Processing Response" ] |
| [ 29 | "Conference Unit Response" ] |
| [ 30 | "Transfer Units Response" ] |

© 1997 Northern Telecom Limited

The event definitions are configurable and include an event identifier (ID number) and event name information (Name) (optional). The exact semantics of these events is determined by the system architect and the system architect's evaluation and determination of the functionality of the state machines and components of the system. The event definition provides configurability and may be altered at run-time. As will be appreciated, the event identification number may be an alphanumeric identification number, e.g., A 334_Z, or some other symbol. However, integers are sufficient as shown above. Accordingly, a UDS will include in its event field an identification number to identify the event represented by the UDS. For example, if the UDS event field contains a "04", the UDS represents an origination event.

Optionally, each event definition may also include information indicating which data values and/or components are valid for a particular event. This would allow an event (UDS) to "see" only the data that pertains to that particular event or vice versa. For example, it may be logical that a Timeout event does not need access to a called number and, as such, a Timeout event (UDS) should not have access to called number data. Likewise, it might not be desirable for a translation component to generate an origination event. One skilled in the art may use such restrictions in the system to prevent inconsistent accesses to data. Accordingly, the event definition may include additional data fields for indicating or identifying which component(s) within the system and/or which data are valid (or allowed) for a particular defined event, and for indicating version information.

Component type definitions define which types of components in the system are capable of receiving and sending events. Which particular components are used is dependent upon the designer and the needs of the system. Shown below are examples of typical component types in a telecommunications network that provide functionality in a call processing system. As will be appreciated, the list of components below is not an exhaustive list but merely illustrates examples of components that may be utilized in a given system in accordance with the present invention. The number and type of components for a given system is dependent on the design of the given system and the desired functionality.

| COMPONENT TYPE DEFINITION: | |
|---|---|
| id | component |
| [ 0 | "Invalid" ] |
| [ 1 | "Proxy" ] |
| [ 2 | "Call" ] |
| [ 3 | "Facility" ] |
| [ 4 | "Call Segment" ] |
| [ 5 | "Call Topology" ] |
| [ 6 | "Billing Operations" ] |
| [ 7 | "Operational Measurement & Logs" ] |
| [ 8 | "Remote Event Handler" ] |
| [ 9 | "Utility" ] |

© 1997 Northern Telecom Limited

The component type definition information is similar to event definition information, and includes at least a component type identifier (ID number) and component type name information (Name) (optional). Optionally, each component type definition may also include information indicating which events and data are accessible to that type of component, and may also contain a "component ID" if there is more than one component of that particular component type. Accordingly, the component definition may include additional data fields for indicating or identifying which event(s) and/or which data are valid (or allowed) for a particular defined component, and for indicating version information.

Data definitions define which items of data are valid for the system. Which particular data used is dependent upon the designer and the needs of the system. Shown below are examples of data typically utilized in a telecommunications network for call processing control. As will be appreciated, the list of data fields below is not an exhaustive list but merely illustrates examples of data that may be utilized in a given system in accordance with the present invention. The type of data and number of data fields for a given system is dependent on the design of the given system and the desired functionality.

| DATA DEFINITION: | | |
|---|---|---|
| id | data | |
| [ 0 | "Unused" | SCALAR ] |
| [ 1 | "NOC" | SCALAR ] |
| [ 2 | "USI" | ARRAY ] |
| [ 3 | "FCI" | SCALAR ] |
| [ 4 | "FCI 2" | SCALAR ] |
| [ 5 | "MFCSI" | SCALAR ] |
| [ 6 | "NSF" | ARRAY ] |
| [ 7 | "SI" | SCALAR ] |
| [ 8 | "Generic Digits" | ARRAY ] |
| [ 9 | "TNS" | ARRAY ] |
| [ 10 | "CPC" | SCALAR ] |
| [ 11 | "ChGNum NOA" | SCALAR ] |
| [ 12 | "ChGNum NPI" | SCALAR ] |
| [ 13 | "REL Cause" | ARRAY ] |
| [ 14 | "Calling Party Category" | ENUM 8 ] |
| [ 15 | "Information Transfer Capability" | ENUM 9 ] |
| [ 16 | "coding Standard" | ENUM 10 ] |
| [ 17 | "Voice Path Information Transfer Rate" | ENUM 11 ] |
| [ 18 | "Voice Path Transfer Mode" | ENUM 12 ] |
| [ 19 | "Establishment" | ENUM 13 ] |
| [ 20 | "Configuration" | ENUM 14 ] |
| [ 21 | "Structure" | ENUM 15 ] |

-continued

DATA DEFINITION:

| id | data | | |
|----|------|------|---|
| [ 22 | "Dest-Orig Information Transfer Rate" | ENUM 11 | ] |
| [ 23 | "Symmetry" | ENUM 16 | ] |
| [ 24 | "Bearer Capability" | ENUM 26 | ] |
| [ 25 | "Multiplier or Layer ID" | ENUM 18 | ] |
| [ 26 | "User Rate" | ENUM 19 | ] |
| [ 27 | "Asynchronous" | BOOL | ] |
| [ 28 | "Nature of Address" | ENUM 20 | ] |
| [ 29 | "Numbering Plan Indicator" | ENUM 21 | ] |
| [ 30 | "Called Number" | ARRAY | ] |
| [ 31 | "Terminating Switch ID" | SCALAR | ] |
| [ 32 | "Terminating Trunk Group" | SCALAR | ] |
| [ 33 | "Calling Number" | ARRAY | ] |
| [ 34 | "Screening Indicator" | ENUM 22 | ] |
| [ 35 | "Presentation Restriction Indicator" | ENUM 23 | ] |
| [ 36 | "Backward Charge Indicator" | ENUM 24 | ] |
| [ 37 | "Backward Called Party Status" | ENUM 25 | ] |
| [ 38 | "Backward Called Party Category" | ENUM 26 | ] |
| [ 39 | "Backward End-to-End Method" | ENUM 3 | ] |
| [ 40 | "Backward Interworking Indicator" | BOOL | ] |
| [ 41 | "Backward ISDN User Part" | ENUM 4 | ] |
| [ 43 | "Backward Reverse Holding" | BOOL | ] |
| [ 44 | "Backward ISDN Access" | ENUM 6 | ] |
| [ 45 | "Forward Call Special Indicator" | SCALAR | ] |
| [ 46 | "Origination Trunk Group" | ARRAY | ] |
| [ 47 | "Origination Switch ID" | ARRAY | ] |
| [ 48 | "Time Stamp" | SCALAR | ] |
| [ 49 | "Access Transport" | ARRAY | ] |
| [ 50 | "Current Call ID" | ARRAY | ] |
| [ 51 | "Current Nodes Point Code" | ARRAY | ] |
| [ 52 | "Charge Number" | ARRAY | ] |
| [ 53 | "Orig TID" | SCALAR | ] |
| [ 54 | "Orig TOD" | SCALAR | ] |
| [ 55 | "Answ TOD" | SCALAR | ] |
| [ 56 | "Term TOD" | SCALAR | ] |
| [ 57 | "TSID TTG Indicator" | BOOL | ] |
| [ 58 | "Dedicated Termination" | BOOL | ] |
| [ 59 | "No CLI" | SCALAR | ] |
| [ 60 | "MNO" | BOOL | ] |
| [ 61 | "Spare Array 10" | ARRAY | ] |
| [ 62 | "MCI FSCI" | ARRAY | ] |
| [ 63 | "MCI BCSI" | ARRAY | ] |
| [ 64 | "Spare Array 13" | ARRAY | ] |
| [ 65 | "Spare Array 14" | ARRAY | ] |
| [ 66 | "Spare Array 15" | ARRAY | ] |
| [ 67 | "Spare Array 16" | ARRAY | ] |
| [ 68 | "Spare Array 17" | ARRAY | ] |
| [ 69 | "Spare Array 18" | ARRAY | ] |
| [ 70 | "Spare Array 19" | ARRAY | ] |
| [ 71 | "Spare Array 20" | ARRAY | ] |
| [ 72 | "Spare Array 21" | ARRAY | ] |
| [ 73 | "Spare Array 22" | ARRAY | ] |
| [ 74 | "Spare Array 23" | ARRAY | ] |
| [ 75 | "Spare Array 24" | ARRAY | ] |
| [ 76 | "Spare Array 25" | ARRAY | ] |
| [ 77 | "Spare Array 26" | ARRAY | ] |
| [ 78 | "Spare Array 27" | ARRAY | ] |
| [ 79 | "Originating Line Info" | ARRAY | ] |
| [ 80 | "OSID OTG Spare" | SCALAR | ] |
| [ 81 | "TCM Spare" | SCALAR | ] |
| [ 82 | "Protocol" | ENUM 24 | ] |
| [ 83 | "Screening Result" | ENUM 25 | ] |
| [ 84 | "Translation Result" | BOOL | ] |
| [ 85 | "Agent ID" | SCALAR | ] |
| [ 86 | "Routing Result" | ENUM 27 | ] |
| [ 87 | "Creation Result" | BOOL | ] |
| [ 88 | "Retrieval Result" | BOOL | ] |
| [ 89 | "Digits" | ARRAY | ] |
| [ 90 | "Route Request Type" | ENUM 28 | ] |
| [ 91 | "Auth ID" | ARRAY | ] |
| [ 92 | "Auth Passcode" | ARRAY | ] |
| [ 93 | "Auth Result" | ARRAY | ] |
| [ 94 | "Information Indicator" | SCALAR | ] |
| [ 95 | "Star Component" | ENUM 29 | ] |
| [ 96 | "User Assigned ID" | SCALAR | ] |

-continued

DATA DEFINITION:

| id | data | | |
|----|------|------|---|
| [ 97 | "Generic Cause Value" | ENUM 30 | ] |
| [ 98 | "Signalling Point Code" | ARRAY | ] |
| [ 99 | "Network Call Identifier" | ARRAY | ] |
| [ 100 | "Translation Type" | ENUM 31 | ] |
| [ 101 | "Screening Type" | ENUM 32 | ] |
| [ 102 | "Message Type" | SCALAR | ] |
| [ 103 | "Incoming Voice Path State" | ENUM 33 | ] |
| [ 104 | "Outgoing Voice Path State" | ENUM 33 | ] |
| [ 105 | "Generic Processing Response Value" | BOOL | ] |
| [ 106 | "Route List" | ARRAY | ] |
| [ 107 | "Conference Unit Port List" | ARRAY | ] |
| [ 108 | "IP Agent ID" | SCALAR | ] |
| [ 109 | "Card Number" | ARRAY | ] |
| [ 110 | "Number of Transfer Units" | SCALAR | ] |
| [ 111 | "Trunk Group" | SCALAR | ] |
| [ 112 | "Trunk Group Member" | SCALAR | ] |
| [ 113 | "IP Called Party Number" | ARRAY | ] |
| [ 114 | "Customer Number" | SCALAR | ] |

© 1997 Northern Telecom Limited

Each data definition requires at least a data identifier (ID number), data name information (Name) (optional), and data type indicator (Data Type). As with event and component definitions, each data definition may optionally contain information indicating which events and/or components are valid for this piece of data. Accordingly, the data definition may include additional data fields for indicating or identifying which event(s) and/or which component(s) are valid (or allowed) for particular defined data, and for indicating version information.

The data type indicator may include range, symbols, and other information depending upon the data type. In the present invention, there are preferably four basic data types that are used to normalize call data in a telecommunications system: boolean ("bool"), scalar, array, and enum (enumeration). It will be understood that other data types may be used. In other systems, additional data types may be used such as strings and floating points, etc.

The bool type represents a boolean value of true or false.

The scalar type represents a scalar value within an optionally defined range. If no range is given, then the range defaults to whatever is maximal for the size of an integer for the implemented system. In a preferred embodiment, a specific range is given and, if not, then a single default range should be used consistently across platforms that may be using UDSs.

The array type represents an array of scalar values. Minimum and maximum length values are optionally included with the array, and a range may be optionally applied to the values, as with the scalar type.

The enum type represents a symbolic value that belongs to one of the enums defined in the enums part of the UDSD (described below). An enum is a named set of symbols, each of which is associated with a distinct scalar value. The enum type is provided to allow for non-contiguous range definition and value-symbol (or value-name) association on a scalar value. The enum type for a given data item is an ID or name indicating which particular enum definition, as defined in the enums definition part of the UDSD, the data item utilizes. The enum definition part of the UDSD defines valid enums for the system. Shown below are examples of enums that may be used in a telecommunications network. As will be appreciated, the list of enums below is not an exhaustive list but merely illustrates examples of enums that may be utilized in a given system in accordance with the present invention. The number and type of enums, and the data they represent, for a given system is dependent on the design of the given system and the desired functionality.

ENUM DEFINITION:

| id | enums |
|----|-------|
| [ 1 | "continuity" |
|    | ( 0    "continuity check not required" : |
|    | 1      "continuity check required" : |
|    | 2      "continuity check performed on previous circuit" ) ] |
| [ 2 | "call indicator" |
|    | ( 0    "national call" : |
|    | 1      "international call" ) ] |
| [ 3 | "end to end method indicator" |
|    | ( 0    "no end to end method available" : |
|    | 1      "pass along method available" : |
|    | 2      "SCCP method available" : |
|    | 3      "both methods available" : |
| [ 4 | "ISDN UP indicator" |
|    | ( 0    "ISDN UP used all the way" : |
|    | 1      "ISDN UP not used all the way" ) ] |
| [ 5 | "ISDN UP preference indicator" |
|    | ( 0    "ISDN UP preferred all the way" : |
|    | 1      "ISDN UP not required all the way" : |
|    | 2      "ISDN UP required all the way" : |
| [ 6 | "ISDN access indicator" |
|    | ( 0    "non ISDN access" : |
|    | 1      "ISDN access" ) ] |
| [ 7 | "SCCP method indicator" |
|    | ( 0    "no indication" : |
|    | 1      "connectionless method available" : |
|    | 2      "connection oriented method available" : |
|    | 3      "both methods available" ) ] |
| [ 8 | "calling party category" |
|    | ( 0    "unknown" : |
|    | 1      "french operator" : |
|    | 2      "english operator" : |
|    | 3      "german operator" : |
|    | 4      "russian operator" : |
|    | 5      "spanish operator" : |
|    | 10     "ordinary call subscriber" : |
|    | 11     "priority subscriber" : |
|    | 13     "test call" : |
|    | 15     "payphone" : |
|    | 16     "digital data call") ] |
| [ 9 | "information transfer capability" |
|    | ( 0    "speech" : |
|    | 8      "unrestricted digital information" : |
|    | 9      "restricted digital information" : |
|    | 16     "3.1 kHz audio" : |
|    | 24     "7 kHz audio" : |
|    | 18     "15 kHz audio" ) ] |
| [ 10 | "coding standard" |
|    | ( 0    "CCITT" : |
|    | 1      "other international" : |
|    | 2      "national" ) ] |
| [ 11 | "info transfer rate" |
|    | ( 0    "channel size" : |
|    | 1      "channel size" " |
|    | 16     "64 kbps" : |
|    | 19     "384 kbps" : |
|    | 21     "1536 kbps" : |
|    | 23     "1920 kbps" ) ] |
| [ 12 | "vp transfer mode" |
|    | (0     "circuit mode" : |
|    | 1      "packet mode" ) ] |
| [ 13 | "establishment" |
|    | ( 0    "on demand" : |
|    | 1      "permanent" : |
| [ 14 | "configuration" |
|    | ( 0    "point to point" : |
|    | 3      "multipoint" ) ] |
| [ 15 | "structure" |
|    | ( 0    "default" : |
|    | 1      "8 kHz integrity" : |

-continued

ENUM DEFINITION:

| id | enums |
|----|-------|
|    | 4      "service data unit integrity" : |
|    | 7      "unstructured" ) ] |
| [ 16 | "symmetry" |
|    | ( 0    "bidirectional symmetric" : |
|    | 1      "bidirectional asymmetric" : |
|    | 2      "orig to dest" : |
|    | 3      "dest to orig" : |
| [ 18 | "multiplier or layer" |
|    | ( 0    "bearer" : |
|    | 1      "user info layer 1" : |
|    | 2      "user info layer 2" : |
|    | 3      "user info layer 3" ) ] |
| [ 19 | "user rate" |
|    | ( 2    "1.2 kbps" : |
|    | 3      "2.4 kbps" : |
|    | 5      "4.8 kbps" : |
|    | 8      "9.6 kbps" : |
|    | 11     "19.2 kbps" : |
|    | 15     "56.0 kbps" ) ] |
| [ 20 | "nature of address" |
|    | ( 1    "subscriber number" : |
|    | 3      "national number" : |
|    | 4      "international number" : |
|    | 6      "abbreviated number" : |
|    | 113    "operator requested subscriber number" : |
|    | 114    "operator requested national number" : |
|    | 115    "operator requested international number" : |
|    | 116    "operator requested no number" : |
|    | 117    "cut through to carrier" : |
|    | 118    "950 call" : |
|    | 119    "test call" : |
|    | 120    "mci vnet" : |
|    | 122    "operator to operator" : |
|    | 123    "operator to operator outside USA" : |
|    | 124    "direct termination overflow" ) ] |
| [ 21 | "numbering plan" |
|    | ( 0    "unknown" : |
|    | 1      "ISDN" : |
|    | 3      "CCITT data" : |
|    | 4      "CCITT telex" : |
|    | 5      "private" ) ] |
| [ 22 | "screening indicator" |
|    | ( 0    "user provided not screened" : |
|    | 1      "user provided passed screen" : |
|    | 2      "user provided failed screen" : |
|    | 3      "network provided" ) ] |
| [ 23 | "address presentation restriction" |
|    | ( 0    "presentation allowed" : |
|    | 1      "presentation restricted" : |
|    | 2      "address unavailable" ) ] |
| [ 24 | "protocols" |
|    | ( 0    "Nortel ISUP" : |
|    | 1      "Nortel PRI" ) ] |
| [ 25 | "screening results" |
|    | ( 0    "complete" : |
|    | 1      "block" : |
|    | 2      "invalid calling card" : |
|    | 3      "invalid debit card" ) ] |
| [ 26 | "bearer capability" |
|    | ( 0    "Speech" : |
|    | 1      "Unrestricted 64 kps" : |
|    | 2      "Restricted 64 kps" : |
|    | 3      "Unrestricted 56 kps" : |
|    | 4      "3.1 kHz Audio" ) ] |
| [ 27 | "routing results" |
|    | ( 0    "success" : |
|    | 1      "failure" : |
|    | 2      "already allocated" ) ] |
| [ 28 | "route request types" |
|    | ( 0    "normal" : |
|    | 1      "vpn" ) ] |
| [ 29 | "star components" |
|    | ( 0    "invalid" : |
|    | 1      "proxy" : |

-continued

ENUM DEFINITION:

| id | enums |
|----|-------|
|    | 2 "star call" : |
|    | 3 "fop" : |
|    | 4 "csp" : |
|    | 5 "ctp" : |
|    | 6 "bop" : |
|    | 7 "omlp" : |
|    | 8 "remote event handler" : |
|    | 9 "star utility" ) ] |
| [ 30 | "generic cause values" |
|    | ( 0 "normal clearing" : |
|    | 1 "all routes busy" ) ] |
| [ 31 | "translation types" |
|    | ( 0 "invalid" : |
|    | 1 "nanp" : |
|    | 2 "tsid/ttg" : |
|    | 3 "operator" : |
|    | 4 "treatment" ) ] |
| [ 32 | "screening types" |
|    | ( 0 "invalid" : |
|    | 1 "nanp" : |
|    | 2 "calling card" : |
|    | 3 "debit card" : |
|    | 4 "long-distance phone-tag" ) ] |
| [ 33 | "voice path states" |
|    | ( 0 "active" : |
|    | 1 "inactive" : |
|    | 3 "no change" ) ] |

© 1997 Northern Telecom Limited

Each enum definition includes an enum identifier (Enum ID number) and a set of symbol-scalar value associations. For example, the data field named "calling party category" (data id=14) is defined to contain data of the type "enum 8" (see above). Accordingly, the data contained within the "calling party category" data field of a UDS will include one of the IDs to represent the identity of the calling party (see above).

2. Instantiated Universal Data Structure (UDS)

The representation of an instantiated UDS (as defined by the foregoing UDSD) consists of the event value, the component value, and data values. The event value identifies the event represented by the UDS. The component value identifies the component that originated the event, if any. The data value includes the data for the UDS. The UDS consist of normalized data representing or relating to an "event."

The event value identifies which of the n events defined in the UDSD is represented by the UDS. For example, if a call control component makes a translation request to a translation component, the call control component will instantiate a UDS, set the event value to "translation request", set the component value to "call control" (itself), fill the appropriate data values with information to be used for the translation, and relay the UDS to the translation component. Also, the translation component also requires a return address pointer (generated by the call control component, and not part of the UDS) identifying a location (i.e., component) to send the response, if any.

The component value identifies which of the components of the system is originating the event. The component value includes the type of component and an identifier of some sort. For example, if a call control component is making a "translation request" to a translation component, the call control component would set "call control component" as the component type and some unique number for the component identifier. The translation component may treat the request differently than it would if it came from a routing processor. The component value provides components and information on state machines needed to alter functionality based upon from where events originate. In the preferred embodiment, the component value is not used as a return address, but it may be so used.

Data values are the actual values held for data pertaining either to the event represented by the UDS or to the component, system, or sub-space that needs to maintain persistent data of some sort. The number of data values per UDS may range from zero to any finite number.

Figure 4:
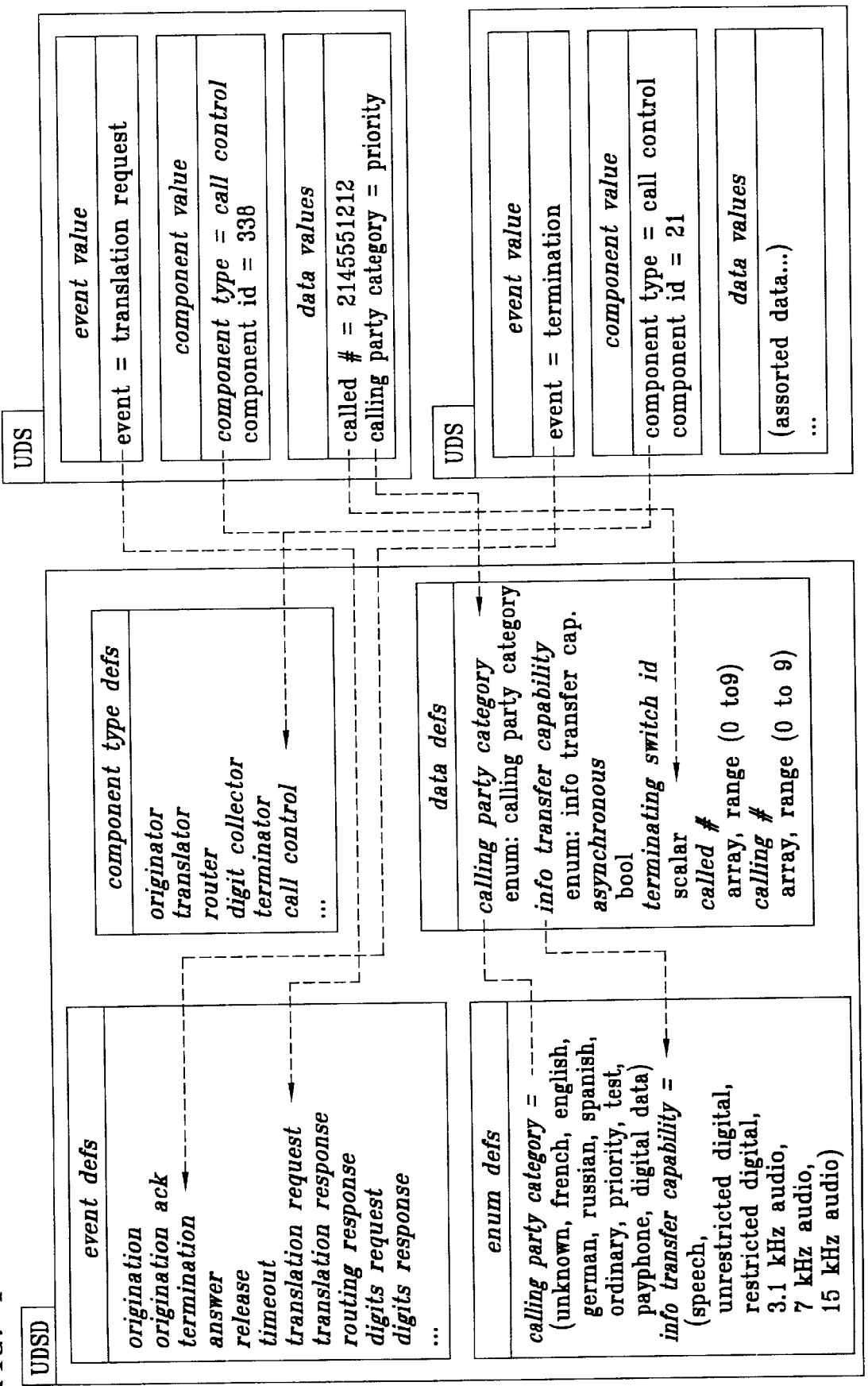
FIG. 4 is a graphical example of the contents of, and relationships between, the UDSD and UDS.

As described above, the UDSD includes event, component type, data and enum definitions which are used to define UDS instantiations. The UDS consists of event, component and data values. Now referring to FIG. 4, there is illustrated a graphical example of the contents and relationships for the UDSD and UDS.

The data storage for one or more UDSs is preferably implemented using pre-allocated memory within the system and the data values of the UDS point to the memory locations that actually store the data. For example, assuming there are N data fields defined in the UDSD, each data value in an instantiated UDS will include block information and byte information which points to a particular block and byte of memory that contains the actual data for that data field. Alternatively, other methods of implementation may be utilized whereby the data values consist of the actual data stored in memory, or a pointer to an address location, etc.

A typical instantiated UDS may be represented in the form (04, 03, 30:block0/byte0,33;block0/byteX,14:block0/byteY, . . . , XX:block0/byteN). Referring back to the definitions above, the foregoing UDS would represent an origination event that was originated from the facilities component, and includes "called number" data residing (or beginning) at memory location block0/byte0, "calling number" data residing at memory location block0/byteX, "calling party category" data residing at memory location block0/byteY, and so on, for the particular data ID numbers associated with the UDS. The UDS may also be represented in serialized form, such as a bytestream, and may include appropriate markers.

A UDS may contain information relating to all, or any number of, data fields defined. In addition, depending on the particular implementation, some of the designated memory locations may contain no information (i.e., a null memory location id may be used).

In the case of a data field being defined as an "enum", the memory location would include data (a number or value) that represents one of the enum values possible for that particular enum. For example, assuming data field identified as "14" is defined as the enum "calling party category", then the memory location block0/byte3 would include a number from "0" to "n" to identify the calling party category data. This is because the system knows, by referring to the UDSD, that data field "14" contains enum data defined by "enum 8" which is defined to represent a plurality of possible data values identified by the ID (see above).

One advantage of the UDS is its optional usage of information protective/hiding features. The ability to set permissions at the event-component-data level allows for information security.

UDS information hiding can be applied to information security on at least two levels; first protecting information from the system and then protecting information from users. In the case of protecting information from the system, events are segregated according to component and data is segregated according to event and component. Especially in service design, it is advantageous for the service designer to know his or her informational limitations; what events and data to which the designer has access in a given component. For example, a facilities call processor should not know the calling card number of the caller, nor should it know what is a Screening Response event. Likewise, a Timeout event should not be able to contain, and thus change, the called number.

In case of user information protection, there may be situations in which information needs to be protected for the user. For example, assume that the system is organized such that an FCP may be shared by two CSPs. On one CSP, there is a regular call feature running (the caller A is a consumer calling proprietor B). On another CSP, a credit card validation service C is connected to perform a purchase transaction, but in such a way that prevents A from getting any information about B's credit card (a private pin number, for instance). If we hide the "PIN" data item from the FCP, then we help prevent the PIN number from being stored in the FCP and thus help to keep it from being transferred easily to caller A's CSP.

This type of information hiding may also be used to minimize the amount of data stored in active memory for a UDS at any given time.

Another unique option is the ability to make use of "private" UDS definitions that are used non-globally by USMs. For instance, a particular Debit Card service may desire to keep track of information that applies only to its service. The Debit Card service provider may submit a "private" UDS definition along with its state machines and activation information. When the service is instantiated, an instance of the private UDS using its private UDS definition is instantiated alongside and is accessed only by that state machine. This helps to keep the global UDS (the main UDS that is necessary to provide inter-component communication) from getting cluttered with information that only applies to certain features in certain components.

C. UNIVERSAL STATE MACHINE (USM)

The Universal State Machine (USM) of the present invention provides a mechanism to dynamically change the way events are handled in the telecommunications system. Events handled or processed by a USM are in the form of a UDS which permits consistent use of call data in call control. The USM is designed to be flexible, and methods are introduced to allow for various types of interaction with other state machines without having to have explicit knowledge of other existing state machines. Special services in a telecommunications environment can be developed using USMs in such a way that a service designer need only have limited knowledge of other state machines that may be operating on the system. A USM resides in a COSMAS Sub-Space (described further below) which handles service triggering and ensures safe USM interaction. In this way a service designer is able to concentrate more on the service defined by the state machine than on how the service may fit into the whole system. Use of USMs provides a convenient mechanism in the sense that a particular service defined by the USM is modular and is easily re-used by other USMs that desire to "reference" or "hook" it.

Differentiation is made between the Universal State Machine definitional (USMD) and instantiated parts (USM). Definitional information is the definition of the state machine itself, including states, transitions, hooks, references to other USMDs, function call references, etc. Instantiated information identifies the USMD associated with the instantiated USM (i.e., a particular instance of state machine) and indicates the status of that particular instance of the state machine. If the USMD of the current USM hooks or references other USMs (each having its own associated USMD), the instantiated USM may include information identifying the hooked/referenced state machine that is active and may additionally identify the status or current state of the hooked/referenced state machine. USMD. However, the latter may not be preferable since the goal is to create a modular design. The USMD and USM are logical separations and do not have to exist in separate structures.

1. Universal State Machine Definition (USMD)

Each USMD defines a state machine. The USMD contains configuration, states and transitions information. The configuration information includes general information about the USMD, such as name, attributes, etc. The states information includes information about the states within the particular state machine defined, including identification, name, etc. The transitions information includes information about transitions within the particular state machine as defined, including name, tail, head, criteria, etc. The following universal state machine definition file format grammar preferably provides an example of the USMD format in accordance with the present invention:

```
Universal         = CONFIGURATION Configuration_
StateMachine::    STATES States_
                  TRANSITIONS Transitions_
Configuration::   = NAME = STRING |
                  CSSD = STRING |
                  ABSORBING = BOOL |
                  ABSORBABLE = BOOL |
                  INTERRUPTABLE = BOOL |
                  REENTRANT = BOOL |
                  SHARED = BOOL |
                  PRIVATEADATA = NUMBER DEFAULT |
                  NUMBER LATEST |
                  NUMBER VERSION NUMBER NUMBER
States::          = [ State ] States | e
State::           = Stateitem State | e
StateItem ::      = NUMBER = NUMBER |
                  LABEL = STRING |
                  TYPE = StateType |
                  REENTRY = ACTIVATE NUMBER |
                  REENTRY = DEACTIVATE NUMBER |
                  SPAWN = STRING NUMBER |
                  HOOKCMD = STRING STATE STRING |
                  HOOKCMD = STRING TRANS STRING |
                  X = NUMBER |
                  Y = NUMBER
StateType ::      = NORMAL | HOOK STRING | REFERENCE STRING
Transitions ::    [ Transition ] Transitions | e
Transition ::     = TransitionItem Transition | e
Transition        = FROMSTATE = NUMBER | e
Item ::           TOSTATE = NUMBER |
                  TYPE = TransitionType |
                  NUMBER = NUMBER |
                  REENTRY = ACTIVATE NUMBER |
                  REENTRY = DEACTIVATE NUMBER |
                  SPAWN = STRING NUMBER |
                  HOOKCMD = STRING STATE STRING |
                  HOOKCMD = STRING TRANS STRING |
                  LABEL = STRING |
                  X = NUMBER |
                  Y = NUMBER |
                  H = NUMBER |
                  W = NUMBER |
                  EVENT = CriteriaMarker NUMBER |
                  ORIGCOMP = CriteriaMarker NUMBER |
                  ORIGCOMPID = CriteriaMarker NUMBER |
                  DATA = { Data } |
                  FUNCTIONS = { Functions }
Transition        = NORMAL | DEFAULT | NULL | HOOK STRING |
Type::            REFERENCE STRING
Data::            = [Datum] Data | e
Datum::           = NUMBER = DONT_CARE |
                  NOT_SET |
                  SET |
                  EQUAL |
```

```
                    -continued

NOTEQUAL |
                    GREATER |
                    LESS |
                    GREATER_EQUAL |
                    LESS_EQUAL |
                    e
DataValue::         = BOOL BOOL |
                    SCALAR NUMBER |
                    ENUM NUMBER |
                    ARRAYLEN NUMBER |
                    ARRAY ( NUMBERLIST )
Functions::         = [ Function ] functions | e
Function::          = NUMBER = ( Function Parameters )
Function            = FunctionParameter FunctionParameters | e
Parameter::
Function            = BOOL NORMAL BOOL |
Parameter::         BOOL DATA UdsId DataId |
                    STRING NORMAL STRING |
                    NUMBER NORMAL NUMBER |
                    NUMBER EVENT_ID UdsId |
                    NUMBER COMPCLASS UdsId |
                    NUMBER COMPIID UdsId |
                    NUMBER DATA UdsId DataId |
                    NUMBER ARRAY_ITEM UdsId DataId NUMBER |
                    ARRAY NORMAL ( NUMBERLIST ) |
                    ARRAY DATA UdsId DataId
UdsId::             = NUMBER
DataId::            = NUMBER
```

© 1997 Northern Telecom Limited

Configuration information consists of the name of the state machine, function set, and other attributes indicating how the state machine interacts with other state machines. The function set identifies the function set that is used by the state machine.

Every USMD in the system has a unique name that may include versioning information. The name serves as an identifier and as such may be a number, name, version information, symbol or some combination thereof.

The function set indicates which function set applies to this USMD. When a designer is creating a USMD, the designer needs to know which functions are callable by the USMD. The functions themselves are called within the system by the state machines via state machine interpreters and are system dependent. However, interface information is provided, and the designer must indicate which interface was used in the design. Generally, the function set corresponds to a particular function set defined for the COSMAS Sub-Space definition containing the USMD. The function set part of the configuration information consists of the function set name and/or ID.

Each USMD has certain attributes which help to define how it is to interact with other USMDs. These attributes include information as to whether the USMD is absorbing (the USMD can absorb other USMDs), absorbable (the USMD can be absorbed by other USMDs), interruptable (the USMD can be interrupted), or shared (the USMD may be shared between contexts in a component). These attributes are described in detail below.

These attributes are important when there is interaction among state machines. In telecommunications, this is especially important in cases of call merge and split. Attributes may be altered or changed dynamically at run time (i.e. dynamically programmable). Preferably, attributes are altered or changed dynamically by adding these attributes to the USMD whereby the attributes are set or unset according to the definition. Alternatively, a sub-space function call may be used. For example, the CSP may have a function called "Set USM Attribute" that takes an attribute id and a boolean value for setting that attribute. The function call will be initiated and called by the state machine upon a transition of the state machine (e.g., the USMD is defined to perform this function upon a transition. One reason for implementing dynamic changing of attributes is to provide protection for critical points within a state machine during which a state machine may desire to have the ability to refuse to be eliminated or interrupted.

Absorbable: If a given state machine is absorbable, then the given state machine may be "commanded" by another state machine to exit. For example, in a call merge there is generally one side of a call that attempts to merge the other. Each side of a call has its own state machines, and if a merge occurs, there may be no reason to maintain all of the state machines from both sides of the call. Those state machines of one side of the call which are merged and marked "absorbable" will be exited (or deleted). Those state machines not marked "absorbable" are not removed and remain active, being utilized with the merging side of the call. Accordingly, the state machine designers may utilize this attribute when designing USMDs. Preferably, the default value for this attribute is "true". The term "commanded" may mean that another state machine actually commands the given state machine to exit. This term may also mean that when a conflict arises, the system examines the attribute information to determine the position (or state) of each state machine and whether or not a command to exit is appropriate for the state machine. The attribute, therefore, provides an implicit command.

Absorbing: If a given state machine is absorbing, then the given state machine may "command" another state machine to exit. In the case of a call merge (see above), the merging state machines are in the command position and will implicitly command the merged call state machines to exit only if the merging state machines are absorbing. If the merging state machines are not absorbing, then control may transfer to the absorbing state machines in the merged call.

Interruptable: A given state machine is interruptable when the given state machine may be put on "pause," thereby maintaining its current state and waiting to be reentered at a later time. There may be a case in which another state machine may be in a position to absorb a call temporarily, during which time it may be more appropriate to simply put an absorbed state machine "on hold" until the absorbing state machine is done processing, rather than allowing the to-be-absorbed state machine to be consumed altogether. The last state of the interrupted state machine is kept for reentry, and interrupted state machine may be taken off hold directly or as a result of some other occurrence such as the releasing of a temporarily-absorbing state machine.

Shared: A given state machine may be shared between contexts. A given component in the system may have different contexts of state machines for different components to which the given component may be connected or communicating. It may be desirable to share some state machines between such contexts. For example, a CSP may keep track of some number of other CSPs for one "call" in which it is involved, as well as other CSPs for another "call" in which it is involved. The CSP will keep different contexts for both calls and require its own unique state machines. However, call services may be split in such a way that the CSP will have state machines that control the context switching or provide a more base-layer of call service that is common to both calls.

States information includes information as to the type of state for a particular state within the USMD. The types of states include entry, exit, reentry and regular states. An entry state defines a starting point and an exit state defines the ending point. A reentry state is optional and defines a reentry point (only used after state machine has been started). A regular state defines regular states in the state machine.

Entry, exit, and reentry states are included in every USMD. Every state machine must have an entry point and an exit point. A reentry state is optionally added to allow for interrupts internal to the state machine once the state machine has started. For example, a desired function in the state machine may include, "if at any point HardwareFailure event occurs, then exit". The only restriction to these states with respect to transitions is that no transition may come from the exit state. These states may optionally contain condition information as described below with reference to the regular states.

Regular states are defined and contain at least the following information, either explicitly or implicitly: ID, name (optional), type indicator, hook information (if a hook), reference information (if a reference), and verification condition information (optional). Whether or not hook and/or reference information is present in the data structure used to represent a state depends on the desired functioning of the USMD.

The ID and name are used to identify a particular state. The addition of a name may be useful to the state machine designer.

The type indicator indicates the state type: normal, hook, or reference. The hook information is utilized when the state type is a "hook," and likewise the reference information is used when the state is a reference, as indicated by the type. If a state is normal, then no additional information need be associated with the state. If the state is a hook, then other state machines (or an event processor) may be dynamically "hooked" into the state. If a state is a reference, then another state machine (or an event processor) is called whenever that state is reached.

Verification conditional information may be optionally defined for each state and may be utilized for checking the integrity and interaction of a state machine before deployment (be it as an interpretive script or generated code such as C). This sort of conditional information includes pre-condition information and post-condition information. Pre-condition information indicates the conditions to meet before any transitions are traversed to the associated state. This may include information like, "data item X is greater than 'n' and less than 'm'", or "data item X is not in use by any prior state machine in the current sub-space instantiation". Post-condition information indicates what conditions are expected to be true if the given state is reached.

Transition information identifies, either explicitly or implicitly, the tail and head states, and includes information about transition type, transition criteria, and function calls. The tail state is defined as the "from" state while the head state is defined as the "to" state. Transition type information describes the particular type of transition. Transition criteria includes the criteria to pass in order to traverse transition, if applicable. Function calls identifies the functions to call (i.e., perform) upon transition, if applicable.

Tail state is the state from which the transition begins, and head state is the state to which the transition ends. References to states could be in the form of state name, ID, or some other form of reference. In any case, references to the "from" and "to" states are given in the transition.

A transition may be one of five types: normal, default, null, hook or reference. A normal transition generally requires the occurrence of an event in order to be traversed. Criteria for the transition must be met by information related to the event. A default transition also requires an event, but is not considered for traversal unless none of the normal or null transition criteria are met. Additional checks for criteria may be provided in a default transition, allowing for there to be more than one default transition per state. A null transition may or may not require the occurrence of an event. It is provided for initialization and logical separation of portions of a state machine. When the transition is a hook or reference, it is important to have some default behavior. Moreover, a transition may be marked thereby indicating that the criteria may be changeable. That is, the state machine definition may be used as a template when designing other state machine definitions with the criteria modified by the designer.

Transition criteria specifies the information to check for in the contents of a UDS representing an event. Items that can be checked include event type, component type, component ID, and data item values. Criteria can be specified as a logical statement combining the traditional logical operators: AND, OR, NOT; and/or the traditional comparison operators: GREATER THAN, LESS THAN, EQUAL, etc.

Additional transition criteria may also be provided that include additional functions. These criteria may include "EventIsSet( )" that returns true if the event value has been set, "ComponentIsSet( )" that returns true if the originating component value has been set, and "DataIsSet(x)" that returns true if value of data item x has been set. Also, additional functions may include "Event( )" that returns the event value, "Component( )" that returns the originating component value, "Data(x)" that returns the data value for data item x, "ArrayCount(x)" that returns the count value of the array value designated by data id x, and "Value Valid(x, a)" that returns true if "a" is a valid value for data item x according to definition.

As will be appreciated, the naming of these functions/operations may be dependent on the desires of the designer. Names described herein are for illustration purposes. Optionally, the negative versions of the functions may be utilized wherein, for example, a function DataIsNotSet(x) could easily serve the same purpose as DataIsSet(x) for determining whether or not the value of an item in the UDS event has been set. Furthermore, error conditions for these functions may be handled at the discretion of a person skilled in the art.

The exact form of representation, and whether or not all logical operators are available, for the logical statements is design-specific and within the realm of a person of ordinary skill in the art. Such a person may desire to model the logical statements after Pascal syntax and exclude the logical operator OR since OR may be captured implicitly by using many transitions, or may add other operators and functions.

Now referring to FIG. 5a, there is illustrated a graphical example of an generic call model using a hook state. A state machine (USMD) 500 includes an entry point or state 502, a pre-translation state 504, a screening state 506, a translation state 508, a routing state 510, a termination state 512, and an exit point or state 514. As the state machine 500 proceeds in accordance with its functionality and enters the screening state 506, hook information relating to the screening state 506 directs an event or events to be re-routed to an event processor 516. The event processor 516 then processes the event(s) for the screening state. Upon completion of its processing (or if some type of interrupt occurs), the event processor 516 returns control to the state machine 500.

An "event processor" is defined as a hardware or software component that either performs a function or activates (initiates or runs) a state machine (i.e., an instantiated USM) in response to a data message (usually in the form of a UDS representing an event). A USM with a "hook" will hook an "event processor" that will perform a function or activate a state machine. If another state machine is hooked, the hooked state machine may be referred to as a hooked USM.

In the preferred embodiment, if the event processor is to perform that function that is not necessarily a state machine, then the event processor should "act" like a state machine. To "act" like a state machine, the event processor receives a UDS as input and then returns status information (i.e., "complete," if the state machine or function is completed) either in the form of a UDS or simply a value or data indicating the status of the state machine or function. This is generally required because a hook or reference involves relinquishing processing control to the event processor.

Hook information is simply a name (or ID) that is unique within the set of hook names given to regular states in the given USMD. If a state is a hook, then an event processor may be "hooked" into the state at instantiation time which is done dynamically at run time with a hook command. For example, if a designer wants to create a generic call model, he or she can place hooks in the call model into which event processors are placed. There may be hooks for the following: pre-translation, screening, translation, routing, termination, debit card calling, etc. Upon instantiation of the state machine, it may be given information of the sort "hook event processor named MyScreener into your hook named 'screening'". During processing, when the call transitions to the 'screening' state, the generic call model relinquishes event handling control to the MyScreener processor 516 until MyScreener processor 516 delivers it back. Likewise for other hook cases. This makes for good dynamic polymorphism, where a single USMD may be implemented many different ways via changes in what is hooked into hook.

Figure 5C:
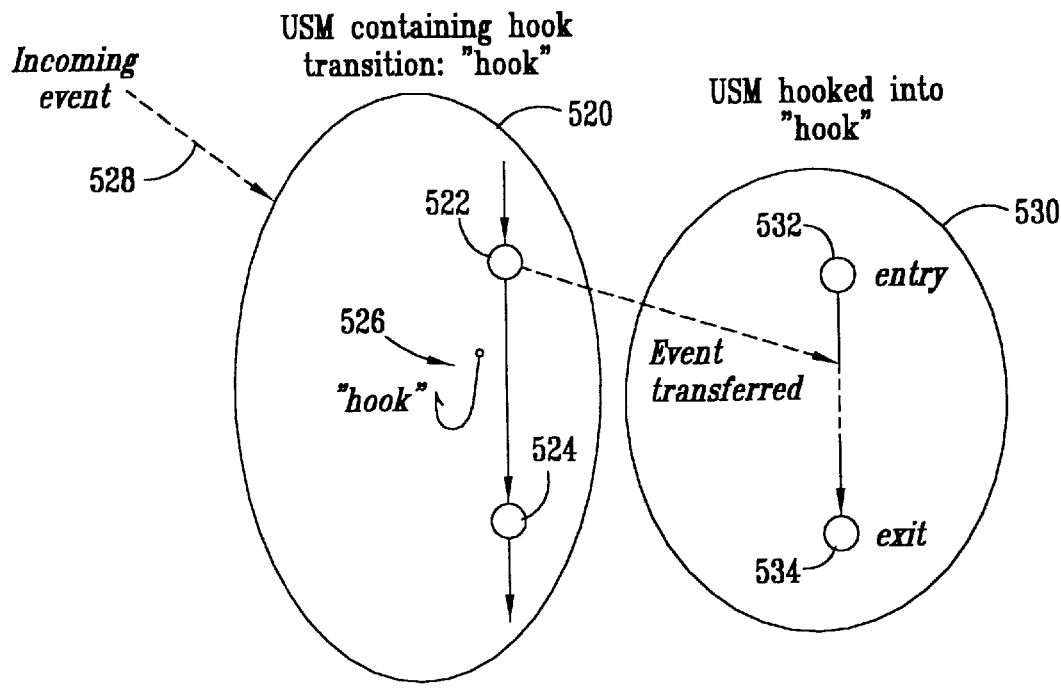
Figure 5D:
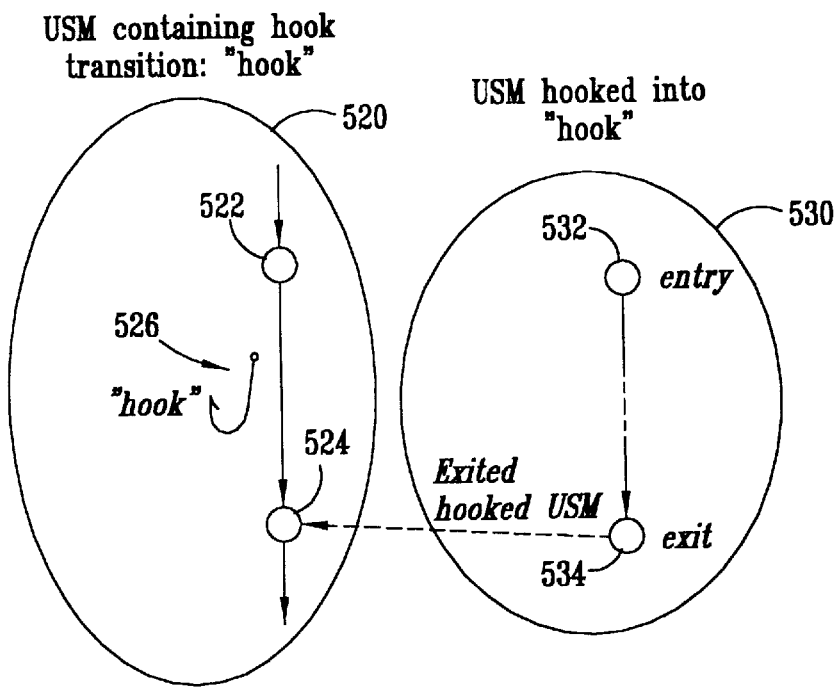

Different types of hooks may be utilized and designed into a state machine. One type of hook is defined as a "transition hook". A transition hook is used to hook an event processor while traversing from a first state to a second state. Now referring to FIGS. 5b thru 5d, there is illustrated a graphical representation of a transition hook. A state machine 520 includes a first state 522, a second state 524, and a transition hook 526 for "hooking" a state machine 530 when the hooking transition is met. FIG. 5b shows that the first state 522 of the state machine 520 has been reached. The state machine 520 remains at this state until a particular event is received. Now referring to FIG. 5c, a particular incoming event 528 in the form of a UDS event is received (the transition hook is waiting for this event in order to "hook"), the state machine 530 is "hooked," and the UDS is routed (or relayed) to the hooked state machine 530 for processing. The hooked state machine 530 typically includes an entry point (state) 532, one or more regular states (not shown), and an exit point (state) 534. Now referring to FIG. 5d, the hooked state machine 530 is processed until the exit state 534 is reached (or until some type of interrupt is received, such as a failure, etc.). Upon reaching the exit state 534 (or when the desired processing is completed by the hooked state machine 530), the hooked state machine 530 is exited, control (or processing) is returned to the original state machine 520, and the current state of the state machine 520 is now the second state 524.

Figure 5E:
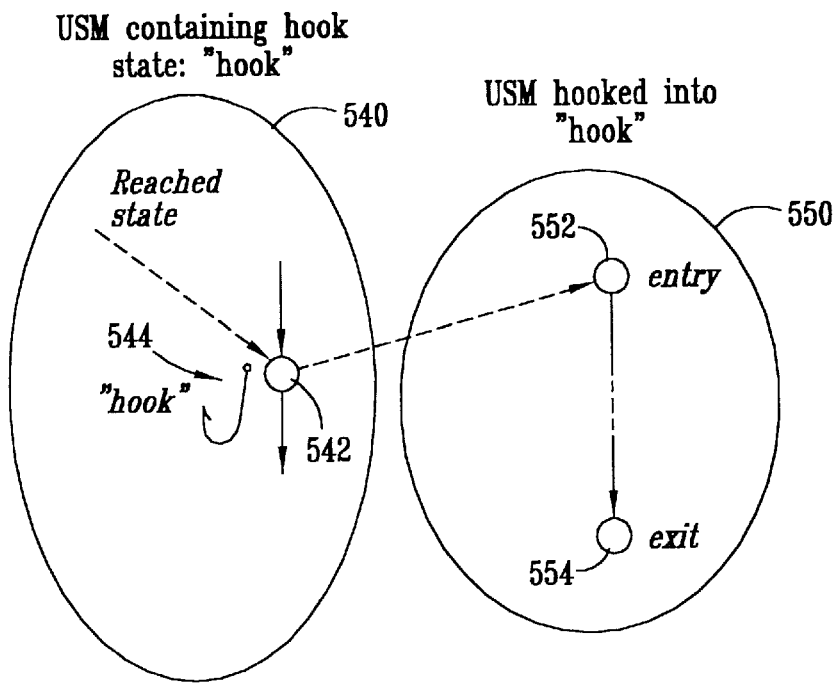
FIGS. 5e thru 5f illustrate in graphical representation a state hook.
Figure 5F:
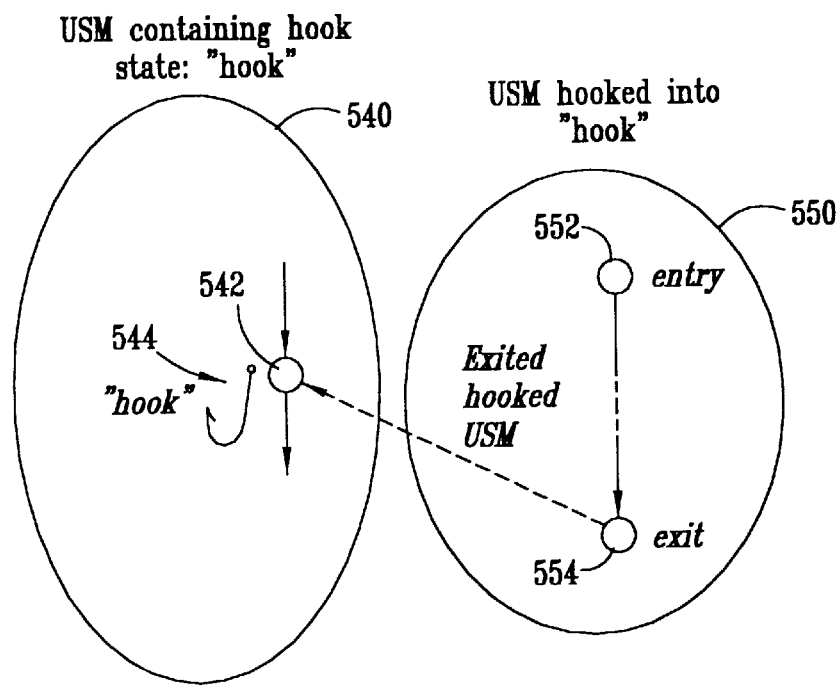

Another type of hook is defined as a "state hook". A state hook is used to hook an event processor when a state is reached. Now referring to FIGS. 5e thru 5f, there is illustrated a graphical representation of a state hook. A state machine 540 includes a state 542 and a state hook 544 for "hooking" a state machine 550 when the state 542 is reached. FIG. 5e illustrates that the state 542 of the state machine 540 has been reached. Once reached, the state machine 550 is hooked and processing continues in accordance with the hooked state machine 550. The hooked state machine 550 typically includes an entry point (state) 552, one or more regular states (not shown), and an exit point (state) 554. Now referring to FIG. 5f, the hooked state machine 550 is processed until the exit state 554 is reached (or until some type of interrupt is received, such as a failure, etc.). Upon reaching the exit state 554 (or when the desired processing is completed by the hooked state machine 550), the hooked state machine 550 is exited, control (or processing) is returned to the original state machine 540, and the state machine 540 remains in the state 542.

Figure 6:
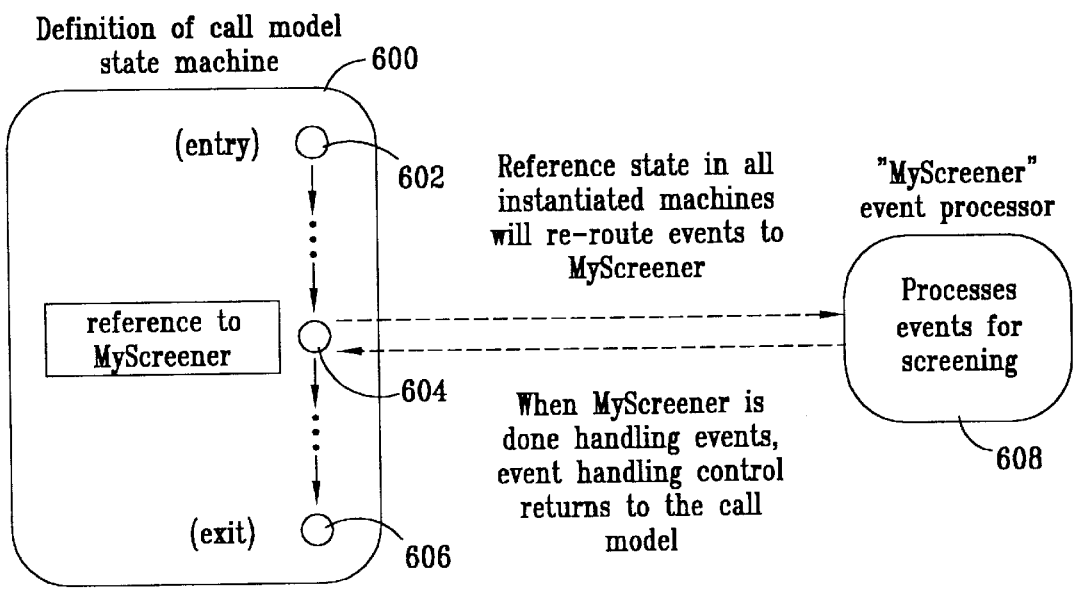
FIG. 6 presents an example of a call model definition (state machine) using a reference state.

Now referring to FIG. 6, there is illustrated an example of a call model definition (state machine) using a reference state. A state machine (USMD) 600 includes an entry point or state 602, a state (reference state) 604, and an exit point or state 606. As the state machine 600 proceeds in accordance with its functionality and enters the state 604, reference information relating to the state 604 directs an event or events to be re-routed to an event processor 608 specified by the definition. The event processor 608 then processes the event(s) for the state 604. Upon completion of its processing (or if some type of interrupt occurs), the event processor 608 returns control to the state machine 600.

Reference information (part of the USMD) is described as more of a hard-coded reference to an event processor. The designer may desire to utilize a particular event processor for the "screening" portion of the call model and hook an event processor called Screener into the appropriate place. Referencing decreases the re-usability of the USMD being designed but is convenient when the designer desires to place strict restrictions on what is called (or referenced), or when the designer has knowledge of what is needed at the given point in the state machine.

Figure 15:
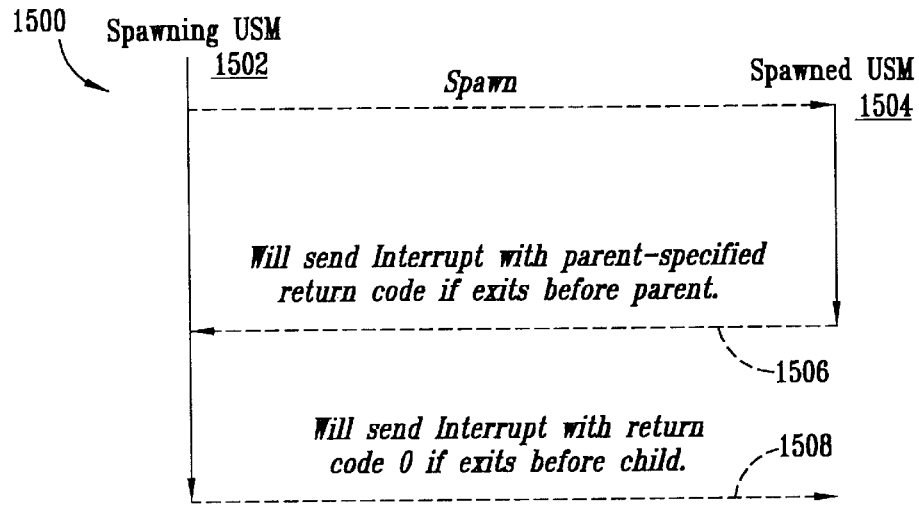
FIG. 15 illustrates a flow diagram of a typical spawning USM and spawned USM.

In addition to "hooked" and "referenced" event processors (including state machines), a state machine may also generate or "spawn" another state machine (sometimes referred to as a "spawned" or "child" state machine). Now referring to FIG. 15, there is illustrated a flow diagram 1500 of a state machine 1502 spawning another state machine 1504. The spawning state machine 1502 processes in accordance with its functionality and reaches a point where it generates or spawns the spawned state machine 1504. Spawning occurs upon reaching or leaving a state, or from a transition. After spawning, the spawning state machine 1502 continues processing in accordance with its functionality and the spawned state machine 1504 begins processing in accordance with its own functionality. When the spawned state machine 1504 completes processing and exits (or receives some sort of external interrupt) before the spawning (parent) state machine 1502 terminates its processing, an interrupt 1506 is sent to the parent state machine 1502 with parent-specified return information. If the parent state machine 1502 completes processing and exits (or receives some sort of external interrupt) before the child state machine 1504 terminates its processing (or exits), an interrupt 1508 is sent to the child state machine 1504 with return information. The interrupt may be in the form of a UDS.

A debit card calling state machine would be an example of a type of state machine that may spawn another state machine. For debit card calling, a caller is allowed a predetermined amount of time for long-distance calling depending on the amount of pre-paid time purchased by the caller. For example, assuming the debit card calling state machine is activated, it will spawn a state machine that invokes a timer that times the amount of time the caller is connected to another party and reduces the amount of time available for the caller accordingly. If the caller runs out of time during the call, the spawned state machine (timer) will exit (i.e., completion) and send an interrupt to the debit card calling state machine (parent) and the appropriate action will be taken (most likely disconnect). If the caller disconnects before running out of time, the debit card calling state machine (parent) will send an interrupt to the spawned state machine informing it that the caller has disconnected and appropriate action may be taken (e.g. amount of time actually used may be sent to billing to reduce the caller's remaining debit card time).

Figure 7A:
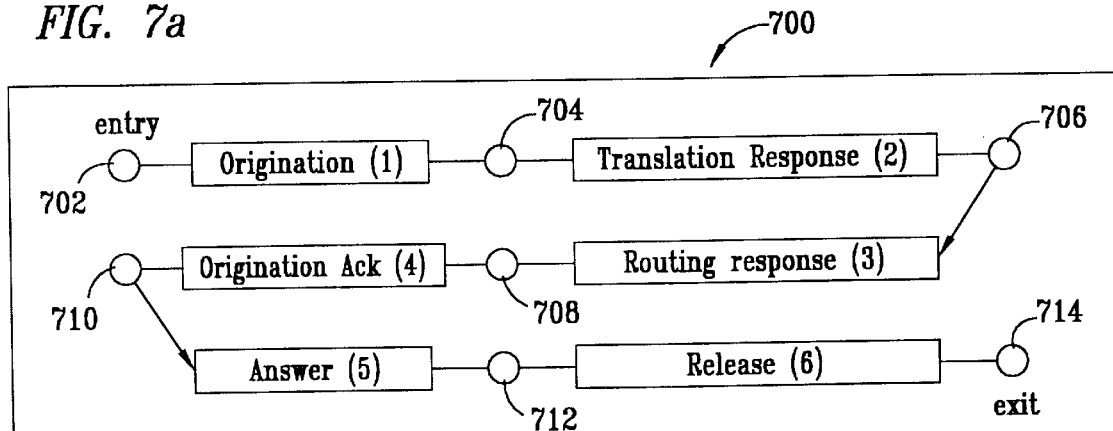
FIG. 7a presents a simplified diagram of a 1-800 originating call model state machine example showing transition criteria.

Now referring to FIG. 7a, there is illustrated a simplified diagram example of a 1-800 originating call model state machine 700 showing transition criteria. The state machine 700 waits for an Origination event (transition criteria) having a called number that is ten (10) digits long and begins with the number sequence "800". Upon receipt of the proper Origination event, the state machine 700 transitions from an entry point (state) 702 to a state 704. The state machine 700 remains at the state 704 until a positive Translation Response is received and then transitions from the state 704 to a state 706, remains at the state 706 until a positive Routing Response is received and then transitions from the state 706 to a state 708, and so on, as illustrated in FIG. 7a. At some point, a Release event will occur to end the call and transition to the exit state 714 for exiting the state machine 700.

The state machine must be able to perform (or initiate) actions or functions. Each state machine is associated with a particular function set that corresponds with the functions or actions that may be called or performed by the component (i.e. processor) within which the state machine runs. A state machine that handles call protocol states will, most likely, call functions different from those called by a call service state machine. Each component has a function set that includes functions performable by the component. The function set includes an interface definition that defines the functions ids and parameter (and types) for each function within the set.

A function call specifies values to pass to functions defined in the function interface, as with any function call. A function call consists of the function ID and/or name and function parameter values. The function set name/ID is already known as part of the USMD configuration. Now referring to FIG. 7b, there is illustrated the simplified diagram example (shown in FIG. 7a) of the 1-800 originating call model 700 showing function calls. The function calls are written in high level pseudocode to indicate the functions that are called if the respective transitions are traversed.

As will be appreciated, a state machine defined by a USMD is a finite state machine, but may be programmable with the use of hooks and references.

2. Instantiated Universal State Machine (USM)

Instantiation refers to a specific instance of a state machine, the state machine being defined by the USMD. In this regards, an instantiated universal state machine in accordance with the present invention is referred to as a USM. The functioning of a particular USM depends on how it is defined in the USMD. Instantiation information indicates where the current instantiation is in the state machine, or, if the state machine hooks or references other event processors, which event processor is currently handling events. An instantiated USM is a data structure (consisting of data) that includes a pointer to a state machine (defined by the USMD), and includes other information as described below. The USM may also be said to be a particular instance of the state machine defined by the USMD.

Each instantiated USM is associated with a specific USMD. Each instantiated USM may differ in functionality if the USMD contains hooks. Hooks do not have to be filled. If a USMD contains hooks or references, then it may be advantageous, in some instances, to make sure the respective event processors can be instantiated (or connected to) before allowing the state machine to continue.

Now referring to FIG. 8, there is illustrated an example of a USMD 800 and examples of three different instantiated USMs 810, 812, 814 each containing a hook to a processor (either 820, 822, or 824). The USMD "MyStateMachine" 800 includes an entry state 802, an exit state 806, and at least one additional state 804 which is a hook called "MyHook". The first, second and third instantiations (USM) 810, 812, 814 of the state machine 800 hook the "EventProcessorX" 820, the "EventProcessorY" 822, and the "EventProcessorZ" 824, respectively, into the "MyHook" hook. The instantiation of a USM and the determination of what function (or component) is hooked into the USM is determined by the COSMAS Sub-Space (CSS) through a mapping process. The CSS and how it handles and performs instantiation are described later.

Figure 9A:
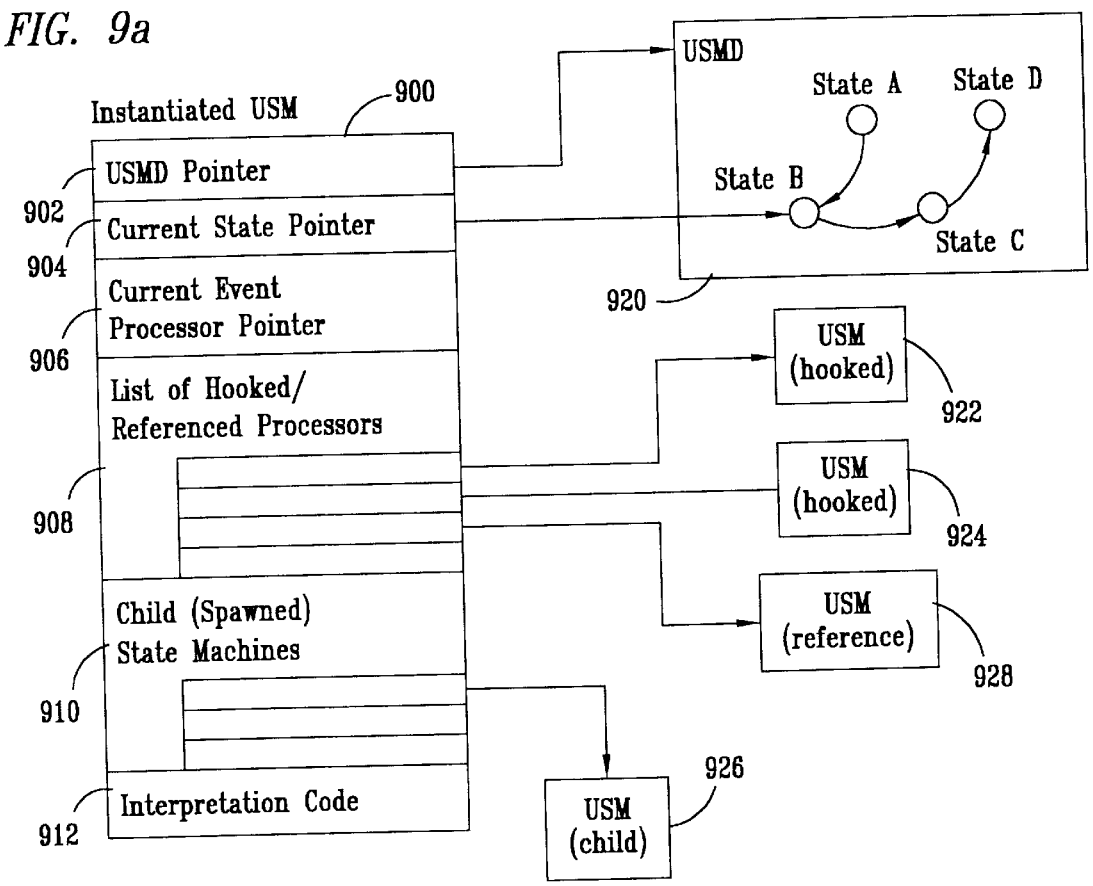
FIG. 9a illustrates the contents of an instantiated USM.

A USM instantiation includes a USMD reference or pointer, a current state indicator, a current event processor indicator, an optional list of event processors, a list of spawned child state machines (other USMDs), and may include a portion of the USM interpretation algorithm (see FIG. 9a). The USMD pointer identifies the state machine (as defined by the USMD) associated with the instantiated USM. The current state indicator indicates which state (of the state machine) is the current state. This may be designated by the state ID or name.

The current event processor indicator identifies which event processor is currently handling events. A specific value is reserved to indicate that the current event processor is the state machine itself. Otherwise, the value of the current event processor indicator is the ID or name of an event processor in the event processor list (described below), or a pointer to an object of base class "EventProcessor", or some other form of indicator. Typically, there should be at most one event processor handling events in any given state machine. However, event processors called by a state machine may call other event processors.

The list of hooked or referenced event processors may be organized in different ways, but the list includes hooked or referenced processors that are called, or may be called, within the state machine of the instantiated USM. The hooked or referenced event processor, if a state machine, may be instantiated when processing of the instantiated USM reaches the hook or reference state, or alternatively, pre-instantiated when the USM is first instantiated (i.e. instantiated at or near time of instantiation of the hooking or referencing USM). When the event processor is a distributed object of some sort, it may attempt to establish communications before the state machine begins and generate an error if it cannot.

An instantiated USM may also include information identifying or pointing to other instantiated USMs (instantiated child state machines) that have been spawned by the current instantiated USM. Some service applications may include an additional state machine (child) that runs concurrently with the main state machine (parent) in response to certain criteria.

Optionally, the instantiated USM includes software code for interpreting the particular state machine (USMD) associated with the instantiated USM. The interpretation code determines whether an incoming event matches the criteria of any of the transitions from the current state, returns an indication of its progress (including exit status), updates the current state of the USM, and handles spawning, reentry activation, and hook commands.

Now referring to FIG. 9a, there is shown an example, in block diagram form, of an instantiated USM 900 illustrating its contents. The USM 900 includes a USMD pointer (or indicator) 902, a current state indicator (or pointer) 904, a current event processor indicator (or pointer) 906, an optional list of hooked/referenced event processors 908, a list of spawned child state machines (other USMDs) 910, and optional interpretation code 912. The USMD pointer 902 contains information that identifies or points to the USMD (state machine) associated with the USM. The current state indicator 904 indicates the current state of the USMD (state machine). The current event processor indicator 906 indicates which processor is currently processing events (the state machine itself or another processor). The list of hooked/referenced processors identifies or points to other processors (hooked or referenced) while the list of child state machines identifies or points to other USMs spawned). As will be appreciated, interpretation code may reside in the instantiated USM, the COSMAS sub-space associated with the USM, or a separate software module, or any combination thereof. The interpretation code simply runs/processes the state machine.

For example, and as depicted in FIG. 9a, the USMD pointer 902 is shown pointing to a USMD 920 and the current state indicator is shown pointing to a State B of the USMD 920. Similarly, a first USM (hooked) 922, a second USM (hooked) 924 and a USM (referenced) 928 are all pointed to (or identified) by the information in the list of hooked/referenced processors 908, and a spawned USM (child) 926 is pointed to (or identified) by information in the list of child state machines 910. As will be appreciated, the hooked and reference USMs 922, 924, 928 illustrated in FIG. 9 may alternatively be event processors that perform the desired function, and therefore, not necessarily USMs.

Figure 9B:
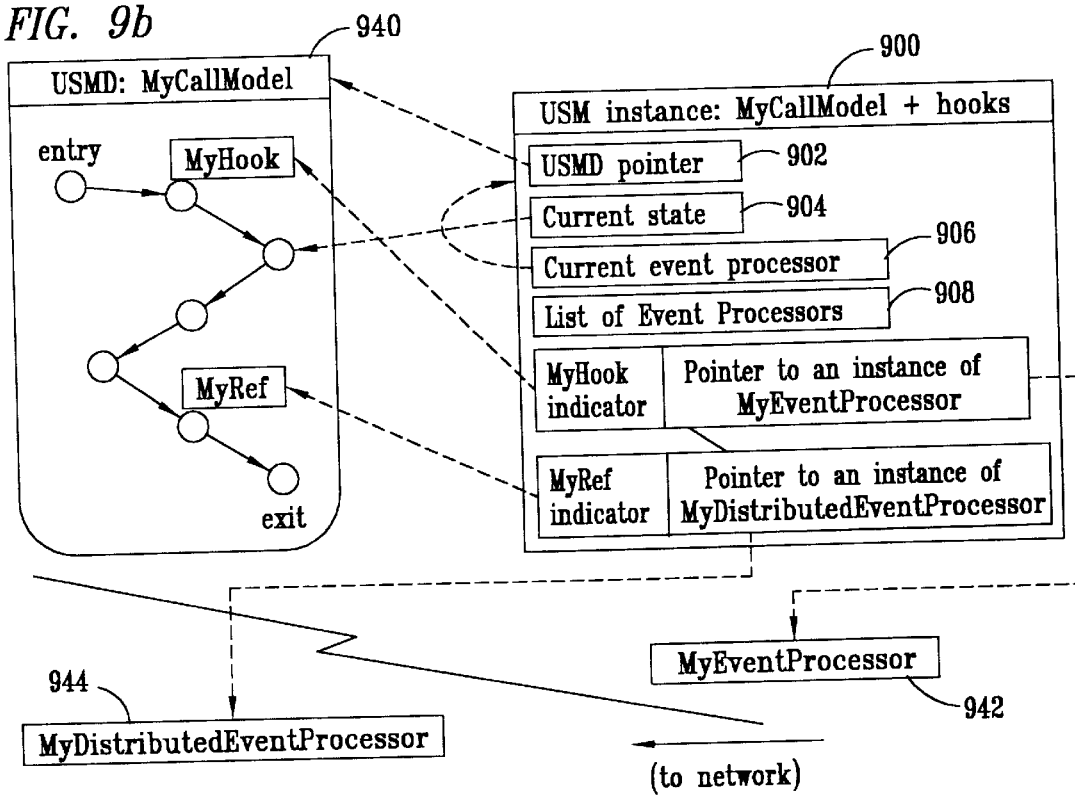
FIG. 9b is a more detailed logical relational view of an instantiated USM and associated USMD.

Now referring to FIG. 9b, there is illustrated a more detailed logical relational view of an exemplified instantiated USM. The dashed lines represent some sort of indicator, whether it be a name, ID, pointer, or some other type. In FIG. 9b, there is a USMD 940 for a state machine called "MyCallModel" that provides the template (or definition) for the corresponding instantiation. The USMD 940 contains a hook state labelled "MyHook" and a reference state labelled "MyRef". The state machine shown is instantiated with an event processor 942 hooked into "MyHook" and the "MyRef" state associated with a pointer to an event processor 944.

A particular USM may either be interpreted, or compilable code may be generated from it. The present invention includes an interpreter that receives events and utilizes the USM to determine what to do with the events. If compilable code is used, the functionality of the interpreter may be used as a template, and so any functioning of a USM can be defined in terms of interpretation with the underlying assumption that any interpreted instance of a USM can be translated into any common language such as C or Pascal for execution.

The interpreter accepts events, utilizes the instantiated USM to determine what to do with the events, and performs functions and/or relays function information to the COSMAS Sub-Space (described later) and possibly subsequently to a component for execution. The interpreter runs the state machine.

The interpreter takes a UDS event as input and returns its status, including whether or not the state machine has reached its exit state (for the COSMAS Sub-Space). The USM or event processor (as indicated by variables in the USM) indicates that certain functions need to be performed. The interpreter executes these functions immediately, or, since many states may be traversed as the result of a single event, the interpreter caches all the functions until it is done processing the one event before executing them. Additionally, functions may be executed directly by the interpreter or via its parent COSMAS Sub-Space or by the component. As will be appreciated, the interpreter preferably consists of software with a portion thereof included within, and executed as part of, the instantiated USM. The remaining portion of the interpreter is included within, and executed as part of, the instantiated COSMAS Sub-Space or component. Alternatively, the interpreter may reside functionally wholly within, and executed as part of, the instantiated USM, the instantiated COSMAS Sub-Space, or some other functional component of the system, or combination thereof.

The following pseudocode exemplifies a basic algorithm/procedure for interpreting a USM. Typically, assume that the interpretation algorithm is entered at "main" upon receiving an event. Process return values include (1) processing ok (event was processed; processing normal), (2) no transition (no transitions were traversed in the state machine; event was ignored), and (3) exited (the state machine was exited). Each return value also contains a modifier expressing whether or not the event was consumed.

USM INTERPRETATION ALGORITHM

```
main:
if currently processing an event
    queue event
otherwise
    for every state machine in the sub-space
        process event
        if exited
            remove state machine from sub-space
        if event was consumed
            break out of for loop
    perform functions returned from state machines processing event
    process queued events
process event:
process reentry transitions
if no transition
```

-continued

USM INTERPRETATION ALGORITHM

```
    process hooks and references
    if no transition
        process normal transitions
        if no transition
            process default transitions
return process return value
do transition:
set return value to false
set process null transitions flag to false
if transition type is hook or reference
    if get hooked/referenced state machine
        set hooked/referenced state machine as a current state machine
        process hooks and references
        if processing ok
            set current state id to the to-state of the given transition
            set return value to true
        otherwise if exited
            set current state id to the to-state of the given transition
            set return value to true
            set process null transitions flag to true
otherwise if transition type is normal default or null
    if event possesses transition criteria
        if processing reentry flag is true and to-state of the given transition is flagged
        to say in current state
            do not change the current state
        otherwise
            change current state to the to-state of the given transition
        add the given transition's functions to the function list
        set the return value to true
        set the process null transitions flag to true
if return value is set to true
    if the given transition or new state indicates to activate any reentry transitions
        activate the indicated reentry transitions
    if the given transition or new state indicates to spawn any other state machines
        spawn the indicated state machines
    if the given transition or new state indicates to hook/reference any other state machines
        hook/reference the indicated state machines in the given places
if process null transitions flag is true
    process null transitions
return return value
process default transitions:
for each default transition from current state
    if do transition
        if at exit state
            return exited
        otherwise
            return processing ok
return no transition
process hooks and references:
if state machine is currently hooked/referenced in
    have that state machine process the current event
    if processing ok
        return processing ok
    if no transition
        release hooked/referenced state machine
        return to current state in this machine
        return to transition
    if exited
        release hooked/referenced state machine
        return to current state in this machine
        process null transitions
        if processing ok or no transition
            return processing ok
        if exited
            return exited
return no transition
process normal transitions:
for all normal transitions from current state
    if do transition
        if at exit state
            return exited
        otherwise
            return processing ok
return no transition
process null transitions:
for all null transitions from current state
    if do transition
```

-continued

| USM INTERPRETATION ALGORITHM |
|---|
|           if at exit state<br>               return exited<br>           otherwise<br>               return processing ok<br>   return no transition<br>   process reentry transitions:<br>   set processing reentry flag to true<br>   for all active reentry transitions<br>       if do transition<br>           if at exit state<br>               set processing reentry flag to false<br>               return exited<br>           otherwise<br>               set processing reentry flag to false<br>               return processing ok<br>   set processing reentry flag to false<br>   return no transition |

© 1997 Northern Telecom Limited

In the preferred embodiment, the "process event" function of the "main" algorithm is performed as part of the USM, the code section identified as starting with "for every state machine in the sub-space" in the main algorithm is performed as part of the Sub-Space, and the remainder of the main algorithm is performed by the component.

Resolution of hooks and references and whether or not they are resolved by the USM interpreter or the COSMAS Sub-Space is implementation dependent. If any event processing results in the indication that functions should be called either by traversing a transition or via feedback from an event processor, then whether or not the functions are processed immediately, cached and processed at the end of the event processing cycle, or processed some other way is also implementation dependent. It is suggested that functions should not be cached over more than one event processing cycle. Hook resolution, reference resolution, and functions processing are implicit in the above algorithm.

D. CONCURRENT STATE MACHINE SPACE (COCMAS) SUB-SPACE

Differentiation is made between the Concurrent State Machine Space (COSMAS) Sub-Space definitional (CSSD) and instantiated (CSS) parts. Definitional information is the definition of the sub-space, including a set of USMDs, instantiation decision information (mapping), and a function set interface definition. Instantiated information is the generation of a COSMAS Sub-Space (CSS) that contains one or more instantiated USMs for processing. The CSS is generated in response to an event. The CSSD and CSS are logical separations and do not have to exist in separate structures.

1. COSMAS Sub-Space Definition (CSSD)

A COSMAS Sub-Space Definition (CSSD) is provided for each component that runs state machines within the system. A CSSD includes three major components: a set of USMDs (i.e. a set of state machines), a mapping definition, and a function set interface definition. The mapping definition contains information and related data for instantiating appropriate USMs in response to UDS information (from a UDS) and the set of USMDs in the CSSD.

Figure 10:
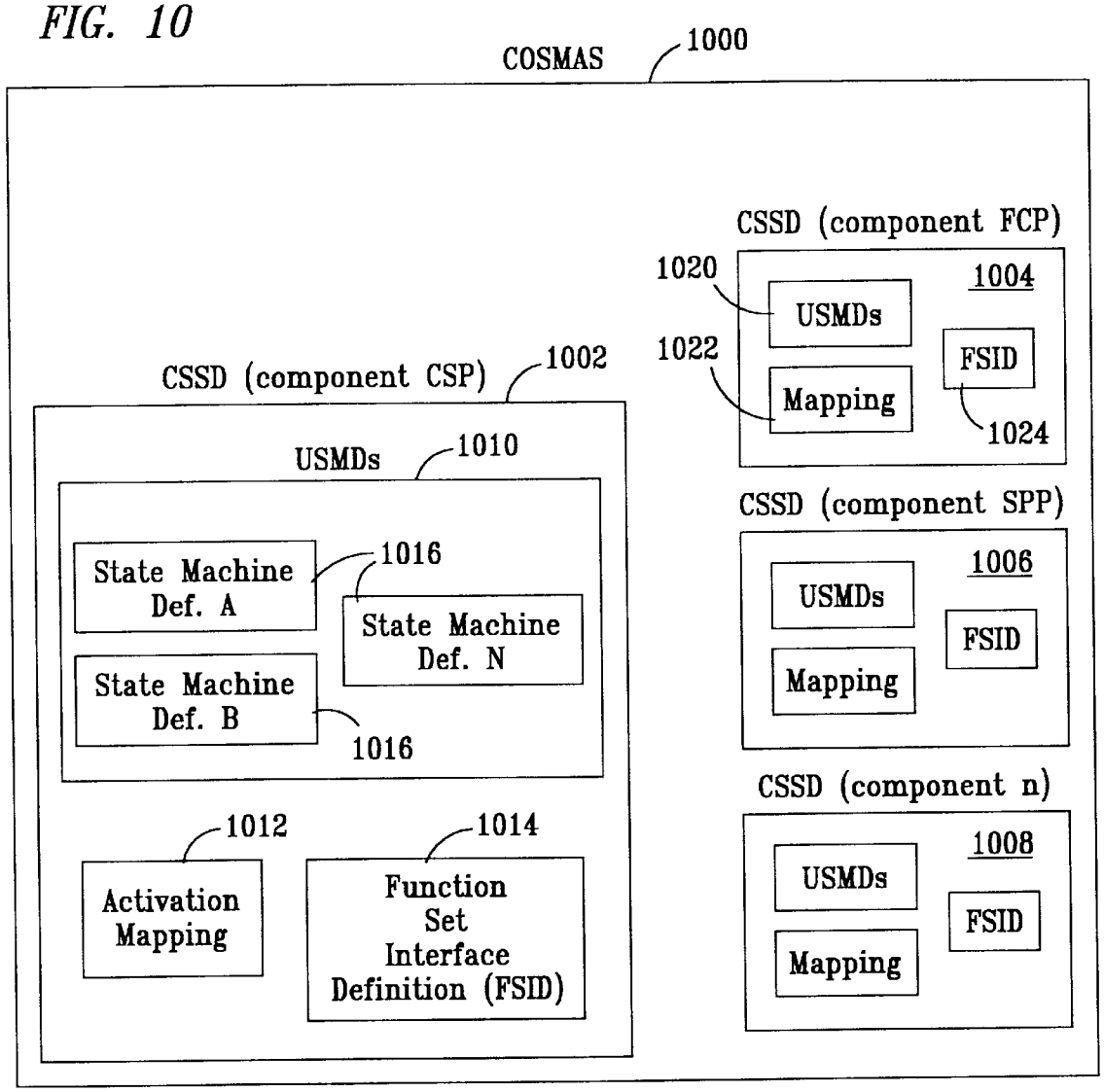
FIG. 10 is a block diagram illustrating a concurrent state machine space in accordance with the present invention.

Now referring to FIG. 10, there is illustrated in block diagram form the COSMAS 1000 in accordance with the present invention. The COSMAS 1000 includes a plurality of CSSDs 1002, 1004, 1006, 1008—one for each relevant component within the processing system 120. There may be any number of such components, as desired.

Illustrated in FIG. 10 is the CSSD 1002 for the CSP 204 (see FIG. 2) that includes a set of USMDs 1010, an activation mapping definition 1012 and a function set interface definition (FSID) 1014. The set of USMDs 1010 includes a plurality of state machine definitions 1016 each defining a state machine (e.g. State Machine A, State Machine B, State Machine (N)). Also included with the COSMAS 1000 of the present invention are the CSSD 1004 (for the component FCP 202) and the CSSD 1006 (for the component semantics SPP 208). The COSMAS may include up to "n" number of CSSDs depending on the number of components desired (the CSSD 1008 is associated with the component "n"). The following COSMAS Sub-Space definition file format grammar preferably provides an example of the CSSD format in accordance with the present invention:

| | |
|---|---|
| CosmasSubSpace :: | = CONFIGURATION Configuration_<br>USMDS Usmds_<br>MAPPINGS Mappings_ |
| Configuration:: | = ConfigurationItem Configuration \| |
| Configuration Item :: | = NAME = STRING |
| Usmds:: | = [ Usmd ] Usmds \| e |
| Usmd:: | = NUMBER STRING |
| Mappings:: | = [ Mapping ] Mappings \| e |
| Mapping:: | = USMDS = { NUMBERLIST }<br>Hooks<br>EVENTS - { EventCriteria }<br>SETEVENT = { EventSettings } |
| Hooks:: | = Hook Hooks \| e |
| Hook:: | = HOOK = NUMBER INTO NUMBER AT TRANS STRING |

```
                    HOOK = NUMBER INTO NUMBER AT STATE STRING
EventCriteria::     = EventCriterium Event Criteria | e
EventCriterium::    = EVENT = NUMBER |
                    EVENT = ANY |
                    COMPCLASS = NUMBER |
                    COMPCLASS = ANY |
                    COMPIID = NUMBER |
                    COMPIID = ANY |
                    DATA = [ NUMBER = DataVal] |
                    DATA = [ NUMBER = ANY]
DataVal::           = BOOL BOOL |
                    SCALAR NUMBER |
                    ENUM NUMBER |
                    ARRAY (NUMBERLIST)
EventSettings::     = EventSetting EventSetting | e
EventSetting::      = EVENT = NUMBER |
                    COMPCLASS = NUMBER
                    COMPIID = NUMBER
                    DATA = [ NUMBER = DataVal ]
```

© 1997 Northern Telecom Limited

Figure 11:
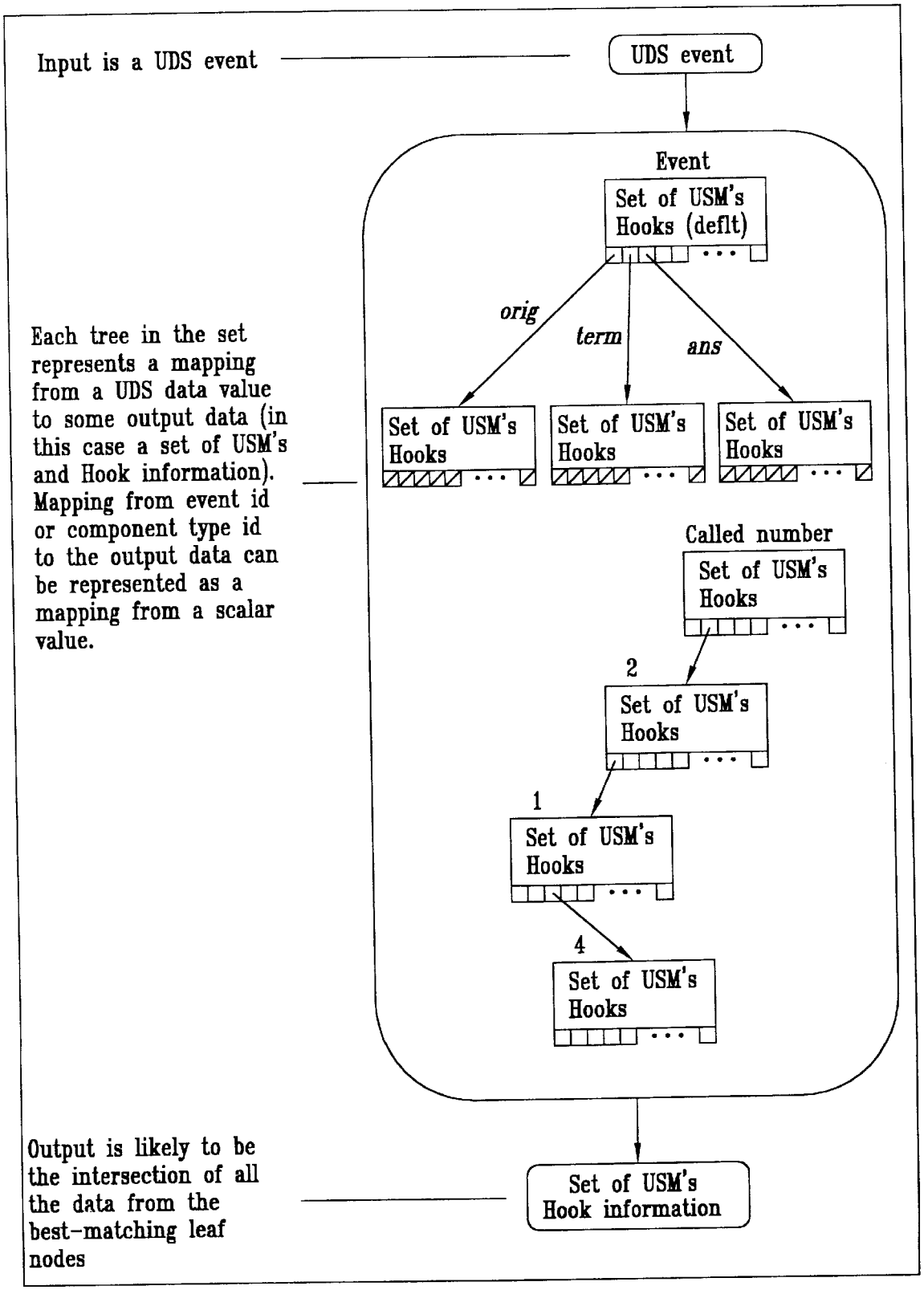
FIG. 11 represents a hierarchial view of the activation mapping definition within a concurrent state machine space definition.

Now referring to FIG. 11, there is represented a hierarchial view of the activation mapping definition 1012 within one of the CSSDs (as shown in FIG. 10). The mapping definition 1012 utilizes information from a UDS event and a set of decisional trees to identify a subset of USMDs (state machines) within the set of USMDs 1010 that will most likely be activated/processed in response to the UDS event. Each tree in the set represents a mapping from a UDS data value to some output data (in this case a sub-set of USMDs and hook information, if any). Mapping from event identification (e.g. origination, termination, answer, etc.) or component identification (e.g. CSP1, CSP2) to the output data can be represented as a mapping from a scalar value. The mapping process produces a subset (one or more) of USMDs within the set of USMDs 1010 that will result in instantiations (as USMs) of the identified subset. Once identified, USMs are instantiated that correspond to the selected USMDs. The USMs are instantiated within what is identified as an "instantiated" COSMAS Sub-Space (CSS).

CSSD maps are organized as sets of trees (optionally scoped), with each tree representing a mapping from either an event, component or data item to some set of activation information. The set of activation information may contain any desired activation criteria and information for the activation of state machines. In the preferred embodiment, the CSSD maps contain information identifying the set of state machines that may be activated by the event, component or data item, and the state machines that should be hooked and where. (The currently-used USM also includes information for setting event information).

Given an event, the information yielded by the overall mapping is the result of some set of operations performed upon the results of individual mappings of the event id, the component id, and each data item in the event. If scoping is used, then the information yielded by the overall mapping is the result of some set of operations performed upon the result of scoped mappings (based upon combinations of items) which is the result of the application of some set of operations performed upon the result of individual mappings of the event id, the component id, and each data item in the event for that particular scoping. Best-match searches may be performed on the trees (i.e., the data item 2145551212 will yield the result associated with 214555 if 214555 is the best-match for 2145551212).

The following provides an example mapping algorithm (assume an event is being handled):

```
get/create full list referring to all possible USMDs
    for this component (sub-space) called USMDS
get/create full list of hook information called HOOKS
get result of mapping for given event id
if success then
    intersect resulting USMD list with USMDS
    intersect resulting hook information list with HOOKS
get result of mapping for given component type
if success then
    intersect resulting USMD list with USMDS
    intersect resulting hook information list with HOOKS
for every data item in the given event, get result of mapping
    if success then
        intersect resulting USMD list with USMDS
        intersect resulting hook information list with HOOKS
return USMDS and HOOKS
```

© 1997 Northern Telecom Limited

The information returned from the mapping algorithm is used to instantiate the USMs and perform whatever actions are specified in the mapping. The following provides a scoped version of the mapping algorithm:

```
get/create full list referring to all possible USMDs for the component (sub-space) called USMDS
get/create full list of hook information called HOOKS
get result of mapping for given event id
if success then
    intersect resulting USMD list with USMDS
    intersect resulting hook information list with HOOKS
get result of mapping for given component type
if success then
    intersect resulting USMD list with USMDS
```

```
    intersect resulting hook information list with HOOKS
get/create empty scope context, containing no data in mappings
if scope set exists for given event id then
    union mapping context with the set of data mappings that fall under the scoping of
        given event id
union mapping context with the set of data mappings that are not scoped by any event id
if scope exists for given component type then
    union mapping context with the set of data mappings that fall under the scoping of
        given component type
for every data item in the given event, get result of mapping in the current scope context
    if success then
        intersect resulting USMD list with USMDS
        intersect resulting hook information list with HOOKS
return USMDS and HOOKS
```

© 1997 Northern Telecom Limited

The use of scoping depends on the desired data management, and also is internal to the mappings and superficial to the grammar of mapping specification. Scoping allows the mapping specifier to be more specific about the event and components which might contain a certain data item. In other words, the called number in an Origination event from the FCP vs. CSP might be completely different and require different sets of state machines altogether.

Non-scoping may be described as follows: If O is the set of state machines that may be activated by an Origination event, F is the set of state machines that may be activated by an FCP, C is the set of state machines that may be activated by a CSP, and N be the set of state machines that may be activated by called number N, then N must contain all the possibilities in O, F, and C which may be quite numerous, requiring a mapping entry for each possibility.

Scoping may be described as follows: If O is the set of state machines that may be activated by an Origination event, F is the set of state machines that may be activated by an FCP, C is the set of state machines that may be activated by a CSP, and N be the set of state machines that may be activated by called number n scoped by O and C, then N must contain only the possibilities in O and C, requiring a mapping entries for only those possibilities in O and C.

Therefore, use of scoping may reduce the number of mapping entries needed to specify activation in the system. Scoping may or may not be used.

Now referring back to FIG. 11, an example of the function set interface definition (FSID) 1014 within the CSSD 1002 (i.e. the function set definition for the CSP 204) is set forth below.

| CSP Function Set Definition | | |
|---|---|---|
| id | function | |
| 0 | UDS_CLEAR | ( uds_id ) |
| 1 | UDS_COPY_ALL | ( dest_uds_id, src_uds_id ) |
| 2 | UDS_SET_EVENT | ( uds_id, event_id ) |
| 3 | UDS_SET_DATA | ( uds_id, data_id, data_val ) |
| 4 | UDS_SET_ARRAY_DATA | ( uds_id, data_id, offset, data_val ) |
| 5 | UDS_RELAY | ( uds_id, component_class, component_instance_id ) |
| 6 | UDS_NEWTEMP | ( ) |
| 10 | SU_DIGITS_COLLECT | ( mindigs, maxdigs, timeout ) |
| 11 | SU_DIGITS_MONITOR | ( digit ) |
| 12 | SU_TRANSLATE | ( uds_id ) |
| 13 | SU_SCREEN | ( uds_id ) |
| 14 | SU_IP-PLAYMESSAGE | ( trkmem, user_id, msgnum ) |
| 15 | SU_ROUTE | ( uds_id ) |
| 16 | SU_IP_COLLECTDIGITS | ( trkmem, maxdigs, timeout ) |
| 17 | SU_AUTH_VERIFYACCOUNT | ( vendor_id, card_number, calling_number ) |
| 18 | SU_AUTH_TRANSFERUNITS | ( vendor-id, card_number, calling_number, called_number ) |
| 19 | SU_IP_PLAYMESSAGE_NUM | ( trkmem, user_id, msgnum, number ) |
| 20 | CTP_PARTY_ADD | ( ) |
| 21 | CTP_PARTY_HOLD | ( ) |
| 22 | CTP_PARTY_REMOVE | ( ) |
| 30 | CSP_ASSOCIATE | ( agent_id ) |
| 31 | CSP_DISASSOCIATE | ( agent_id ) |
| 32 | CSP_TIMEALARM_SET | ( seconds ) |
| 33 | CSP_TIMEALARM_CANCEL | ( ) |

© 1997 Northern Telecom Limited

Use of the term "function" denotes a function performable by the processing system. The present invention defines a set of functions (FSID) associated with a particular component of the system. Within the function set are functions performable by the component. Moreover, these functions are callable (or selectable) by a state machine designer when designing state machines for that particular component. Accordingly, the function set interface definition (FSID)

associated with a particular component contains interface information for the set of all functions performable by that particular component. For example, the functions performable by the CSP 204 may include collect digits, translate, route, etc. (see above list of example functions for the CSP 204).

An instance of COSMAS may contain any number of "sub-spaces". In general, COSMAS contains the set of all possible state machines (USMDs) for a given system. The set may be partitioned according to the function set used by the respective USMDs. To define the sub-spaces, S may be used to denote the set of all USMDs in an instance of COSMAS. For every function set F (for each component) defined in the system, there is a partition (sub-space) P of state machines (USMDs) in S. For any state machine s in partition P, state machine s uses only those functions in the corresponding function set (associated with a particular component, i.e., FCP, CSP, etc.).

A given function may also be within the function set for the CSP and also in the function set for the FCP. It may be possible that a given function is performable by two or more components. In addition, a given state machine (USMD) may be included in each partition P for two or more components. However, this is not desirable unless the state machine uses functions that are identical for the components.

An example of a function set interface definition (FSID) 1024 within the CSSD 1004 (i.e. the function set definition for the FCP 202) is set forth below.

It will be understood that three components (CSP, FCP, SPP) have been illustrated in accordance with the present invention to each include a set of USMDs, activation mapping, and a function set interface definition. Additional components may be similarly designed and utilized in the system in accordance with the present invention (such as the routing processor, translation processor, etc.) for running state machines. For example, the routing processor may simply perform a function in response to a function call from a state machine (in the form of a UDS event or some other type of information such as a function id), or once called, the routing processor may perform the function utilizing one or more state machines instantiated by the routing processor.

2. Instantiated COSMAS Sub-Space (CSS)

As described above, after the mapping process identifies one or more appropriate USMDs, a COSMAS Sub-Space is instantiated that includes a corresponding instantiated USM (as described above) for each of the selected USMDs (one or more may be selected).

The following provides an example of a typical algorithm that may be used to generate or activate a Sub-Space. The Sub-Space activation algorithm starts at "main" and it is assumed that this algorithm starts when a component receives an event.

| | FCP Function Set Definition | |
|---|---|---|
| id | function | |
| 0 | UDS_CLEAR | ( uds_id ) |
| 1 | UDS_COPY_ALL | ( dest_uds_id, src_uds_id ) |
| 2 | UDS_SET_EVENT | ( uds_id, event_id ) |
| 3 | UDS_SET_DATA | ( uds_id, data_id, data_val ) |
| 4 | UDS_SET_ARRAY_DATA | ( uds_id, data_id, offset, data_val ) |
| 5 | UDS_RELAY | ( uds_id, component_class, component_instance_id) |
| 6 | UDS_NEWTEMP | ( ) |
| 10 | SU_PSM_HANDLE_EVENT | ( uds_id ) |
| 20 | SET_VOICE_PATH | ( incoming_vpstate, outgoing_vpstate) |

© 1997 Northern Telecom Limited

An example of a function set interface definition (FSID) within the CSSD 1006 (i.e. the function set definition for the SPP 208) is set forth below.

| | SPP Function Set Definition | |
|---|---|---|
| id | function | |
| 0 | UDS_CLEAR | ( uds_id ) |
| 1 | UDS_COPY_ALL | ( dest_uds_id, src_uds_id) |
| 2 | UDS_SET_EVENT | ( uds_id, event_id) |
| 3 | UDS_SET_DATA | ( uds_id, data_id, data_val) |
| 4 | UDS_SET_ARRAY_DATA | ( uds_id, data_id, offset, data_val) |
| 5 | UDS_RELAY | ( uds_id, component_class, component_instance_id) |
| 6 | UDS_NEWTEMP | ( ) |

© 1997 Northern Telecom Limited

```
main:
if there is no active sub-space
    get sub-space
    if failure
        if there are any inactive sub-spaces
            activate the inactive one with highest priority
        otherwise
            exit main
(USM Interpretation Algorithm goes here)
if exited
    remove active sub-space
    if there are any inactive sub-spaces
        activate the inactive one with highest priority
get sub-space:
ask sub-space definition for activation mapping information for the given event
if success
    instantiate the indicated state machines
    if there is hook/reference information
        instantiate the state machines to be hooked or referenced
        associate the new state machines with their hooks or references
    if there is event altering information
        set the indicated event information in the given event
    return success
return failure
```

© 1997 Northern Telecom Limited

E. OPERATION

Figure 12:
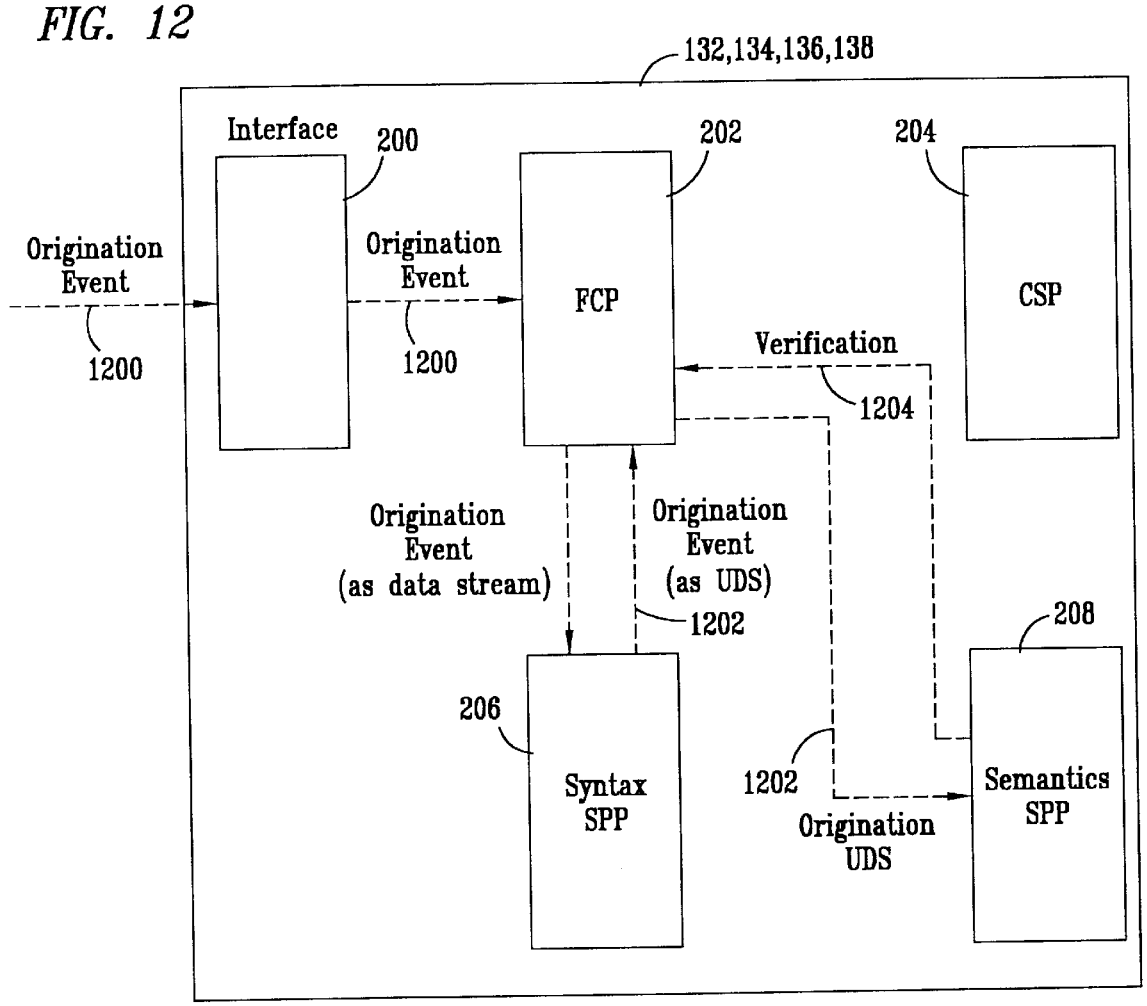
FIGS. 12–14 illustrate operation of the present invention in response to an external origination event.
Figure 13:
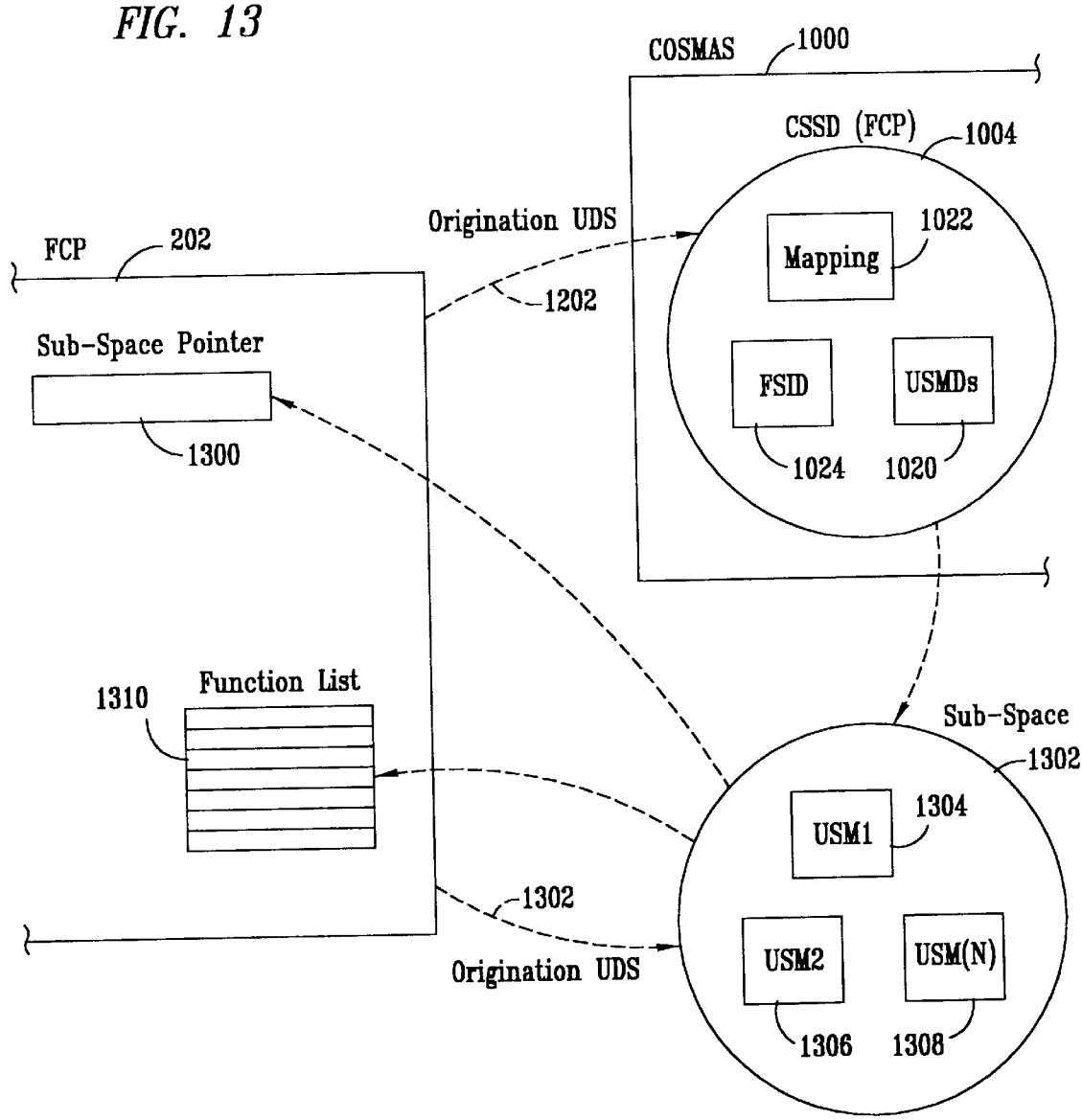
Figure 14:
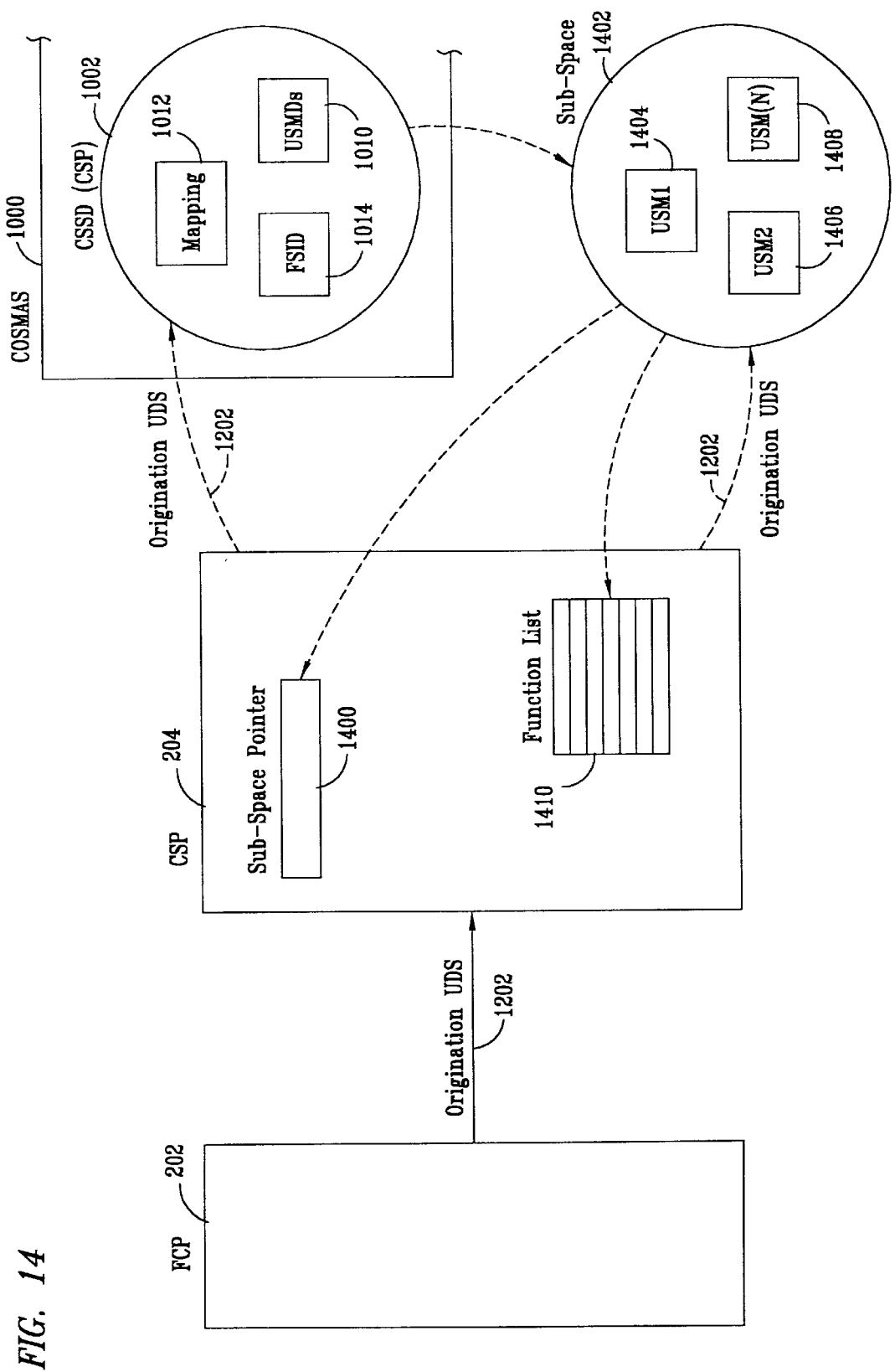

Now referring to FIGS. 12–14, there is illustrated the operation of the present invention in response to an external event. In this example, the external event is an origination event (i.e. an origination call in a telecommunications system). Now referring to FIG. 12, an origination event 1200 is received by the interface 200 of the SI unit 132 (or SI unit 134, 136 or 138, depending on the location of origination). It will be understood that the origination event 1200 is generally in the form of an SS7 or IAM message, isdn pri setup MESSAGE, PTS message, or any other protocol message indicating an origination call request.

Upon receipt of the origination event 1200, the SI unit 132 generates (when needed) an "instance" or "call segment" of each of the processors within the SI unit 132. Multiple calls may be processed concurrently by the system. Since each of the "processors" within the SI unit 132 are typically run as separate processes or threads, several instances of each processor or set of processors may be running concurrently—and the processes/threads may be organized such that there is one for each call handled by the SI unit 132. The interface 200 then forwards the origination event 1200 to the facilities call processor (FCP) 202 for facility-specific call processing of the call.

The FCP 202 sends the origination event 1200 to the syntax signalling channel processor (SPP) 206, preferably in the form of a data stream. The syntax SPP 206 converts the protocol specific information of the origination event 1200 (a protocol telephony event) into a universal data structure in the form of an origination event UDS 1202. The origination UDS 1202 as converted is sent back to the FCP 202.

Now referring to FIG. 13, in response to the origination UDS 1202, the FCP 202 generates a sub-space reference or pointer 1300 which initially contains no pointer information. Optionally, the sub-space reference 1300 may be generated at some time other than in response to the received origination UDS 1202, such as when the "instance" of the FCP 202 is generated. Preferably, the sub-space reference 1300 is generated (and is empty) when the instance of the FCP 202 is generated.

As illustrated in FIG. 13, the FCP 202 requests that an FCP sub-space be created for the new call by sending the origination UDS 1202 to the COSMAS 1000 (see FIG. 10) and specifically to the CSSD 1004 for the FCP 202. The activation mapping process 1022 of the CSSD 1004 utilizes information from the origination UDS 1202 to identify and select one or more state machines (USMDs) from the set of USMDs 1020 that will most likely be performed by the FCP 202 in processing the new call. The state machines selected may include those that are hooked or referenced in one or more selected state machines and/or any child state machines that may be processed in response to the selected state machines. An FCP sub-space 1302 is then created and a USM (USM1 1304, USM2 1306, USM(N) 1308) is instantiated for each of the selected state machines with the instantiated USMs 1304, 1306, 1308 being placed within the sub-space 1302. In the FIG. 13, a plurality of USMs are shown created but a single USM may be created. The type and contents of information within each instantiated USM is described above with respect to FIG. 9a. The location (or identifier) of the sub-space 1302 is then transmitted to the FCP 202 and placed in the sub-space reference 1300.

After the sub-space 1302 is generated and the USM(s) are instantiated, the FCP 202 relays (or transmits) the origination UDS 1202 to each of the USMs 1304, 1306, 1308 within the sub-space 1302 which activates each of the state machines associated with each of the USMs (the USM contains information pointing to or identifying its state machine definition). As will be appreciated, the UDS 1202 may also be relayed to the sub-space for distribution of the UDS 1202. Processing of the call is then controlled in accordance with the functionality of the state machines. The interpreter may be used also as a "template" for generating compiled code. This processing is performed by what is identified as an "interpreter". The interpreter includes interpretation code that performs the actual processing or running of the state machine(s) in accordance with the functionality of the state machine(s). The interpretation code looks at events (and the event information) and compares this information to the state machine definition (USMD) to determine the transitioning of states when a function needs to be performed. The interpreter also performs, or causes the performance of, functions required by the state machine. As will be appreciated, each instantiated USM may interpret its own definition by pointing or referencing to its USMD.

Once processing of the USMs 1304, 1306, and 1308 begins, the start of which is typically in response to a UDS event, the USMs 1304, 1306, 1308 may pass a function id number and associated parameter values to the FCP 202 into a FCP function list 1310, as illustrated in FIG. 13. From the function id number received by the FCP 202 and the definition of that function id number in the FCP's FSID 1024, the FCP 202 knows what function to perform. The FCP 202 (or interpreter) executes these functions immediately, or, since many states within one or more state machines may be traversed as the result of a single event, the FCP 202 (or interpreter) caches all the functions until it is done processing the one event before executing them. Conceptually, the FCP 202 may be construed as including part of the interpreter.

In the present invention, the FCP 202 generally handles facility-specific services or functions which include those functions described herein and other functions or services that are specific to the facility. For example, the facility may require special hand-shaking depending on the hardware platform.

At some point in time either before, during or after those actions described above and illustrated in FIG. 13, the FCP 202 relays the origination UDS 1202 to the call segment processor (CSP) 204. Now referring to FIG. 14, there shown the CSP 204 receiving the origination UDS 1202. In response to the origination UDS 1202, the CSP 204 generates a sub-space reference or pointer 1400 which initially contains no pointer information. Optionally, the sub-space reference 1400 may be generated at some time other than in response to the received origination UDS 1202, such as when the "instance" of the CSP 204 is generated. Preferably, the sub-space reference 1400 is generated (and is empty) when the instance of the CSP 204 is generated.

As illustrated in FIG. 14, the CSP 204 requests that a CSP sub-space be created for the new call by sending the origination UDS 1202 to the COSMAS 1000 (see FIG. 10) and specifically to the CSSD 1002 for the CSP 204. The activation mapping process 1012 of the CSSD 1002 utilizes information from the origination UDS 1202 to identify and select one or more state machines (USMDs) from the set of USMDs 1010 that will most likely be performed by the CSP 204 in processing the new call. The state machines selected may include those that are hooked or referenced in one or more selected state machines and/or any child state machines that may be processed in response to the selected state machines. A CSP sub-space 1402 is then created and a USM (USM1 1404, USM2 1406, USM(N) 1408) is instantiated for each of the selected state machines with the instantiated USMs 1404, 1406, 1408 being placed within the sub-space 1402. In the FIGURE, a plurality of USMs are created but a single USM may be created. The type and contents of information within each instantiated USM is described above with respect to FIG. 9a. The location (or identifier) of the sub-space 1402 is then transmitted to the CSP 204 and placed in the sub-space reference 1400.

After the sub-space 1402 is generated and the USM(s) are instantiated, the CSP 204 relays (or transmits) the origination UDS 1202 to each of the USMs 1404, 1406, 1408 within the sub-space 1402 which activates each of the state machines associated with each of the USMs (the USM contains information pointing to its state machine). Processing of the call is then controlled in accordance with the functionality of the state machines. This processing is performed as described above with respect to the description of the FCP 202 (and illustrated in FIG. 13).

Once processing of the USMs 1404, 1406, and 1408 begins, and typically in response to a UDS event, the USMs 1404, 1406, 1408 may pass a function id number (zero or more per transition) and associated parameter values to the CSP 204 into a CSP function list 1410, as illustrated in FIG. 14. From the function id number received by the CSP 204 and the definition of that function id number in the CSP's FSID 1014, the CSP 204 knows what function to perform. The CSP 204 (or interpreter) executes these functions immediately, or, since many states (within one or more state machines) may be traversed as the result of a single event, the CSP 204 (or interpreter) caches all the functions until it is done processing the one event before executing them. Conceptually, the CSP 204 may also be construed as including part of the interpreter.

In the present invention, the CSP 204 generally handles call services processing, including such services as debit card, conference, three-way, call waiting, reorigination, calling card, credit card, and operator calling services.

Optionally, the present invention may provide a mechanism for detecting errors in the origination event 1200 prior to use and transmittal of the origination UDS 1202 to the other components in the system (e.g. the FCP 202 and the CSP 204). If this function is desired, the origination UDS 1202 is sent from the FCP 202 to the semantics signalling channel processor (SPP) 208, as illustrated in FIG. 12. The semantics SPP 208 performs an error checking function on the received protocol message (i.e., the origination event 1200 representing the telephony event) through examination of the origination UDS 1202 created by the syntax SPP 206. If valid, the semantics SPP 208 sends a verification message 1204 to the FCP 202 and call control processing continues accordingly. If invalid, the FCP 202 will most likely perform some error routine and associated function(s). As will be appreciated, the semantics SPP may be designed to check the actual origination event message or the origination UDS as converted. In addition to the error checking function, the semantics SPP 208 performs signalling protocol specific control functions or services that may be applicable to the protocol, which functions or services may also be performed using state machines.

The error checking function of the semantics SPP 208 may be performed in a way similar to the selection of USMDs, creation of a sub-space, and other steps and functions as described above with respect to the FCP 202 and the CSP 204 (see FIGS. 13 and 14). Depending on the type of origination event 1200 received (e.g., protocol SS7 IAM, ISDN PRI, PTS, etc.), the semantics SPP 208 will most likely utilize a different state machine for checking the validity of the origination event (i.e. the validity of the protocol data message). This allows for the modular design of state machines for use to validate a protocol-specific external data message that may be one of numerous different types.

As will be appreciated, the semantics SPP 208 will perform in a like manner as described above with respect to operation of the FCP 202 and the CSP 204.

The above description illustrates steps or functions performed by the present invention in response to an origination event (i.e. a new call request). Once selected and activated, call control processing is followed in accordance with the state machine or machines. The following description provides an example of the call control processing of a state machine wherein a translation function is to be performed.

Assuming a state machine is running (i.e., processing by the CSP 204) and comes to a point in the state machine where a translation is required. One of three methods for handling the translation request may be employed. The method employed depends on the system attributes desired by a person skilled in the art in implementing the present invention. In one method, the state machine calls the translation function as a "function". In so doing, the state machine either uses the function id defined in the function set interface for the translation function (see FSID), or generates a translation UDS, and transmits this information to the translation component. In response thereto, the translation component will generally query a database and retrieve a translated number from the database. After receiving the translated number, the translation component sends back the translation response to the CSP 204. This response may be in the form of either a translation response UDS or some other type of information (i.e., function completed response). If the translation response received by the CSP 204 is already in the form of a UDS, the CSP 204 applies the translation response UDS to the running state machine for processing. If in some other form, the CSP 204 converts the information into UDS form and applies it to the state machine for processing. In this method, the translation component performs the translation function in response to a function call within the state machine.

In a second method, the state machine uses a "hook" to hook a specific "event processor" of several possible "event processors." The "event processor" instantiates a state machine (which will perform and complete the desired function) and receives a translation request UDS from the CSP 204 which activates the "hooked" state machine. Alternatively, the event processor may call the translation function as a function, as described above. The "hooked" state machine then runs through its various transitions and functions to eventually generate a translation response which is returned to the CSP 204 and applied to the main state machine. The "hooked" state machine may perform its functions and processing similar to that described in the preceding paragraphs.

In this method, use of a "hook" allows a specific state machine (or event processor) to be instantiated depending on some known information. For example, if the state machine is a basic call origination model, when the basic state machine is instantiated upon call origination (receipt of an origination UDS and then generation of a sub-space), the present invention will instantiate the basic state machine with a "hook" to a specific "event processor" to perform the translation. Information within the origination UDS is utilized to "hook" the proper "event processor" at instantiation time. For example, if the origination UDS includes information that the number is a 1-800 number, a particular "event processor" (either another state machine or a function call) will be "hooked" into the basic state machine whereby that particular "event processor" has access to a first database of numbers for 1-800 translations. If, however, the UDS information indicates a 1-888 number, then another "event processor" (either another state machine or a function call) will be "hooked" into the basic state machine whereby that other "event processor" has access to a first database of numbers for 1-888 translations. As will be appreciated, the present invention allows for a system having a modular design which reduces the amount of time in designing and integrating new services and also eases modification and maintenance of the existing system.

In yet another method, the state machine uses a "reference" to reference a specific "event processor." The "event processor" instantiates a state machine (which will perform and complete the desired function) and receives a translation request UDS from the CSP 204 which activates a "referenced" state machine. Alternatively, the event processor may call the translation function as a function. The "referenced" state machine then runs through its various transitions and functions to eventually generate a translation response which is returned to the CSP 204 and applied to the main state machine. The "referenced" state machine may perform its functions and processing similar to that described in the preceding paragraph for a "hooked" state machine.

It will be understood that any component within the SI unit 132 may be designed with the capability to convert an external event into a UDS event. In the preferred embodiment, the FCP 202 converts to UDS form only those external events received directly from an external source. Those external events that are received from some other component within the SI unit 132 (i.e., the routing processor, translation processor, etc.) and which are routed to the FCP 202, are first converted into UDS form by that component and then routed to the FCP 202. Likewise for the CSP 204. Alternatively, other components within the SI unit 132 (i.e., the routing processor, translation processor, etc.) that receive an external event may simply relay the event to the FCP 202 (or the CSP 204) whereby the FCP 202 (or the CSP 204) performs the conversion.

For example, assuming a state machine (under the control of the CSP 204) is controlling processing of a call and the state machine reaches a point where the call requires routing. At this point, the CSP 204 will perform a function call to the routing processor 218 to perform a routing request. As will be appreciated, the routing request (i.e. function call) may be in the form of a routing UDS or some other type of primitive. Upon receiving the routing function call, the routing processor 218 sends the appropriate information to the desired external switch (i.e. to the switching fabric 122, 124, 126, 128 or directly to the LEC switches 102, or IEC switch 104) located external to the system (see FIG. 1). The external switch then performs the requested routing and sends back a routing response (i.e. an external event) to the routing processor 218. The routing processor 218 then converts this external event (and its associated information) into a routing response UDS and relays this UDS to the CSP 204 for processing. Similarly, a translation request may be handled in a similar way with the translation processor 216 sending a translation request to a translation database (either external or internal) and receiving a response with the translation information. As will be appreciated, UDSs may be used not only to represent external events, but may also be used for function calls, responses, etc. within the processing system 130 (see FIG. 1).

As another example, assume a state machine directs the CSP 204 to perform the function "collect digits". In general terms, to perform this function, the CSP 204 instructs the switch matrix (or some other component) to collect digits, and the switch matrix collects the digits and transmits a digits collected response back to the CSP 204. The CSP 204 then converts the response into a digits collected UDS event which the CSP 204 applies to the running state machine. Alternatively, a digits collection component within the SI unit 132 may receive a function call (in the form of a UDS or otherwise) from the CSP 204 which sends the proper instructions to the switch matrix. In this case, the digits collection component would then receive and preferably convert the digits collected response into a digits collected UDS event for transmission to the CSP 204 (the conversion is not required, however).

When running concurrent state machines, it is generally assumed that state machines running currently in the same space will receive the same event in no particular order. State machine priorities may be added. If so, then certain state machines will receive events before others in the same space (includes "stacking"). Event-to-state machine priorities may also be used to allow certain state machines to receive certain events before others. Contextual-event-to-state priorities may also be used to allow certain state machines in certain states to receive certain events before certain other state machines in certain states.

Now referring to FIG. 16–22, there is illustrated the software architecture of the present invention as object diagrams. The object diagrams are modeled in accordance with the Unified Modeling Language (UML) as described by Booch, Jacobson & Rumbaugh, and as described in "UML Distilled: Applying the Standard Modeling Language" by Martin Fowler, 1997. In the FIGURES, the use of a "*" denotes that there may be any number of instances (zero or more) therewith, while the use of "0..1" denotes that the object may or may not exist (i.e., true/false). As will be appreciated, in most cases, there will be at least one of the objects denoted by the "*". Accordingly, the FIGS. 16–22 will be described below assuming that at least one such object exists, with understanding that not all objects described are required.

Figure 16:
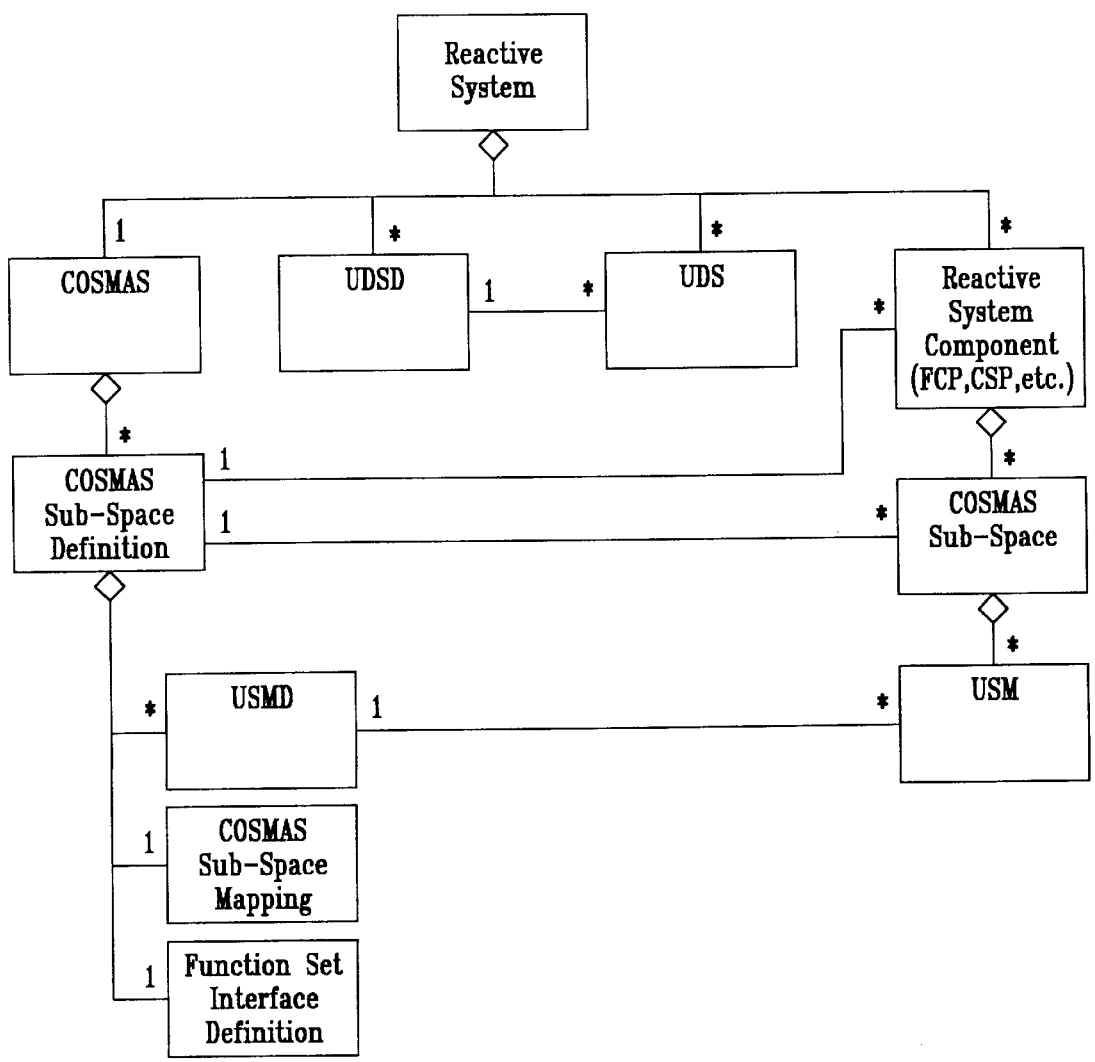
FIGS. 16–22 are object diagrams of the software architecture of the present invention.

Now referring to FIG. 16, there is shown a high-level object diagram of a reactive system utilizing the present invention. The present invention provides a COSMAS, one or more UDSDs, one or more UDSs, and one or more reactive system components (e.g., FCP, CSP, etc.). The COSMAS includes one or more sub-space definitions (one for each reactive system component) which each include one or more USMDs, a sub-space mapping, and a function set interface definition. Each reactive system component also has associated therewith at least one sub-space (having one sub-space definition). Conceptually, a sub-space is created for each call (and possibly for each component). Each sub-space may have any number of instantiated USMs, with each USM having a single USMD. As will be appreciated, FIGS. 17–22 may be similarly described.

Figure 17:
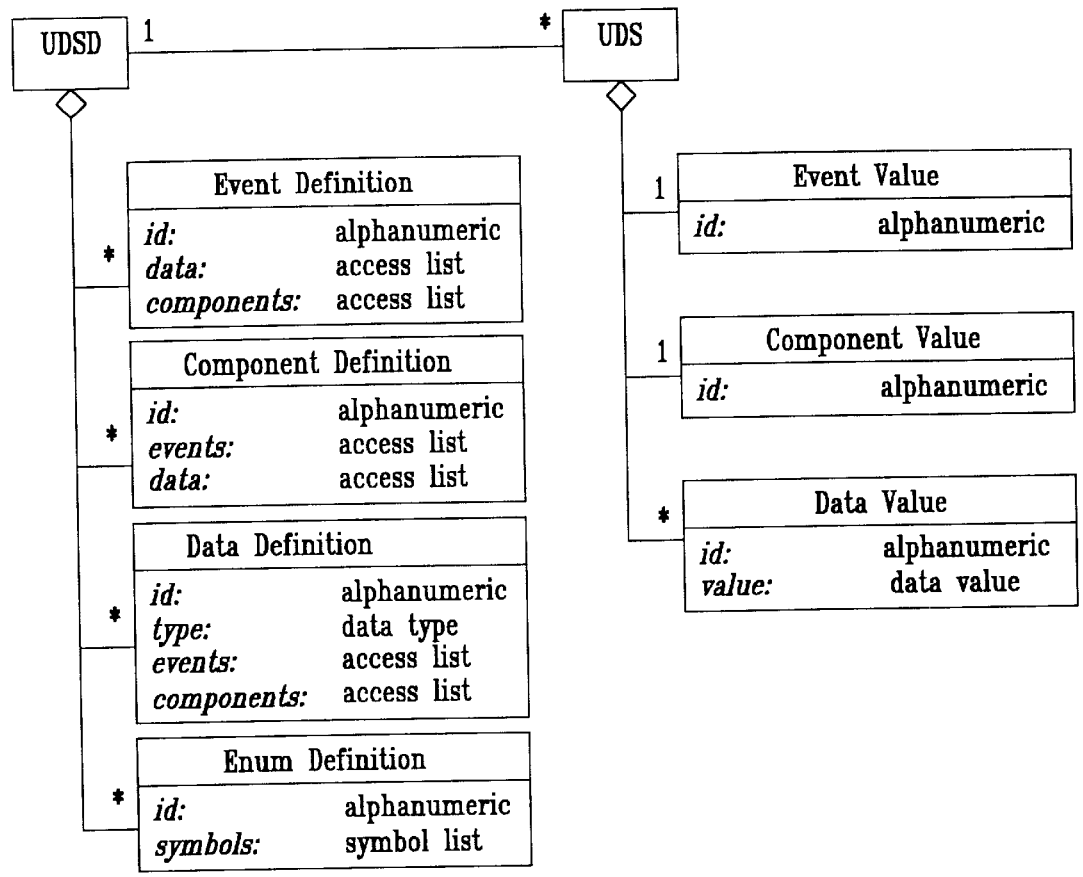

Now referring to FIG. 17, there is illustrated a more detailed object diagram of the UDSD and the UDS shown in FIG. 16. The following applies to the object diagram illustrated in FIG. 17.

```
access list = symbol list = list of valid ids
data type = one of the following:
    bool
    scalar
    enum (includes enum id)
    array
```

Figure 18:
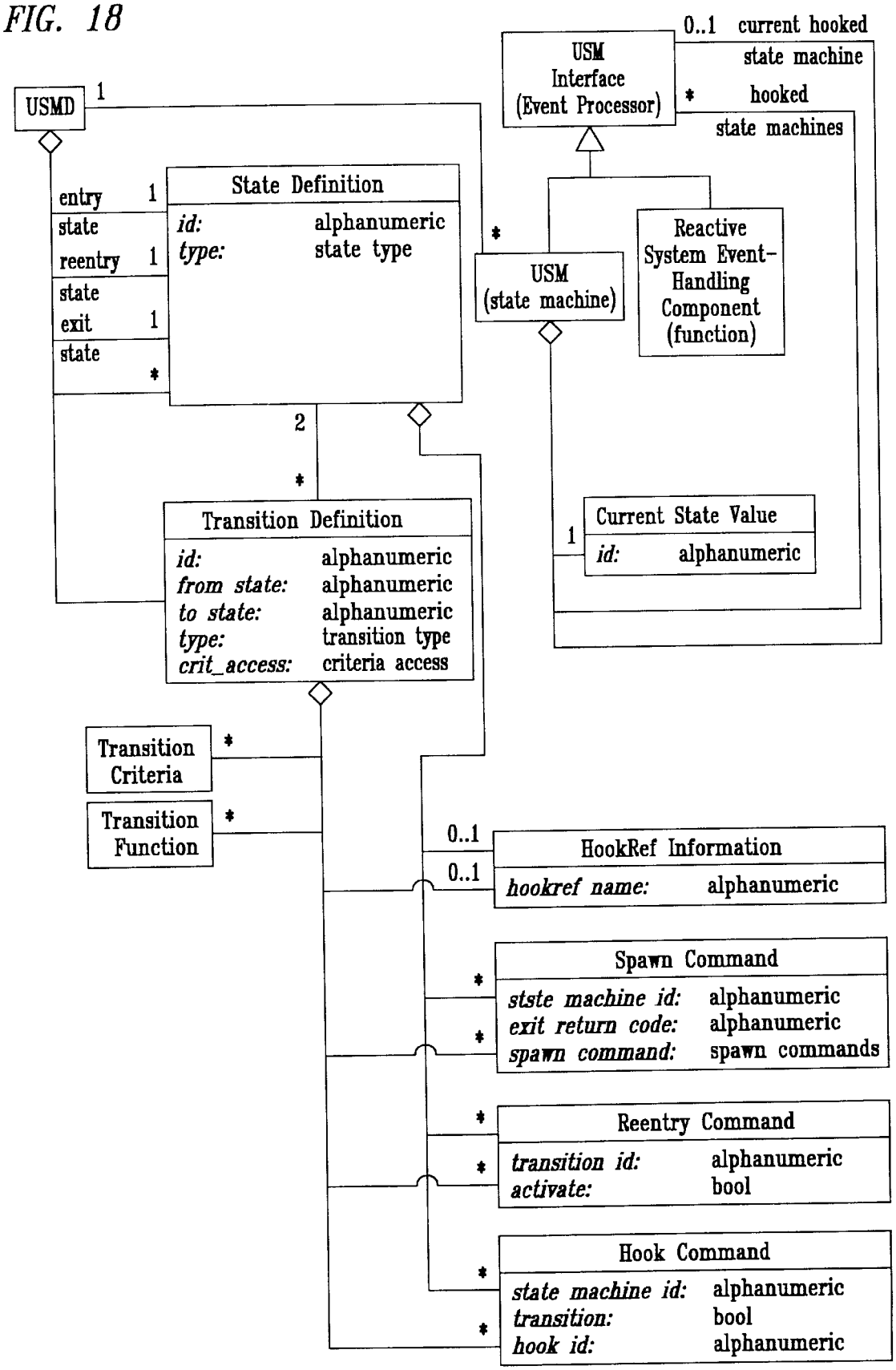

Now referring to FIG. 18, there is illustrated a more detailed object diagram of the USMD and USM shown in FIG. 16. The following applies to the object diagram illustrated in FIG 18.

```
state type = one of the following:
    normal
    hook
    reference
spawn commands = one of the following:
    spawn
    pause
    continue
    kill
transition type = one of the following:
    normal
    default
```

```
    null
    hook
    reference
criteria access = one of the following:
    normal
    may be changed
    may be appended
```

The, USM interface object may be referred to as the "event processor" which is "hooked" (i.e., hooking an event processor). Therefore, the event processor activates a USM (state machine) or performs a function (or causes a function to be performed) by a system component, as illustrated in FIG. 18.

Figure 19:
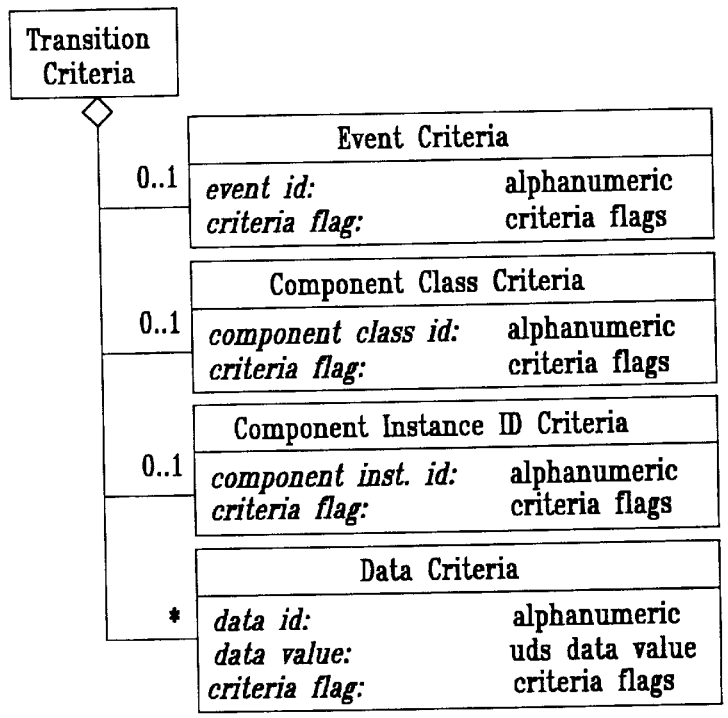

Now referring to FIG. 19, there is illustrated a more detailed object diagram of the transition criteria shown in FIG. 18. The following applies to the object diagram illustrated in FIG. 19.

```
criteria flags = one of the following:
    dont_care       don't care about the value of the given item
    not_set         pass this criteria if value of the given item
                    is not set in the current event
    set             pass this criteria if value of the given item
                    is set in the current event
    equal           pass this criteria if given value matches
                    corresponding value in current event
    not_equal       pass this criteria if given value does not
                    match corresponding value in current event
    greater         pass this criteria if given value is greater
                    than corresponding value in current event
    less            pass this criteria if given value is less than
                    corresponding value in current event
    greater_equal   pass this criteria if given value is greater
                    than or equal to corresponding value in
                    current event
    less_equal      pass this criteria if given value is less than
                    or equal to corresponding value in current
                    event
    best_match      pass this criteria if given value has a best
                    match with corresponding value in current
                    event
```

Figures 22, 23:
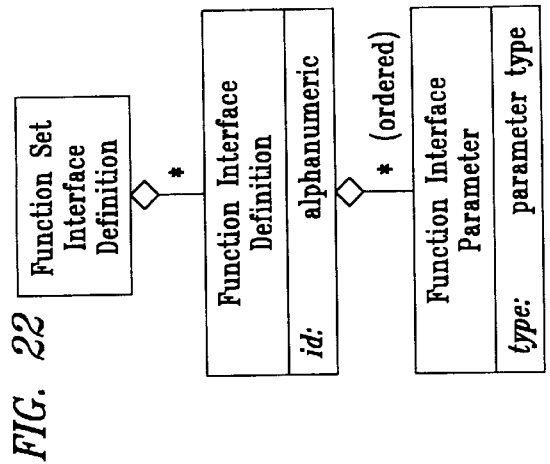
FIG. 23 is a table illustrating a preferred embodiment of valid criteria flags for the criteria flags in FIG. 19.

The table of FIG. 23 illustrates a preferred embodiment of the criteria flags that are valid for transition criteria based on events, components (and instance), and data of a UDS. Valid relationships are marked with an "X".

Figure 20:
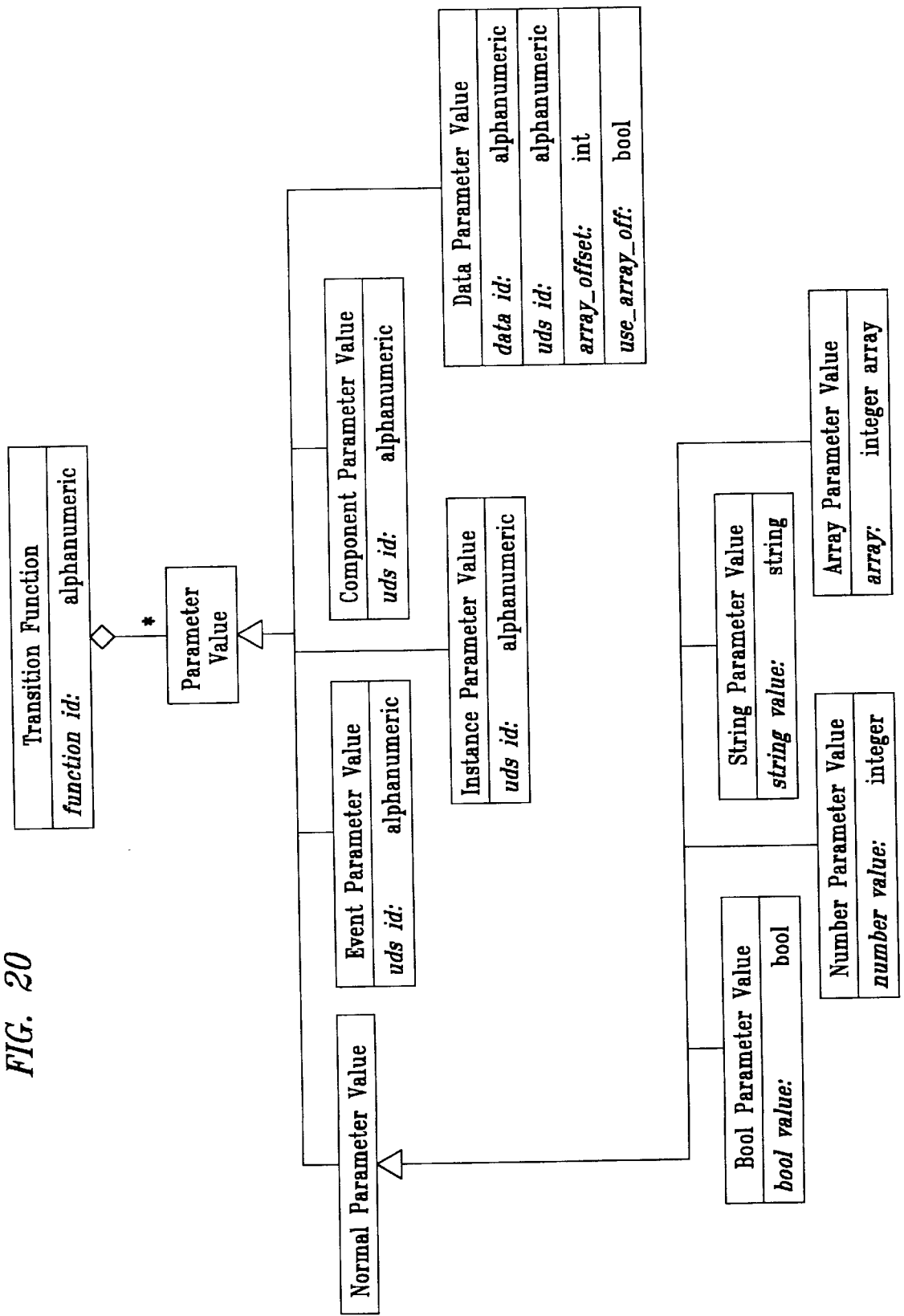

Now referring to FIG. 20, there is illustrated a more detailed object diagram of the transition function shown in FIG. 18.

Figure 21:
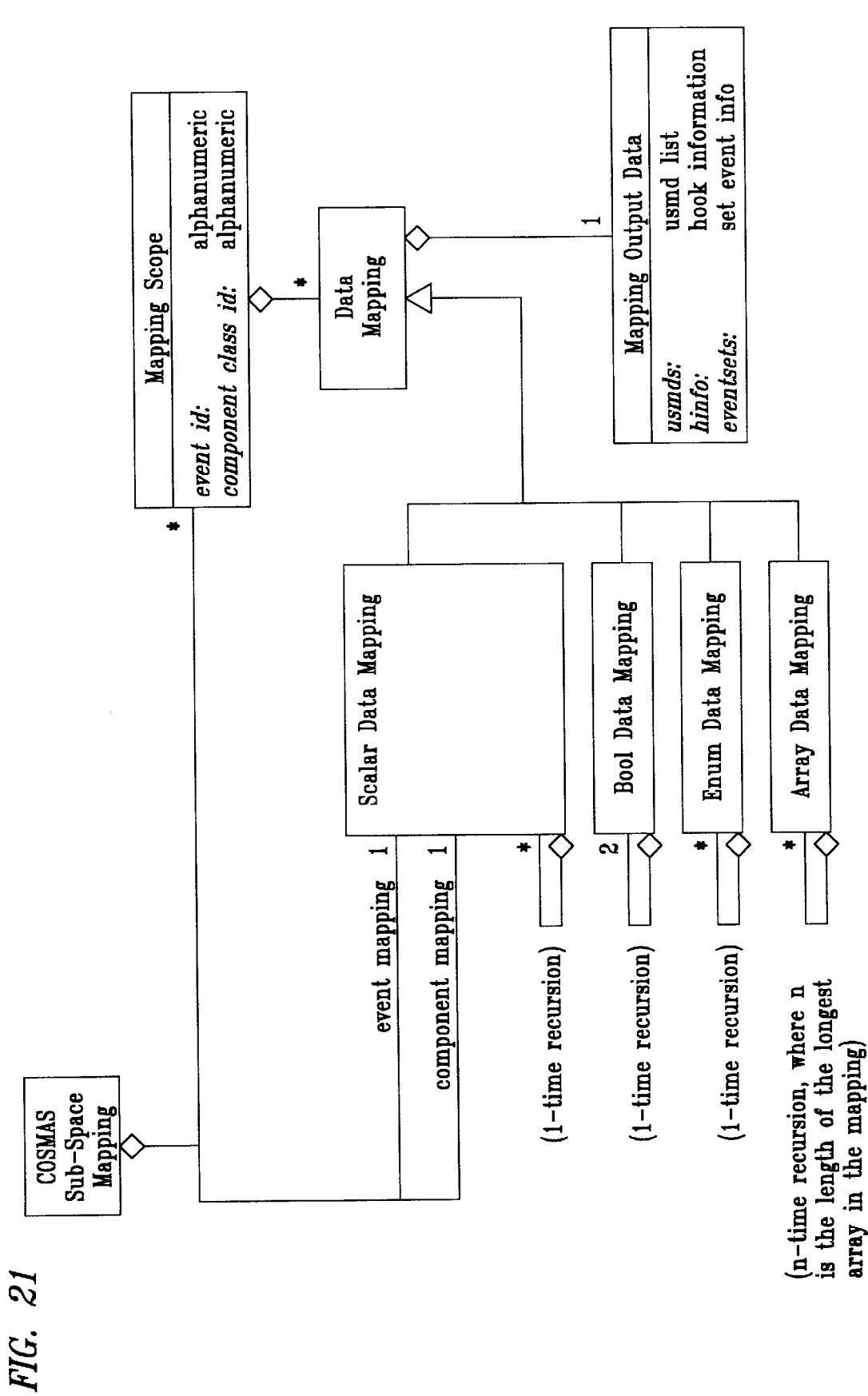

Now referring to FIG. 21, there is illustrated a more detailed object diagram of the sub-space mapping shown in FIG. 16. In the preferred embodiment, the mappings are organized in trees. The sub-space mapping function creates a sub-space and selects or identifies the USMDs, including hooked and referenced event processors (and USMDs), to be processed or run from information contained in a UDS (most likely an origination UDS). Preferably, the top-most nodes contain default data mappings should no match be found in the tree. A best-match algorithm may be performed on arrays, and other best-match algorithms may be used for scalar and enum data mappings.

Now referring to FIG. 22, there is illustrated a more detailed object diagram of the function set interface definition shown in FIG. 16.

Figure 24:
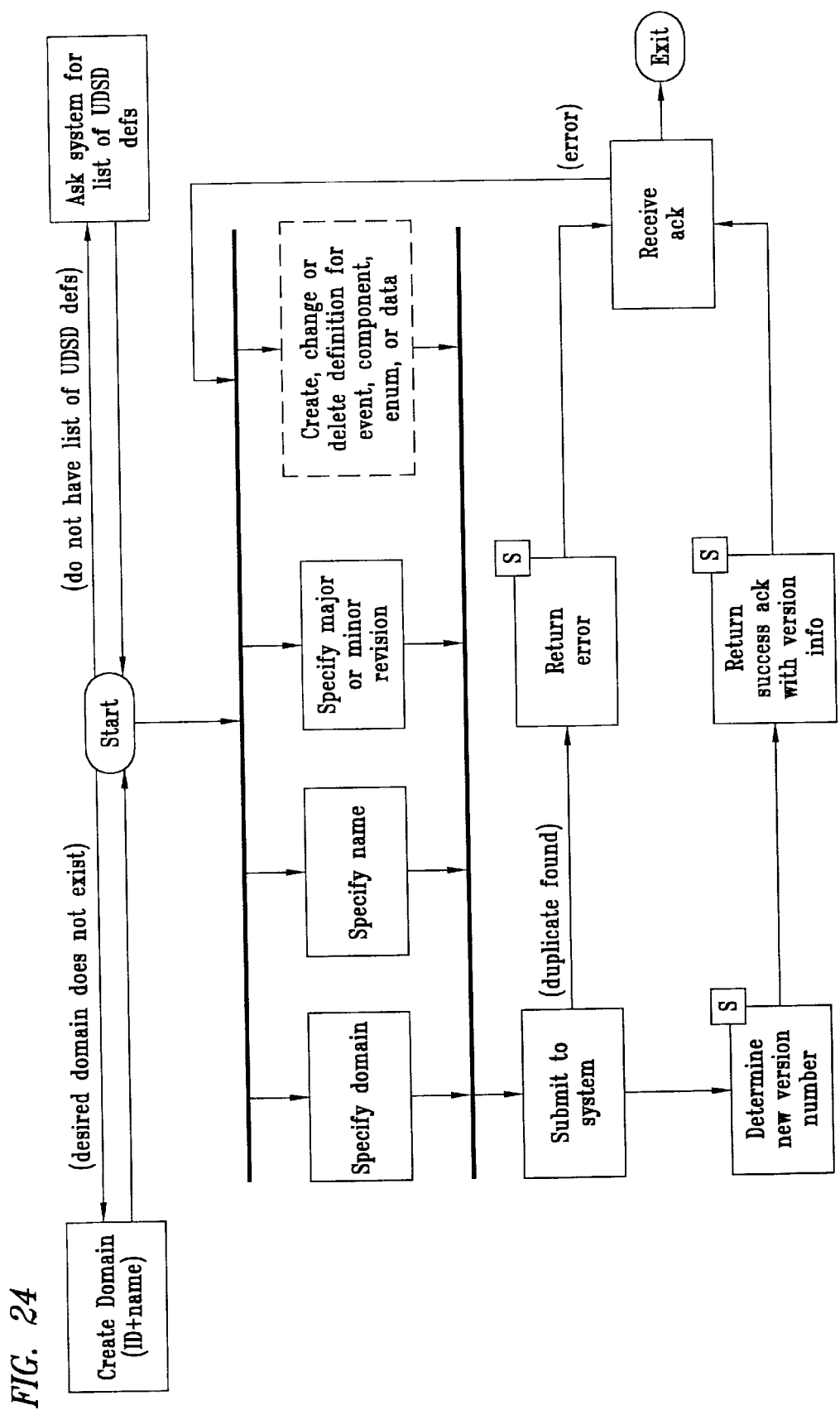
FIG. 24 is an activity flow diagram illustrating the creation of a UDS definition.
Figure 25:
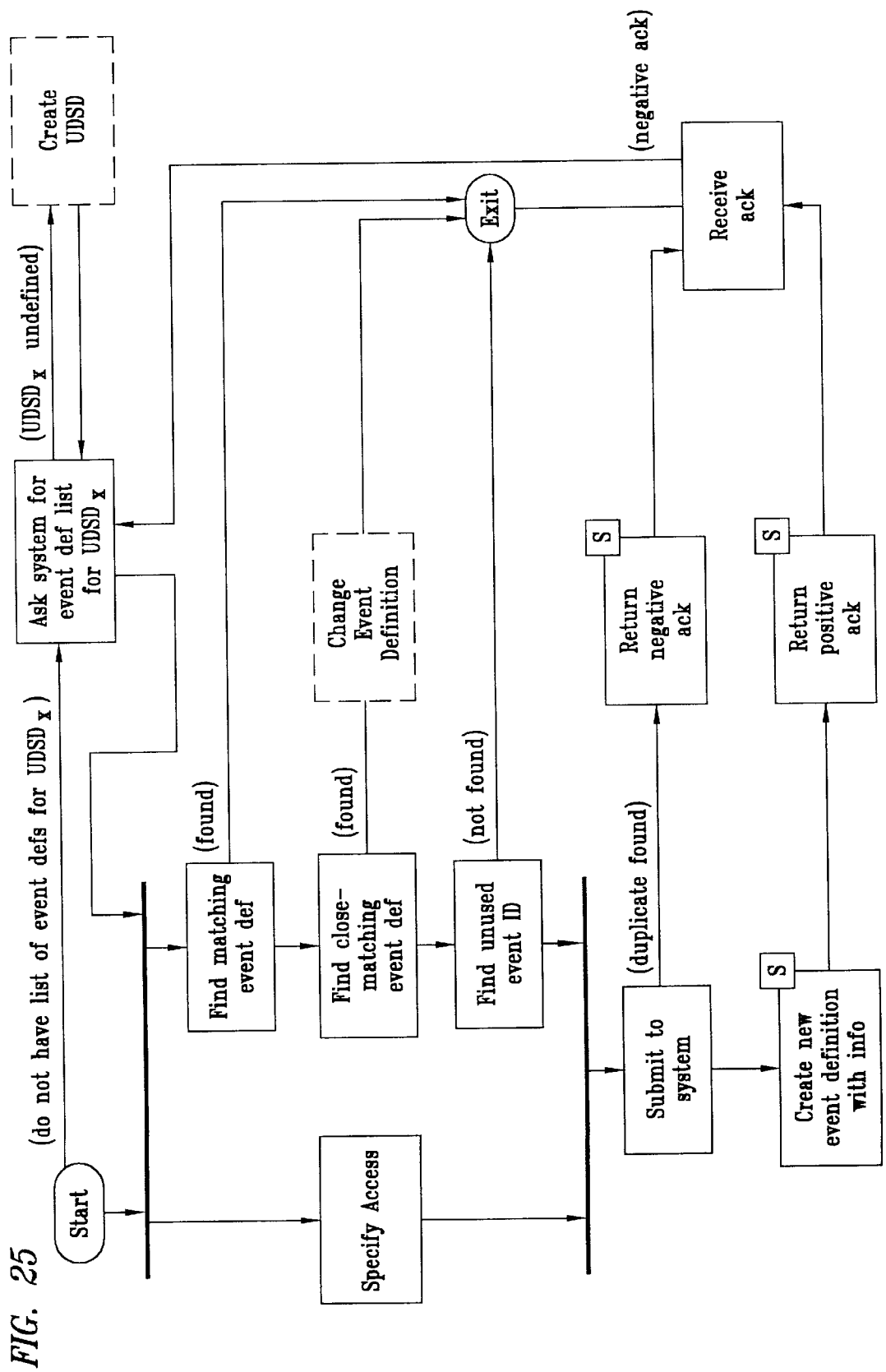
FIG. 25 is an activity flow diagram illustrating the creation of an event definition.
Figure 26:
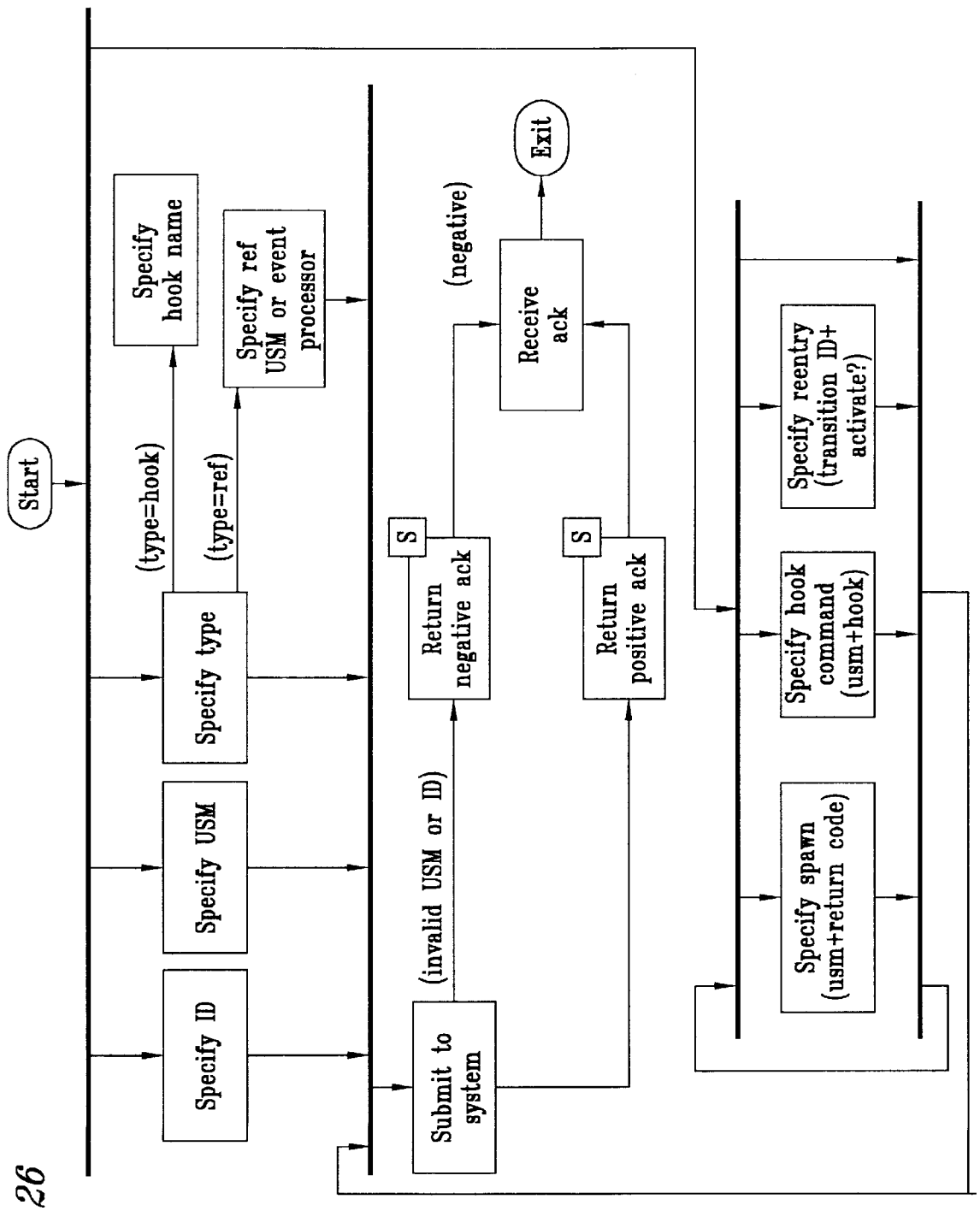
FIG. 26 is an activity flow diagram illustrating the addition of a state to a USM definition.

Now referring to FIGS. 24–26, there are activity flow diagrams exemplifying use cases illustrating the creation of a UDS definition, creation of an event definition, and the addition of a state to a USM definition. The activity diagrams are modeled after the UML format. Additionally, the diagrams include additional notations identify whether the activity is a user action (block having rounded edges with solid line), a system action (block having rounded edges with solid line and an "S" in the upper right hand corner), or another use case (block having rounded edges with dotted line.

The present invention provides for dynamic programmability of the UDS definitions (and definitions within each UDS definition), the USM definitions, and the CSS definitions (and definitions within each CSS definition). Accordingly, UDSDs may be created, modified or deleted. Event, component, enum and data definitions within a UDSD may be created, modified or deleted. Similarly, USMDs may be created, modified or deleted. States and transitions within a USMD may be added, modified or deleted. Likewise, CSSDs may be created, modified or deleted, and USMDs, mappings, and function set interface definitions within a CSSD may be added, replaced, modified or deleted.

FIGS. 24–26 provide examples of a few use cases that may be utilized in creating, modifying, deleting, etc. the definitions used in the present invention. Not all use cases have been detailed. The examples set forth in FIGS. 24–26 provide sufficient detail to allow a person of ordinary skill in the art to implement any of the above-described programmability with minor modifications to the flow diagrams.

Part of the dynamic programmability of the system is the way new information is integrated into the system at (i.e., during) run-time. If we assume that USMx is being used in several calls, i.e., Call1, Call2, and Call3, then the state machine definition for USMx should not change while these calls are using it. If we decide to modify the definition for USMx (with or without versioning) to USMx', then a new state machine definition will be created in the system with the definition for USMx'. In addition, activation mappings will be updated such that all new activations of USMx will go to the new USMx'. The calls using the old USMx will eventually end, after which USMx may be deleted, maintained for legacy purposes, or maintained to "revert to prior issue" should the newer state machine prove faulty. Similar dynamic programmability may be used for the UDSD (for UDSs) and CSSD (for CSSs). More explicit versioning may be applied to this "swapping out" technique by those skilled in the art.

FIG. 24 is a flow diagram illustrating the creation of a UDS definition. Domain names may be used to identify a group or set of USDSs (i.e., global, private1, private2, etc.) FIG. 24 depicts the basic working activity flow for creating a UDSD. As will be appreciated, this basic working activity flow may be modified slightly to illustrate the modification or deletion of a UDS definition, or the creation, modification or deletion of a USMD or CSSD.

FIG. 25 is a flow diagram illustrating the creation of an event definition. Depicted therein is a basic working activity flow for creating an event definition. As will be appreciated, this basic working activity flow may be modified slightly to illustrate the modification or deletion of an event definition, or the creation, modification or deletion of component, enum, or data definitions.

FIG. 26 is a flow diagram illustrating the addition of a state to a USMD. Depicted therein is a basic working activity flow for adding a stat to a USM definition. As will be appreciated, this basic working activity flow may be modified slightly to illustrate the modification or deletion of a state or the addition, modification or deletion of a transition within a USMD, or the addition, modification or deletion of a USMD, mapping or function set interface definition within a CSSD.

The ability to create, modify, or delete definitions during run-time as provided for in the present invention allows a system designer to quickly implement additions, changes, and deletions to the software architecture of the telecommunications system thereby providing modular design and flexibility to the system. To provide this capability, the present invention includes a user interface object that allow a user to communicate with the system (add, modify, delete, etc. of definitions during run-time) and a storage means (i.e. library or database) that maintains the identified definitions. As such, the system software utilizes the definitional software architecture of the present invention to guide its functions and processes.

The present invention may be used in any type of reactive system in which many state machines or processes are run dynamically and concurrently within a single component (i.e. software).

As used herein, the term "activate" or "activating" (i.e., as a function performed in response to a UDS) refers to either the instantiation of a USM (and state machine) and initiation of operation of the state machine, or in the case of a running USM (state machine), some sort of processing by the state machine.

Although the present invention and its advantages have been described in the foregoing detailed description and illustrated in the accompanying drawings, it will be understood by those skilled in the art that the invention is not limited to the embodiment(s) disclosed but is capable of numerous rearrangements, substitutions and modifications without departing from the spirit and scope of the invention as defined by the appended claims.

What is claimed is:

1. A method for call control processing in a telecommunications system, comprising the steps of:
providing a universal data structure definition, the universal data structure definition comprising,
an event definition comprising an event identification, the event identification identifying a particular event, and
a component definition comprising a component identification, the component identification identifying a particular component;
receiving an event message in response to an event occurring in the telecommunications system;
generating a first universal data structure in response to the event message, the first universal data structure representing the event and comprising,
an event identification set forth in the event definition identifying the event represented by the first universal data structure, and
a component identification set forth in the component definition identifying a first component that generated the first universal data structure; and
activating a state machine within the telecommunications system in response to the first universal data structure.

2. The method in accordance with claim 1 wherein the universal data structure definition is dynamically programmable.

3. The method in accordance with claim 1 wherein the universal data structure definition further comprises a data field definition comprising at least one data identifier, each data identifier identifying a particular field of data.

4. The method in accordance with claim 1 further comprising the step of dynamically programming the universal data structure definition.

5. The method in accordance with claim 3 wherein the first universal data structure further comprises a data identifier identifying a first field of data.

6. The method in accordance with claim 5 wherein the first universal data structure further comprises pointer information identifying or pointing to the first field of data.

7. The method in accordance with claim 5 wherein the first universal data structure further comprises data within the first field of data, the data obtained from the event message.

8. The method in accordance with claim 3 wherein the first universal data structure further comprises:
   a plurality of data identifiers identifying a plurality of fields of data, each of the data identifiers identifying a corresponding one of the fields of data; and
   pointer information for identifying or pointing to each of the plurality of fields of data.

9. The method in accordance with claim 3 wherein the data field definition includes a data type indicator for the data identifier, the data type indicator defining the type of data within that particular field of data.

10. The method in accordance with claim 9 wherein the data type indicator indicates scalar, array or boolean type of data.

11. The method in accordance with claim 3 wherein the universal data structure definition further comprises an enum data field definition comprising an enum data identifier, the enum data identifier identifying a particular field of enum data, the enum data representing data obtained from the event message.

12. The method in accordance with claim 11 wherein the enum data identifier represents a set of symbol-scalar value associations.

13. The method in accordance with claim 3 wherein the event definition includes a component permission field for the event identification, the component permission field including information indicating a component that is valid for the event identification.

14. The method in accordance with claim 13 wherein the event definition further includes a data permission field for the event identification, the data permission field including information indicating data that is valid for the event identification.

15. The method in accordance with claim 14 wherein the component definition includes an event permission field for the component identification, the event permission field including information indicating an event that is valid for the component identification, and wherein the component definition includes a data permission field for the component identification, the data permission field including information indicating data that is valid for the component identification.

16. The method in accordance with claim 15 wherein the data field definition includes an event permission field for the data identifier, the event permission field including information indicating an event that is valid for the data identifier, and wherein the data field definition includes a data permission field for the data identifier, the data permission field including information indicating a component that is valid for the data identifier.

17. A method for call control processing in a telecommunications system, comprising the steps of:
   providing a universal data structure definition, the universal data structure definition comprising,
      an event definition defining a plurality of event identifications, each event identification denoting a predetermined event,
      a component definition defining a plurality of component identifications, each component identification denoting a predetermined component, and
      a data field definition defining a plurality of data identifiers, each data identifier denoting a predetermined field of data;
   receiving an event message in response to an event occurring in the telecommunications system;
   generating a first universal data structure in response to the event message, the first universal data structure representing the event and comprising,
      an event identification,
      a component identification, and
      a first data identifier denoting a first field of data; and
   activating a state machine within the telecommunications system in response to the first universal data structure.

18. The method in accordance with claim 17 wherein the first universal data structure further comprises pointer information for pointing to the first field of data, the first field of data comprising data obtained from the event message, the data stored at a predetermined location.

19. The method in accordance with claim 17 wherein the first universal data structure further includes the first field of data, the first field of data comprising data obtained from the event message.

20. The method in accordance with claim 17 wherein the first universal data structure further comprises a second data identifier denoting a second field of data.

21. The method in accordance with claim 17 further comprising the step of dynamically programming the universal data structure definition.

22. A method for control processing in a reactive system, comprising the steps of:
   providing a universal data structure definition, the universal data structure definition comprising,
      an event definition defining a plurality of event identifications, each event identification denoting a predetermined event,
      a component definition defining a plurality of component identifications, each component identification denoting a predetermined component, and
      a data field definition defining a plurality of data identifiers, each data identifier denoting a predetermined field of data;
   receiving an event data in response to an event occurring in the reactive system; and
   generating a first universal data structure in response to the event data, the first universal data structure representing the event and comprising an event identification.

23. The method in accordance with claim 22 wherein the first universal data structure further comprises a component identification and a first data identifier denoting a first field of data.

24. The method in accordance with claim 22 further comprising the steps of applying the universal data structure to a state machine within the reactive system for activating the state machine.

25. The method in accordance with claim 22 further comprising the step of dynamically programming the universal data structure definition.

26. An apparatus for call control processing in a telecommunications system, comprising:
   means for providing a universal data structure definition comprising an event definition, a component definition and a data field definition with each definition identifying particular events, components, and data fields, respectively;

means for receiving an event message in response to an event occurring in the telecommunications system;

means for generating a first universal data structure in response to the event message wherein the first universal data structure identifies the event in accordance with the universal data structure definition and identifies any components specified in accordance with the universal data structure definition; and means for activating a state machine within the telecommunications system in response to the first universal data structure.

27. An apparatus in accordance with claim 26 further comprising means for dynamically programming the universal data structure definition.

* * * * *

UNITED STATES PATENT AND TRADEMARK OFFICE
CERTIFICATE OF CORRECTION

PATENT NO. : 6,052,455
DATED : April 18, 2000
INVENTOR(S) : Daniel James

It is certified that error appears in the above-indentified patent and that said Letters Patent is hereby corrected as shown below:

Column 10, line 62    Delete "coding"
Insert --Coding--

Column 31, line 41    Delete "(COCMAS)"
Insert --(COSMAS)--

Column 39, line 25    Insert --Versioning information is an option in the present invention and may be used as part of the UDSD, USMD, function set definitions, CSSD, etc.--

Signed and Sealed this

Twenty-seventh Day of March, 2001

Attest:

NICHOLAS P. GODICI

Attesting Officer    Acting Director of the United States Patent and Trademark Office